(12) United States Patent
Manoharan et al.

(10) Patent No.: US 12,497,613 B2
(45) Date of Patent: Dec. 16, 2025

(54) MODIFIED OLIGONUCLEOTIDES

(71) Applicant: Alnylam Pharmaceuticals, Inc., Cambridge, MA (US)

(72) Inventors: Muthiah Manoharan, Cambridge, MA (US); Pawan Kumar, Cambridge, MA (US); Dhrubajyoti Datta, Cambridge, MA (US)

(73) Assignee: Alnylam Pharmaceuticals, Inc., Cambridge, MA (US)

( * ) Notice: Subject to any disclaimer, the term of this patent is extended or adjusted under 35 U.S.C. 154(b) by 916 days.

(21) Appl. No.: 17/767,190

(22) PCT Filed: Oct. 13, 2020

(86) PCT No.: PCT/US2020/055301
§ 371 (c)(1),
(2) Date: Apr. 7, 2022

(87) PCT Pub. No.: WO2021/072395
PCT Pub. Date: Apr. 15, 2021

(65) Prior Publication Data
US 2022/0389419 A1    Dec. 8, 2022

Related U.S. Application Data

(60) Provisional application No. 62/914,010, filed on Oct. 11, 2019.

(51) Int. Cl.
C07H 21/02       (2006.01)
A61K 31/713      (2006.01)
C12N 15/11       (2006.01)
C12N 15/113      (2010.01)

(52) U.S. Cl.
CPC .......... *C12N 15/111* (2013.01); *A61K 31/713* (2013.01); *C12N 15/113* (2013.01)

(58) Field of Classification Search
CPC ........................ C12N 15/113; C12N 2310/531
See application file for complete search history.

(56) References Cited

U.S. PATENT DOCUMENTS

2008/0261905 A1    10/2008   Herdewijn et al.
2019/0136234 A1*   5/2019    Prakash ................. C07H 21/00

FOREIGN PATENT DOCUMENTS

JP    2009215241    *   9/2009
JP    2009215241 A  *   9/2009
WO    2003008576 A2     1/2003
WO    WO-2008025160 A1 *  3/2008 ............. C07H 19/06

OTHER PUBLICATIONS

Elbashir et al. (The EMBO Journal, vol. 20, No. 23, pp. 6877-6888, 2001).*
Matsuda et al. (ACS Chem. Biol. 2015, 10, 1181-1187).*
Herdewijn (Chemistry & Biodiversity, 7, 2010, 1-59).*
Prakash et al. (Bioorg. Med. Chem. Lett. 26 (2016) 2817-2820).*
Fisher et al. (Nucleic Acids Research, 2007, vol. 35, No. 4, 1064-1074).*
Bramsen et al., "A large-scale chemical modification screen identifies design rules to generate siRNAs with high activity, high stability and low toxicity." Nucleic Acid Research 37(9): 2867-2881 (2009).
Hean et al., "Inhibition of hepatitis B virus replication in vivo using lipoplexes containing altritol-modified antiviral siRNAs." Artificial DNA, PNA, & XNA 1(1): 17-26 (2010).
Kumar et al., "Chimeric siRNAs with chemically modified pentofuranose and hexopyranose nucleotides: altritol-nucleotide (ANA) containing GalNAc-siRNA conjugates: in vitro and in vivo RNAi activity and resistance to 5′—exonuclease." Nucleic Acid Research 48(8): 4028-4040 (2020).
ISR; PCT No. PCT/US2020/055301; Issued Apr. 15, 2021: pp. 4.
Bramsen et al. "A screen of chemical modifications identifies position-specific modification by UNA to most potently reduce siRNA off-target effects." Nucleic acids research 38.17: 5761-5773 (2010).
Fisher, et al. "Inhibition of MDR1 expression with altritol-modified siRNAs." Nucleic acids research 35.4: 1064-1074 (2007).
Springer et al. "GalNAc-siRNA conjugates: leading the way for delivery of RNAi therapeutics." Nucleic acid therapeutics 28.3: 109-118 (2018).

\* cited by examiner

*Primary Examiner* — Amy Rose Hudson
(74) *Attorney, Agent, or Firm* — Nixon Peabody LLP; David S. Resnick; Ravinderjit S. Braich

(57) ABSTRACT

One aspect of the present invention relates to double-stranded RNA (dsRNA) agent capable of inhibiting the expression of a target gene. Other aspects of the invention relate to pharmaceutical compositions comprising these dsRNA molecules suitable for therapeutic use, and methods of inhibiting the expression of a target gene by administering these dsRNA molecules, e.g., for the treatment of various disease conditions.

19 Claims, 15 Drawing Sheets

Specification includes a Sequence Listing.

R=H, protected OH, OMe, F, O-MOE, O-alkyl, O-alkene, O-alkyne, O-C1G, branched lipids, protected aminoalkyl
R'=H / CH₃

9-11
X = H, F, OMe   HNA, FHNA

15 GalNA

17 FuNA

12-14
X = H, F, OMe   CeNA, F-CeNA

16 GluNA

18 ManNA

B = nucleobase
$B^{PG}$ = protected nucleobase

MODIFIED OLIGONUCLEOTIDES

CROSS-REFERENCE TO RELATED APPLICATIONS

This application is a 35 U.S.C. § 371 National Phase Entry Application of International Patent Application No. PCT/US2020/055301 filed Oct. 13, 2020, which claims benefit under 35 U.S.C. § 119 (e) of U.S. Provisional Application No. 62/914,010 filed Oct. 11, 2019, the contents of each of which are incorporated herein by reference in their entireties.

SEQUENCE LISTING

The instant application contains a Sequence Listing which has been submitted electronically in ASCII format and is hereby incorporated by reference in its entirety. Said ASCII copy, created on Nov. 17, 2020, is named 051058-096320WOPT_SL.txt and is 2,782 bytes in size.

FIELD OF THE INVENTION

The invention relates to modified oligonucleotides that are advantageous for inhibition of target gene expression, as well as compositions suitable for therapeutic use. Additionally, the invention provides methods of inhibiting the expression of a target gene by administering these modified oligonucleotides, e.g., for the treatment of various diseases.

BACKGROUND

RNA interference or "RNAi" is a term initially coined by Fire and co-workers to describe the observation that double-stranded RNAi (dsRNA) can block gene expression (Fire et al. (1998) Nature 391, 806-811; Elbashir et al. (2001) Genes Dev. 15, 188-200). Short dsRNA directs gene-specific, post-transcriptional silencing in many organisms, including vertebrates, and has provided a new tool for studying gene function. RNAi is mediated by RNA-induced silencing complex (RISC), a sequence-specific, multi-component nuclease that destroys messenger RNAs homologous to the silencing trigger. RISC is known to contain short RNAs (approximately 22 nucleotides) derived from the double-stranded RNA trigger, but the protein components of this activity remained unknown.

The 1998 discovery of RNA mediated posttranscriptional gene silencing was pivotal in biological research. This process, known as RNA interference (RNAi), enabled the specific knockdown of any gene making it a commonly used technique in all biological research. From a therapeutic standpoint, RNAi has the advantage of being able to target any disease-associated RNA-based factor, many of which are considered "undruggable" by small molecules. Furthermore, the sequence-specific target recognition makes off-target toxicity less of a concern. There are several RNAi based strategies that use different classes of RNA for efficient knockdown. Short interfering RNAs (siRNAs) are one type that are fully complementary to the target sequence on the transcript and are introduced into target cells as a duplex. After entering cells, the siRNA is loaded into an RNA-induced silencing complex (RISC). During the loading process, the passenger (sense) strand is removed and the guide (antisense) strand remains within the RISC where it binds to its complementary site on the target mRNA. The bound mRNA can then be cleaved by the nuclease activity of RISC and then further degraded by cellular nucleases.

Altritol-modified nucleic acids (ANAs) support RNA-like A-form structures when included in double-stranded nucleic acid structures and improve nuclease stability. While ANA modifications can improve efficacy when placed at 3'-end of the sense strand in an siRNA, ANA modifications result in complete loss of activity when placed at 5'-end of the anstrand strand. See, Chem. Eur. J. 1999, 5, 2424-2431; Nucleic Acids Res. 2007, 35, 1064-1074; Eur. J. Pharm. 2009, 606, 38-44; and Nucleic Acids Res. 2012, 40, 7573-7583. There, however, is an ongoing effort to modulate siRNA design by judicious application of chemical modifications without compromising the gene silencing efficacy of siRNA gene therapeutics. This invention is directed to that effort.

SUMMARY

This invention provides effective nucleotide or chemical motifs for dsRNA molecules, which are advantageous for inhibition of target gene expression as well as RNAi compositions suitable for therapeutic use.

The inventors have discovered inter alia that dsRNA molecules comprising one or more altritol nucleotides at certain positions, e.g., in the seed region of the antisense strand and/or the sense strand, are surprisingly more effective and/or not detrimental in mediating RNA interference. Accordingly, in one aspect, provided herein is a dsRNA molecule capable of inhibiting the expression of a target gene. Generally, the dsRNA molecule comprises a sense strand and an antisense strand, wherein the antisense strand has sufficient complementarity to a target sequence to mediate RNA interference, and the dsRNA molecule comprises at least one hexopyranose nucleotide or a cyclohexene nucleotide.

In some embodiments of the various aspects disclosed herein, the hexopyranose nucleoside is of the following structure:

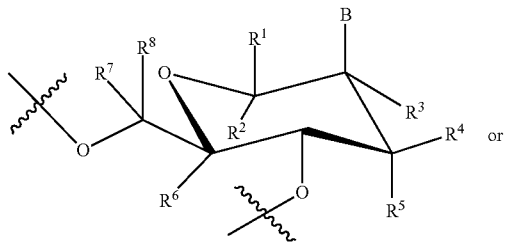

or

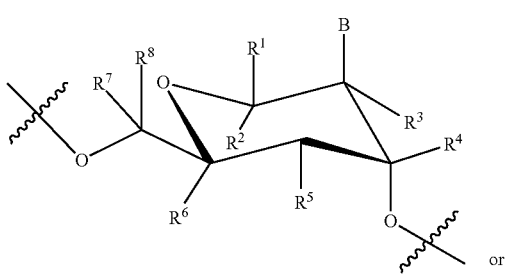

or

-continued

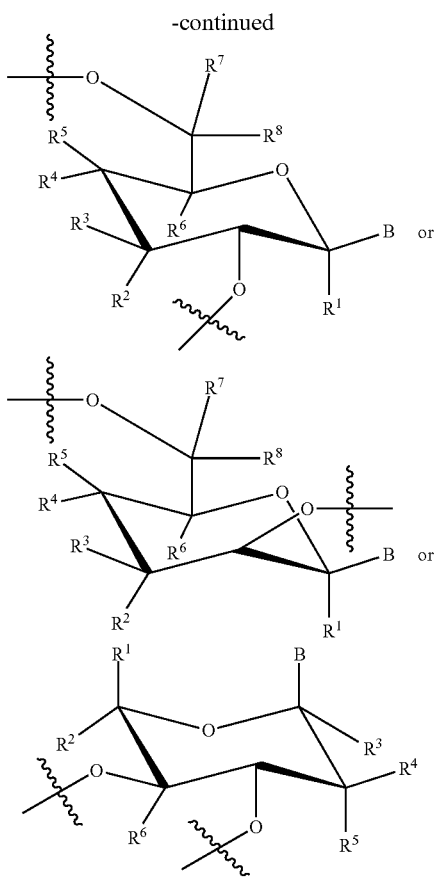

where:
B is a modified or unmodified nucleobase;
$R^1$, $R^2$, $R^3$, $R^4$, $R^5$ and $R^6$ independently are H, halogen, OH, protected OH, $NH_2$, NHMe, $NMe_2$, $OR^9$, $C_1$-$C_6$alkyl (e.g., methyl, ethyl, propyl, etc. . . . ), branched lipids or amino alkyl;
$R^7$ and $R^8$ independently are H, $C_1$-$C_6$alkyl (e.g., methyl, ethyl, propyl, etc. . . . ), or $OR^9$; and
$R^9$ is $C_1$-$C_{20}$alkyl, $C_2$-$C_{20}$alkenyl, $C_2$-$C_{20}$alkynyl, cycloalkyl, aryl, aralkyl, heteroaryl or sugar.

Exemplary hexopyranose nucleotides include, but are not limited to allopyranose nucleotide, altropyranose nucleotide (altriol nucleotide), glucopyranose nucleotide, mannopyranose nucleotide, gulopyranose nucleotide, idopyranose nucleotide, galactopyranose nucleotide, and talopyranose nucleotide. In some embodiments, the hexopyranose nucleotide is a deoxyhexopyranose nucleotide, e.g., a 6-deoxyhexopyranose nucleotide. Exemplary deoxyhexapyranose nucleotides include, but are not limited to fucopyranose nucleotide, rhamopyranose nucleotide, quinovopyranose nucleotide, and pneumopyranose nucleotide.

In some embodiments, the hexopyranose nucleotide or the cyclohexene nucleoside is selected from those shown in FIGS. 12 and 13.

In some embodiments, the hexopyranose nucleotide is an altritol nucleotide.

In some embodiments, the hexopyranose nucleotide is an
In some embodiments, the altritol nucleotide is present in the antisense strand. Generally, the altritol nucleotide can be present anywhere in the antisense strand. For example, the altritol nucleotide can be present within the seed region (i.e., at position 3-8, of the 5'-end of the antisense strand, counting from the 5'-end).

In some embodiments, the altritol nucleotide is present in the sense strand. As with antisense strand, the altritol nucleotide can be present anywhere in the sense strand. For example, the altritol nucleotide can be present within a 5'-region (i.e., at position 2-8, of the 5'-end of the sense strand, counting from the 5'-end). In some embodiments, the sense strand comprises an altritol nucleotide in a central region of the sense strand.

In some embodiments, the dsRNA molecule comprises at least one 2'-fluoro nucleotide and/or at least one 2'-OMe nucleotide.

In some embodiments, the dsRNA molecule comprises at least one, two, three four or more phosphorothioate internucleotide linkages.

In some embodiments, the dsRNA molecule further comprises a ligand conjugated to the sense strand or the antisense strand. For example, the dsRNA molecule further comprises a ASGPR ligand conjugated to the sense strand or the antisense strand. Preferably, the ligand is conjugated at the 3'-end of the sense strand.

In another aspect, the disclosure provides a method for inhibiting the expression of a target gene sequence. Generally, the method comprises administering a dsRNA molecule described herein to a cell in an amount sufficient to inhibit expression of the target gene. The cell can be in vitro or in vivo.

In still another aspect, the disclosure provides a pharmaceutical composition comprising a dsRNA molecule described herein.

In yet another aspect, the disclosure provides a method for treating a subject using a dsRNA molecule described herein. Generally, the method for treatment comprises administering a therapeutically effective amount of a dsRNA molecule described herein to a subject in need thereof.

BRIEF DESCRIPTION OF THE DRAWINGS

FIG. 6A is a bar graph showing the Ttr protein levels in circulation determined via ELISA (Mean±SD). FIG. 6B is a bar graph showing Ttr's transcript levels in the liver at the end of the study (Day 14; Mean±SD).

FIG. 8A shows nuclease stability of oligonucleotides carrying a single or two ANA nucleotides at the 3'-end of a poly dT against degradation by snake venom phosphodiesterase (SVPD). FIG. 8B shows stability of oligonucleotides carrying a single or two ANA nucleotides at the 5'-end of a poly dT against degradation by phosphodiesterase II (PDEII). "s" indicates phosphorothioate linkages. U is uridine and Uan is ANA nucleotide with Uracil as the nucleobase. For direct comparison identical sequences were prepared with uridine at the ends.

(FIG. 10A). Calculated $t_{1/2}$ are UU-3': <<1 h, (Uan)(Uan)-3': 4.7 h, UsU-3': 10.2, Us(Uan)-3': 8.0 h and (Uans)(Uan)-3': 16.3 h. Uan generally increases 3'-exonuclease stability compared to phosphodiester (PO) parent, and a double incorporation is more stable than a single incorporation.

DETAILED DESCRIPTION

Figure 1A:
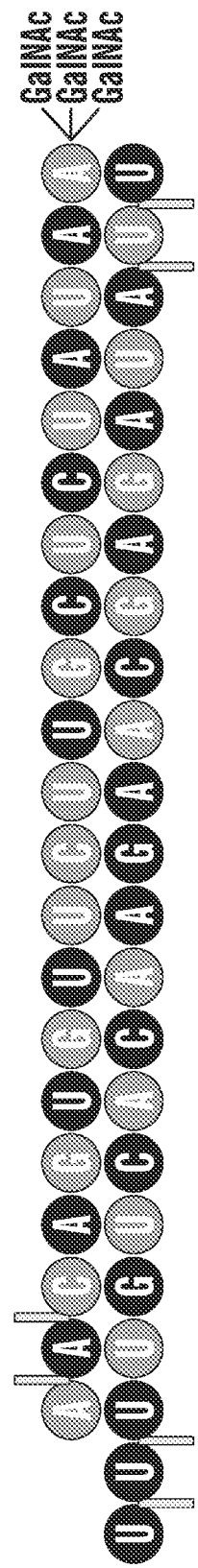
FIG. 1A depicts sense and antisense strand sequences for an exemplary dsRNA. Figure discloses SEQ ID NOS 10-11, respectively, in order of appearance.

In one aspect, the invention provides a double-stranded RNA (dsRNA) molecule, where the dsRNA is capable of inhibiting the expression of a target gene, where the dsRNA comprises a sense strand and an antisense strand, wherein the antisense strand has sufficient complementarity to the target sequence to mediate RNA interference and the dsRNA molecule comprises at least one hexopyranose nucleotide cyclohexene nucleotide, e.g., an altritol nucleotide.

The hexopyranose nucleotide or the cyclohexene nucleotide can be present any wherein in the dsRNA. For example, the hexopyranose nucleotide or the cyclohexene nucleotide can be present in the sense strand of an siRNA molecule. It is noted that the hexopyranose nucleotide or the cyclohexene nucleotide can be present in the sense strand. For example, the hexopyranose nucleotide or the cyclohexene nucleotide can be at the S'-end of the sense strand, 3'-end of the sense strand, and/or at an internal position of the sense strand.

In some embodiments, the hexopyranose nucleotide or the cyclohexene nucleotide is present at the 5'-end of the sense strand. In some embodiments, the hexopyranose nucleotide or the cyclohexene nucleotide is present at the 3'-end of the sense strand.

In some embodiments, the hexopyranose nucleotide or the cyclohexene nucleotide can be present at an internal position of the sense strand. For example, the hexopyranose nucleotide or the cyclohexene nucleotide can be present at position 1, 2, 3, 4, 5, 6, 7, 8, 9, 10, 11, 12, 13, 14, 15, 16, 17, 18, 19, 20, 21, 22, 23, 24 or 25 of the sense strand. In some embodiments, the hexopyranose nucleotide or the cyclohexene nucleotide can be present within a 5'-region (i.e., at position 2-8, of the 5'-end of the sense strand, counting from the 5'-end). In some embodiments, the hexopyranose nucleotide or the cyclohexene nucleotide can be present in a central region of the sense strand.

In some embodiments, the hexopyranose nucleotide or the cyclohexene nucleotide can be present in the sense region of the sense strand at a positon opposite to a seed region of the antisense strand (i.e., position 3-8, of the 5'-end of the antisense strand, counting from the 5'-end).

In some embodiments, the sense strand comprises at least one, e.g., 1, 2, 3, 4, 5, 6, 7, 8, 9, 10, 11, 12, 13, 14, 15, 16, 17, 18, 19, 20, 21, 22, 23, 24, or more hexopyranose nucleotides and/or cyclohexene nucleotides. In some embodiments, the sense strand comprises hexopyranose nucleotide and/or the cyclohexene nucleotide at least at one of positions 3 and 12.

In some embodiments, the sense strand comprises at least 2 or more hexopyranose nucleotide and/or the cyclohexene nucleotides. When two or more hexopyranose nucleotides and/or cyclohexene nucleotides are present, they can be next to each other. Accordingly, in some embodiments, the sense strand comprises at least 2, e.g., 3, 4, 5, 6, 7, 8, 9, 10, 11, 12, 13, 14, 15, 16, 17, 18, 19, 20 or more hexopyranose nucleotide and/or the cyclohexene nucleotides next to each other. In other words, the sense comprises a stretch of two or more independently selected hexopyranose nucleotides and/or cyclohexene nucleotides.

In some embodiments, the sense strand comprises three hexopyranose nucleotides and/or the cyclohexene nucleotides next to each other, i.e., the sense strand comprises a stretch of three independently selected hexopyranose nucleotides and/or the cyclohexene nucleotides.

In some embodiments, the hexopyranose nucleotide or the cyclohexene nucleotide is present in the antisense strand. Generally, the hexopyranose nucleotide and/or the cyclohexene nucleotide can be present anywhere in the antisense strand. For example, the hexopyranose nucleotide or the cyclohexene nucleotide can be at the 5'-end of the antisense strand, 3'-end of the antisense strand, and/or at an internal position of the antisense strand.

In some embodiments, the hexopyranose nucleotide or the cyclohexene nucleotide is present at the 5'-end of the antisense strand. In some embodiments, the hexopyranose nucleotide or the cyclohexene nucleotide is present at the 3'-end of the antisense strand.

In some embodiments, the hexopyranose nucleotide or the cyclohexene nucleotide can be present at an internal position of the antisense strand. For example, the hexopyranose nucleotide or the cyclohexene nucleotide can be present at position 1, 2, 3, 4, 5, 6, 7, 8, 9, 10, 11, 12, 13, 14, 15, 16, 17, 18, 19, 20, 21, 22, 23, 24 or 25 of the antisense strand. In some embodiments, the hexopyranose nucleotide or the cyclohexene nucleotide can be present within a seed region (i.e., at position 2-8, of the 5'-end of the antisense strand, counting from the 5'-end). For example, the antisense strand comprises a hexopyranose nucleotide and/or a cyclohexene nucleotide at least at one of positions 3-8, counting from 5'-end of the antisense strand. In some embodiments, the hexopyranose nucleotide or the cyclohexene nucleotide can be present in a central region of the antisense strand.

In some embodiments, the antisense strand comprises at least one, e.g., 1, 2, 3, 4, 5, 6, 7, 8, 9, 10, 11, 12, 13, 14, 15, 16, 17, 18, 19, 20, 21, 22, 23, 24, or more hexopyranose nucleotides and/or cyclohexene nucleotides. For example, the antisense strand comprises a hexopyranose nucleotides and/or a cyclohexene nucleotide at least at one of positions 6, 7, 9, 12, 16, 21 and 22, counting from the 5'-end of the antisense strand. In some embodiments, the antisense strand comprises a hexopyranose nucleotides and/or a cyclohexene nucleotide at least at one of positions 6, 7 and 16, counting from the 5'-end of the antisense strand. For example, the antisense strand comprises a hexopyranose nucleotides and/ or a cyclohexene nucleotide at least at one of positions 6 and 7, counting from the 5'-end of the antisense strand. In some embodiments, the antisense comprises a hexopyranose nucleotides or a cyclohexene nucleotide at position 7, counting from the 5'-end of the antisense strand.

In some embodiments, the antisense strand comprises at least 2 or more hexopyranose nucleotide and/or the cyclohexene nucleotides. When two or more hexopyranose nucleotides and/or cyclohexene nucleotides are present, they can be next to each other. Accordingly, in some embodiments, the antisense strand comprises at least two, e.g., 3, 4, 5, 6, 7, 8, 9, 10, 11, 12, 13, 14, 15, 16, 17, 18, 19, 20 or more hexopyranose nucleotides and/or cyclohexene nucleotides next to each other. In other words, the antisense comprises a stretch of two or more independently selected hexopyranose nucleotides and/or cyclohexene nucleotides.

In some embodiments, the antisense strand comprises three hexopyranose nucleotides and/or the cyclohexene nucleotides next to each other, i.e., the antisense strand comprises a stretch of three independently selected hexopyranose nucleotides and/or the cyclohexene nucleotides.

In some embodiments, the hexopyranose nucleotide is an altriol nucleotide.

In some embodiments, the hexopyranose nucleotide is a glucopyranose nucleotide.

In some embodiments, the hexopyranose nucleotide is a mannopyranose nucleotide.

In some embodiments, the hexopyranose nucleotide is a galactopyranose nucleotide.

In some embodiments, the hexopyranose nucleotide is a fucopyranose nucleotide.

In some embodiments, the sense strand and/or the antisense strand can comprise a nucleotide containing a 5'-vinylphosphonate (VP) moiety. For example, the sense strand comprises a nucleotide containing a 5'-vinylphosphonate (VP) moiety. In another example, the antisense strand comprises a nucleotide containing a 5'-vinylphosphonate (VP) moiety.

In some embodiments, the dsRNA comprises at least one altritol nucleotide. The dsRNA molecule can comprise at least one, e.g., two, three, four, five, six, seven, eight, nine, ten, eleven, twelve, thirteen, fourteen, fifteen or more altritol nucleotides. Without limitations, the altritol nucleotides all can be present in one strand. In some embodiments, the dsRNA molecule comprises one or two altritol nucleotides. In some preferred embodiments, the dsRNA molecule comprises one altritol nucleotide.

In some embodiments, the antisense strand comprises at least one, e.g., two, three, four, five or more altritol nucleotides. Without limitations, an altritol nucleotide in the antisense strand can be present at any position. In some embodiments, the antisense strand comprises at least one altritol nucleotide within the seed region (i.e., at position 3-8, of the 5'-end of the antisense strand, counting from the 5'-end). In some embodiments, the antisense strand comprises an altritol nucleotide at least at one of positions 6, 7, 9, 12, 16, 21 and 22, counting from the 5'-end. In some embodiments, the antisense strand comprises an altritol nucleotide at least at one of positions 6, 7 and 16. For example, the antisense strand comprises an altritol nucleotide at least at position 6, counting from the 5'-end. In another example, the antisense strand comprises an altritol nucleotide at least at position 7, counting from the 5'-end. In still another example, the antisense strand comprises an altritol nucleotide at least at position 16, counting from the 5'-end.

Inventors have discovered that dsRNAs modified with an altritol nucleotide at the 5'-end of the antisense stand (AS1) are effective. Accordingly, in some embodiments, the antisense strand does not comprise an altritol nucleotide at position 1 and/or 2, counting from the 5'-end.

In some embodiments, the altritol nucleotide is present in the sense strand. the antisense strand comprises at least one, e.g., two, three, four, five or more altritol nucleotides. As with antisense strand, the altritol nucleotide can be present anywhere in the sense strand. In some embodiments, the sense strand can comprise at least one altritol nucleotide at positions opposite or complimentary to the seed region (i.e., at position 3-8, of the 5'-end of the antisense strand, counting from the 5'-end. For example, the sense strand can comprise an altritol nucleotide at least at one of positions 3 and 21 of the sense strand, counting from the 5'-end. In some embodiments, the sense strand comprises an altritol nucleotide at position 1, counting from the 5'-end. In some embodiments, the sense strand does not comprise an altritol nucleotide.

In some embodiments of the various aspects disclosed herein, the altritol nucleotide is a modified altritol nucleotide having the structure:

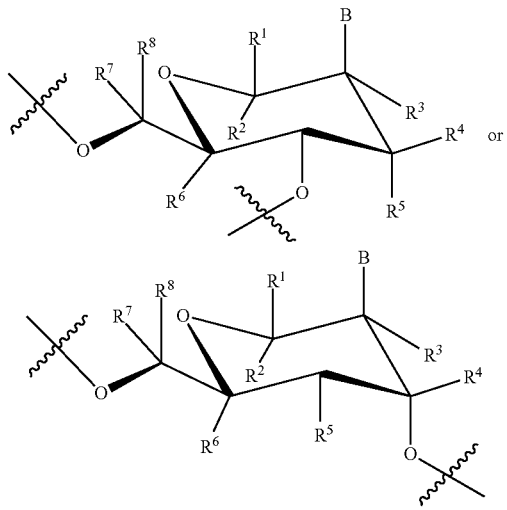

where:
B is a modified or unmodified nucleobase;
$R^1$, $R^2$, $R^3$, $R^4$, $R^5$ and $R^6$ independently are H, halogen, OH, $NH_2$, NHMe, $NMe_2$, $OR^3$, or $C_1$-$C_6$alkyl (e.g., methyl, ethyl, propyl, etc. . . . );
$R^7$ and $R^8$ independently are H, $C_1$-$C_6$alkyl (e.g., methyl, ethyl, propyl, etc. . . . ), or $OR^9$; and
$R^9$ is $C_1$-$C_6$alkyl (e.g., methyl, ethyl, propyl, etc.), cycloalkyl, aryl, aralkyl, heteroaryl or sugar.

dsRNA Molecules

Aspects of the invention include double-stranded RNA molecules. Generally, the dsRNA molecule comprises a sense strand (also referred to as passenger strand) and an antisense strand (also referred to as guide strand). Each strand of the dsRNA molecule independently can range from 12-40 nucleotides in length. For example, each strand independently can be between 14-40 nucleotides in length, 17-37 nucleotides in length, 25-37 nucleotides in length, 27-30 nucleotides in length, 17-23 nucleotides in length, 17-21 nucleotides in length, 17-19 nucleotides in length, 19-25 nucleotides in length, 19-23 nucleotides in length, 19-21 nucleotides in length, 21-25 nucleotides in length, or 21-23 nucleotides in length. Without limitations, the sense and antisense strands can be equal length or unequal length. In some embodiments, the antisense strand is longer, e.g., by 1, 2, 3, 4, or 5 nucleotides than the sense strand.

In some embodiments, the antisense strand is of length 18 to 35 nucleotides. In some embodiments, the antisense strand is 21-25, 19-25, 19-21 or 21-23 nucleotides in length. In some particular embodiments, the antisense strand is 23 nucleotides in length.

Similar to the antisense strand, the sense strand can be, in some embodiments, 18-35 nucleotides in length. In some embodiments, the sense strand is 21-25, 19-25, 19-21 or 21-23 nucleotides in length. In some particular embodiments, the antisense strand is 21 nucleotides in length.

In some particular embodiments, sense strand is 21 nucleotides in length and the antisense strand is 23 nucleotides in length.

The double-stranded RNA molecule has a double-stranded or duplex region. Generally, the duplex region (double-stranded region) is 12-40 nucleotide base pairs in length. For example, the dsRNA has a duplex region of 12-25 nucleotide pairs in length. In some embodiments, the dsRNA has a duplex region of 18, 19, 20, 21, 22, 22, 23, 24, or 25 nucleotide base pairs in length. In some particular embodiments, the dsRNA has a duplex region of 19, 20, 21 or 22 nucleotide base pairs in length.

The dsRNA molecule described herein can comprise one or more nucleic acid modifications. It is noted that the one or more nucleic acid modifications are in addition to the altritol nucleotide(s) present in the dsRNA.

In some embodiments, the dsRNA molecule can comprise 2'-fluoro nucleotides, i.e., 2'-fluoro modifications. For example, the dsRNA molecule can comprise at least one, e.g., two, three, four, five, six, seven, eight, nine, ten, eleven, twelve, thirteen, fourteen, fifteen or more 2'-fluoro nucleotides. Without limitations, the 2'-fluoro nucleotides all can be present in one strand. In some embodiments, both the sense and the antisense strands comprise at least two 2'-fluoro nucleotides. The 2'-fluoro modification can occur on any nucleotide of the sense strand or antisense strand. For instance, the 2'-fluoro modification can occur on every nucleotide on the sense strand and/or antisense strand; each 2'-fluoro modification can occur in an alternating pattern on the sense strand or antisense strand; or the sense strand and antisense strand both comprise 2'-fluoro modifications in an alternating pattern. The alternating pattern of the 2'-fluoro modifications on the sense strand can be the same or different from the antisense strand, and the alternating pattern of the 2'-fluoro modifications on the sense strand can have a shift relative to the alternating pattern of the 2'-fluoro modifications on the antisense strand.

The antisense strand of the dsRNA molecule can comprise at least two (e.g., two, three, four, five, six, seven, eight, nine, ten or more) 2'-fluoro nucleotides. In some embodiments, the antisense strand comprises two, three, four, five or six 2'-fluoro nucleotides. Without limitations, a 2'-fluoro modification in the antisense strand can be present at any position. In some embodiments, the antisense strand comprises at least three 2'-fluoro nucleotides. For example, the antisense strand comprises 2'-fluoro nucleotides at least at positions 2, 14 and 16 from the 5'-end. In some other embodiments, the antisense comprises at least four 2'-fluoro nucleotides. For example, the antisense comprises 2'-fluoro nucleotides at least at positions 2, 6, 14 and 16 from the 5'-end. In some further embodiments, the antisense strand comprises at least five 2'-fluoro nucleotides. For example, the antisense strand comprises 2'-fluoro nucleotides at least at positions 2, 6, 9, 14 and 16 from the 5'-end. In still some further embodiments, the antisense strand comprises at least six 2'-fluoro nucleotides. For example, the antisense strand comprises 2'-fluoro nucleotides at least at positions 2, 6, 8, 9, 14 and 16 from the 5'-end.

The sense strand of the dsRNA molecule can comprise at least two (e.g., two, three, four, five, six, seven, eight, nine, ten or more) 2'-fluoro nucleotides. In some embodiments, the sense strand comprises two, three, four, or five 2'-fluoro nucleotides. For example, the sense strand comprises three or four 2'-fluoro nucleotides. Without limitations, a 2'-fluoro modification in the sense strand can be present at any positions. In some embodiments, the sense strand comprises at least three 2'-fluoro nucleotides. For example, the sense comprises 2'-fluoro nucleotides at least at positions 7, 10 and 11 from the 5'-end. In some other embodiments, the sense strand comprises at least four 2'-fluoro nucleotides. For example, the sense comprises 2'-fluoro nucleotides at least at positions 7, 9, 10 and 11 from the 5'-end.

In some embodiments, the sense strand comprises 2'-fluoro nucleotides at positions opposite or complimentary to positions 11, 12 and 15 of the antisense strand, counting from the 5'-end of the antisense strand. In some other embodiments, the sense strand comprises 2'-fluoro nucleotides at positions opposite or complimentary to positions 11, 12, 13 and 15 of the antisense strand, counting from the 5'-end of the antisense strand. In some embodiments, the sense strand comprises a block of two, three or four 2'-fluoro nucleotides.

In some embodiments, the sense strand comprises 2'-fluoro nucleotides at least at positions 7, 9, and 11 from the 5'-end, and the antisense strand comprises 2'-fluoro nucleotides at least at positions 2, 14 and 16 from the 5'-end. In some other embodiments, the sense strand comprises 2'-fluoro nucleotides at least at positions 7, 9, and 11 from the 5'-end, and the antisense strand comprises 2'-fluoro nucleotides at least at positions 2, 6, 9, 14 and 16 from the 5'-end. In yet some other embodiments, the sense strand comprises 2'-fluoro nucleotides at least at positions 7, 9, and 11 from the 5'-end, and the antisense strand comprises 2'-fluoro nucleotides at least at positions 2, 6, 8, 9, 14 and 16 from the 5'-end.

In some embodiments, the sense strand comprises 2'-fluoro nucleotides at least at positions 7, 9, 10, and 11 from the 5'-end, and the antisense strand comprises 2'-fluoro nucleotides at least at positions 2, 14 and 16 from the 5'-end. In some other embodiments, the sense strand comprises 2'-fluoro nucleotides at least at positions 7, 9, 10, and 11 from the S'-end, and the antisense strand comprises 2'-fluoro nucleotides at least at positions 2, 6, 9, 14 and 16 from the 5'-end. In yet some other embodiments, the sense strand comprises 2'-fluoro nucleotides at least at positions 7, 9, 10, and 11 from the 5'-end, and the antisense strand comprises 2'-fluoro nucleotides at least at positions 2, 6, 8, 9, 14 and 16 from the 5'-end.

In some embodiments, the antisense strand does not comprise a 2'-fluoro nucleotide at positions 3-9, counting from 5'-end.

The dsRNA molecule can comprise at least one, e.g., one, two, three, four, five, six, seven, eight, nine, ten, eleven, twelve, thirteen, fourteen, fifteen, sixteen, seventeen, eighteen, nineteen, twenty or more 2'-OMe nucleotides. Without limitations, the 2'-OMe nucleotides all can be present in one strand. In some embodiments, both the sense and the antisense strands comprise at least one 2'-OMe nucleotide. The 2'-OMe modification can occur on any nucleotide of the sense strand or antisense strand. For instance, the 2'-OMe modification can occur on every nucleotide on the sense strand and/or antisense strand; each thermally stabilizing modification can occur in an alternating pattern on the sense strand or antisense strand; or the sense strand and antisense strand both comprise 2'-OMe modifications in an alternating pattern. The alternating pattern of the thermally stabilizing modifications on the sense strand can be the same or different from the antisense strand, and the alternating pattern of the thermally stabilizing modifications on the sense strand can have a shift relative to the alternating pattern of the 2'-OMe modifications on the antisense strand.

The antisense strand of the dsRNA molecule can comprise at least one, e.g., two, three, four, five, six, seven, eight, nine, ten, eleven, twelve, thirteen, fourteen, fifteen, sixteen, seventeen or more 2'-OMe modifications. Without limitations, a thermally stabilizing modification in the antisense strand can be present at any position. In some embodiments, the antisense strand comprises at least three thermally stabilizing modifications.

For example, the antisense strand does not comprise 2'-OMe modifications at least at positions 2, 14 and 16 from the 5'-end. In some other embodiments, the antisense does not comprise 2'-OMe modifications at least at positions 2, 6, 14 and 16 from the 5'-end. In some further embodiments, the antisense strand does not comprise 2'-OMe modifications at least at positions 2, 6, 9, 14 and 16 from the 5'-end. In still some further embodiments, the antisense strand does not comprise 2'-OMe modifications at least at positions 2, 6, 8, 9, 14 and 16 from the 5'-end.

The sense strand of the dsRNA molecule can comprise at least one, e.g., two, three, four, five, six, seven, eight, nine, ten, eleven, twelve, thirteen, fourteen, fifteen, sixteen or more 2'-OMe modifications. Without limitations, a 2'-OMe modification in the sense strand can be present at any positions. In some embodiments, the sense does not comprise 2'-OMe modifications at least at positions 7, 10 and 11 from the 5'-end. In some other embodiments, the sense does not comprise 2'-OMe modifications at least at positions 7, 9, 10 and 11 from the 5'-end.

The dsRNA molecule can comprise locked nucleic acid (LNA). For example, the dsRNA molecule can comprise can comprise at least one, e.g., one, two, three, four, five, six, seven, eight, nine, ten, eleven, twelve, thirteen, fourteen, fifteen, sixteen, seventeen, eighteen, nineteen, twenty or more LNA modifications. Without limitations, the LNA nucleotides all can be present in one strand. In some embodiments, both the sense and the antisense strands comprise at least LNA modifications. The LNA modification can occur on any nucleotide of the sense strand or antisense strand. For instance, the LNA modification can occur on every nucleotide on the sense strand and/or antisense strand; each LNA modification can occur in an alternating pattern on the sense strand or antisense strand; or the sense strand and antisense strand both comprise LNA modifications in an alternating pattern. The alternating pattern of the LNA modifications on the sense strand can be the same or different from the antisense strand, and the alternating pattern of the LNA modifications on the sense strand can have a shift relative to the alternating pattern of the 2'-fluoro modifications on the antisense strand.

The antisense strand of the dsRNA molecule can comprise at least one, e.g., two, three, four, five, six, seven, eight, nine, ten or more LNA modifications. Without limitations, a LNA modification in the antisense strand can be present at any position.

The sense strand of the dsRNA molecule can comprise at least one, e.g., two, three, four, five, six, seven, eight, nine, ten or more LNA modifications. Without limitations, a LNA modification in the sense strand can be present at any position. In some embodiments, the sense strand comprises at least one, e.g., two, three, four, five, six, seven, eight, nine, ten or more LNA modifications and the antisense strand does not comprise a 2'-fluoro nucleotide at positions 3-9, counting from 5'-end.

The dsRNA molecule can comprise bridged nucleic acid (BNA). For example, the dsRNA molecule can comprise can comprise at least one, e.g., one, two, three, four, five, six, seven, eight, nine, ten, eleven, twelve, thirteen, fourteen, fifteen, sixteen, seventeen, eighteen, nineteen, twenty or more BNA modifications. Without limitations, the BNA nucleotides all can be present in one strand. In some embodiments, both the sense and the antisense strands comprise at least BNA modifications. The BNA modification can occur on any nucleotide of the sense strand or antisense strand. For instance, the BNA modification can occur on every nucleotide on the sense strand and/or antisense strand; each BNA modification can occur in an alternating pattern on the sense strand or antisense strand; or the sense strand and antisense strand both comprise BNA modifications in an alternating pattern. The alternating pattern of the BNA modifications on the sense strand can be the same or different from the antisense strand, and the alternating pattern of the BNA modifications on the sense strand can have a shift relative to the alternating pattern of the 2'-fluoro modifications on the antisense strand.

The antisense strand of the dsRNA molecule can comprise at least one, e.g., two, three, four, five, six, seven, eight, nine, ten or more BNA modifications. Without limitations, a BNA modification in the antisense strand can be present at any position.

The sense strand of the dsRNA molecule can comprise at least one, e.g., two, three, four, five, six, seven, eight, nine, ten or more BNA modifications. Without limitations, a BNA modification in the sense strand can be present at any position. In some embodiments, the sense strand comprises at least one, e.g., two, three, four, five, six, seven, eight, nine, ten or more BNA modifications and the antisense strand does not comprise a 2'-fluoro nucleotide at positions 3-9, counting from 5'-end.

The dsRNA molecule can comprise cyclohexene nucleic acid (CeNA). For example, the dsRNA molecule can comprise can comprise at least one, e.g., one, two, three, four, five, six, seven, eight, nine, ten, eleven, twelve, thirteen, fourteen, fifteen, sixteen, seventeen, eighteen, nineteen, twenty or more CeNA modifications. Without limitations, the CeNA nucleotides all can be present in one strand. In some embodiments, both the sense and the antisense strands comprise at least CeNA modifications. The CeNA modification can occur on any nucleotide of the sense strand or antisense strand. For instance, the CeNA modification can occur on every nucleotide on the sense strand and/or antisense strand; each CeNA modification can occur in an alternating pattern on the sense strand or antisense strand; or the sense strand and antisense strand both comprise ceNA modifications in an alternating pattern. The alternating pattern of the CeNA modifications on the sense strand can be the same or different from the antisense strand, and the alternating pattern of the ceNA modifications on the sense strand can have a shift relative to the alternating pattern of the 2'-fluoro modifications on the antisense strand.

The antisense strand of the dsRNA molecule can comprise at least one, e.g., two, three, four, five, six, seven, eight, nine, ten or more ceNA modifications. Without limitations, a ceNA modification in the antisense strand can be present at any position.

The sense strand of the dsRNA molecule can comprise at least one, e.g., two, three, four, five, six, seven, eight, nine, ten or more ceNA modifications. Without limitations, a ceNA modification in the sense strand can be present at any position. In some embodiments, the sense strand comprises at least one, e.g., two, three, four, five, six, seven, eight, nine, ten or more ceNA modifications and the antisense strand does not comprise a 2'-fluoro nucleotide at positions 3-9, counting from 5'-end.

In some embodiments, the dsRNA molecule can comprise thermally stabilizing modifications. For example, the dsRNA molecule can comprise at least one, e.g., two, three, four, five, six, seven, eight, nine, ten, eleven, twelve, thirteen, fourteen, fifteen or more thermally stabilizing modifications.

Without limitations, the thermally stabilizing modifications all can be present in one strand. In some embodiments, both the sense and the antisense strands comprise at least one, e.g., two, three, four or more thermally stabilizing modifications. The thermally stabilizing modification can occur on any nucleotide of the sense strand or antisense strand. For instance, the thermally stabilizing modification can occur on every nucleotide on the sense strand and/or antisense strand; each thermally stabilizing modification can occur in an alternating pattern on the sense strand or antisense strand; or the sense strand and antisense strand both comprise thermally stabilizing modifications in an alternating pattern. The alternating pattern of the thermally stabilizing modifications on the sense strand can be the same or different from the antisense strand, and the alternating pattern of the thermally stabilizing modifications on the sense strand can have a shift relative to the alternating pattern of the thermally stabilizing modifications on the antisense strand.

The antisense strand of the dsRNA molecule can comprise at least one, e.g., two, three, four, five, six, seven, eight, nine, ten or more thermally stabilizing modifications. In some embodiments, the antisense strand comprises two, three, four, five or six thermally stabilizing modifications. Without limitations, a thermally stabilizing modification in the antisense strand can be present at any position. In some embodiments, the antisense strand comprises at least three thermally stabilizing modifications. For example, the antisense strand comprises thermally stabilizing modifications at least at one of, e.g, two or three of positions 2, 14 and 16 from the 5'-end. In some other embodiments, the antisense comprises at least four thermally stabilizing modifications. For example, the antisense comprises thermally stabilizing modifications at least at positions 2, 6, 14 and 16 from the 5'-end. In some further embodiments, the antisense strand comprises at least five thermally stabilizing modifications. For example, the antisense strand comprises thermally stabilizing modifications at least at positions 2, 6, 9, 14 and 16 from the 5'-end. In still some further embodiments, the antisense strand comprises at least six thermally stabilizing modifications. For example, the antisense strand comprises thermally stabilizing modifications at least at positions 2, 6, 8, 9, 14 and 16 from the 5'-end.

The sense strand of the dsRNA molecule can comprise at least one, e.g., two, three, four, five, six, seven, eight, nine, ten or more thermally stabilizing modifications. In some embodiments, the sense strand comprises two, three, four, or five thermally stabilizing modifications. For example, the sense strand comprises three or four thermally stabilizing modifications. Without limitations, a thermally stabilizing modification in the sense strand can be present at any positions. In some embodiments, the sense strand comprises at least three thermally stabilizing modifications. For example, the sense comprises thermally stabilizing modification at least at positions 7, 10 and 11 from the 5'-end. In some other embodiments, the sense strand comprises at least four thermally stabilizing modifications. For example, the sense comprises thermally stabilizing modification at least at positions 7, 9, 10 and 11 from the 5'-end.

In some embodiments, the sense strand comprises thermally stabilizing modifications at positions opposite or complimentary to positions 11, 12 and 15 of the antisense strand, counting from the 5'-end of the antisense strand. In some other embodiments, the sense strand comprises thermally stabilizing modifications at positions opposite or complimentary to positions 11, 12, 13 and 15 of the antisense strand, counting from the 5'-end of the antisense strand. In some embodiments, the sense strand comprises a block of two, three or four thermally stabilizing modification.

In some embodiments, the sense strand comprises thermally stabilizing modifications at least at positions 7, 9, and 11 from the 5'-end, and the antisense strand comprises thermally stabilizing modifications at least at positions 2, 14 and 16 from the 5'-end. In some other embodiments, the sense strand comprises thermally stabilizing modifications at least at positions 7, 9, and 11 from the 5'-end, and the antisense strand comprises thermally stabilizing modifications at least at positions 2, 6, 9, 14 and 16 from the 5'-end. In yet some other embodiments, the sense strand comprises thermally stabilizing modifications at least at positions 7, 9, and 11 from the 5'-end, and the antisense strand comprises thermally stabilizing modifications at least at positions 2, 6, 8, 9, 14 and 16 from the 5'-end.

In some embodiments, the sense strand comprises thermally stabilizing modifications at least at positions 7, 9, 10, and 11 from the 5'-end, and the antisense strand comprises thermally stabilizing modifications at least at positions 2, 14 and 16 from the 5'-end. In some other embodiments, the sense strand comprises thermally stabilizing modifications at least at positions 7, 9, 10, and 11 from the 5'-end, and the antisense strand comprises thermally stabilizing modifications at least at positions 2, 6, 9, 14 and 16 from the 5'-end. In yet some other embodiments, the sense strand comprises thermally stabilizing modifications at least at positions 7, 9, 10, and 11 from the 5'-end, and the antisense strand comprises thermally stabilizing modifications at least at positions 2, 6, 8, 9, 14 and 16 from the 5'-end.

In some embodiments, the sense strand does not comprise a thermally stabilizing modification in position opposite or complimentary to the thermally destabilizing modification of the duplex in the antisense strand.

Exemplary thermally stabilizing modifications include, but are not limited to 2'-fluoro modifications, locked nucleic acid (LNA), abasic modifications; mismatch with the opposing nucleotide in the opposing strand; and sugar modification such as 2'-deoxy modification or acyclic nucleotide, e.g., unlocked nucleic acids (UNA) or glycol nucleic acid (GNA). In some embodiments, the destabilizing modification is selected from the group consisting of GNA-isoC, GNA-isoG, 5'-mUNA, 4'-mUNA, 3'-mUNA, and 2'-mUNA.

In some embodiments, the dsRNA molecule comprises one or more overhang regions (i.e., single-stranded region) and/or capping groups of dsRNA molecule at the 3'-end, or 5'-end or both ends of a strand. Without limitations, the overhang can be 1-10 nucleotides in length, 1-6 nucleotides in length, 1-5 nucleotides in length, 1-4 nucleotides in length, 1-3 nucleotides in length, 2-6 nucleotides in length, 2-5 nucleotides in length 2-4 nucleotides in length, 2-3 nucleotides in length, or 1-2 nucleotides in length. The overhangs can be the result of one strand being longer than the other, or the result of two strands of the same length being staggered. The overhang can form a mismatch with the sequence being targeted or it can be complementary to the sequence being targeted or can be other sequence. The first and second strands can also be joined, e.g., by additional bases to form a hairpin, or by other non-base linkers. Without limitations the overhang can be present at the 3'-end of the sense strand, antisense strand or both strands.

In some embodiments, the dsRNA molecule comprises a single overhang. For example, the dsRNA molecule has a single overhang and the overhang is at least two, three, four, five, six, seven, eight, nine, or ten nucleotides in length. In some embodiments, the overhang is present at the 3'-end of the antisense strand. In some particular embodiments, the dsRNA comprises a two nucleotide overhang at the 3'-end of the antisense strand.

The dsRNA can also have a blunt end. For example, one end of the dsRNA is a blunt end and the other end has an overhang. Without limitations, the blunt end can be located at the 5'-end of the antisense strand (or the 3'-end of the sense strand) or vice versa. Generally, the antisense strand of the dsRNA has a nucleotide overhang at the 3'-end, and the 5'-end is blunt. While not bound by theory, the asymmetric blunt end at the 5'-end of the antisense strand and 3'-end overhang of the antisense strand favor the guide strand loading into RISC process. In some embodiments, the dsRNA has a 2 nucleotide overhang on the 3'-end of the antisense strand and a blunt end at the 5'-end of the antisense strand.

In some other embodiments, the dsRNA molecule has two blunt ends, i.e., at both ends of the dsRNA.

The nucleotides in the overhang region of the dsRNA molecule can each independently be a modified or unmodified nucleotide including, but not limited to 2'-sugar modified, such as, 2'-Fluoro, 2'-O-methyl, thymidine (T), 2'-O-methoxyethyl-5-methyluridine, 2'-O-methoxyethyladenosine, 2'-O-methoxyethyl-5-methylcytidine, GNA, SNA, hGNA, hhGNA, mGNA, TNA, h'GNA, and any combinations thereof. For example, TT (or UU) can be an overhang sequence for either end on either strand. The 5'- or 3'-overhangs at the sense strand, antisense strand or both strands of the dsRNA molecule can be phosphorylated. In some embodiments, the overhang region contains two nucleotides having a phosphorothioate internucleotide linkage between the two nucleotides, where the two nucleotides in the overhang region can be the same or different.

The dsRNA molecule can comprise at least one, e.g., two, three, four, five, six, seven, eight, nine, ten or more phosphorothioate or methylphosphonate internucleotide linkage. The phosphorothioate or methylphosphonate internucleotide linkage modification can occur on any nucleotide of the sense strand or antisense strand or both in any position of the strand. For instance, the internucleotide linkage modification can occur on every nucleotide on the sense strand and/or antisense strand; each internucleotide linkage modification can occur in an alternating pattern on the sense strand or antisense strand; or the sense strand or antisense strand comprises both internucleotide linkage modifications in an alternating pattern. The alternating pattern of the internucleotide linkage modification on the sense strand can be the same or different from the antisense strand, and the alternating pattern of the internucleotide linkage modification on the sense strand can have a shift relative to the alternating pattern of the internucleotide linkage modification on the antisense strand.

In some embodiments, the dsRNA molecule comprises the phosphorothioate or methylphosphonate internucleotide linkage modification in the overhang region. For example, the overhang region comprises two nucleotides having a phosphorothioate or methylphosphonate internucleotide linkage between the two nucleotides. Internucleotide linkage modifications also may be made to link the overhang nucleotides with the terminal paired nucleotides within duplex region. For example, at least 2, 3, 4, or all the overhang nucleotides can be linked through phosphorothioate or methylphosphonate internucleotide linkage, and optionally, there may be additional phosphorothioate or methylphosphonate internucleotide linkages linking the overhang nucleotide with a paired nucleotide that is next to the overhang nucleotide. For instance, there may be at least two phosphorothioate internucleotide linkages between the terminal three nucleotides, in which two of the three nucleotides are overhang nucleotides, and the third is a paired nucleotide next to the overhang nucleotide. Preferably, these terminal three nucleotides can be at the 3'-end of the antisense strand.

In some embodiments, the sense strand of the dsRNA molecule comprises 1-10 blocks of two to ten phosphorothioate or methylphosphonate internucleotide linkages separated by 1, 2, 3, 4, 5, 6, 7, 8, 9, 10, 11, 12, 13, 14, 15 or 16 phosphate internucleotide linkages, wherein one of the phosphorothioate or methylphosphonate internucleotide linkages is placed at any position in the oligonucleotide sequence and the said sense strand is paired with an antisense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of two phosphorothioate or methylphosphonate internucleotide linkages separated by 1, 2, 3, 4, 5, 6, 7, 8, 9, 10, 11, 12, 13, 14, 15, 16, 17, or 18 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of three phosphorothioate or methylphosphonate internucleotide linkages separated by 1, 2, 3, 4, 5, 6, 7, 8, 9, 10, 11, 12, 13, 14, 15 or 16 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of four phosphorothioate or methylphosphonate internucleotide linkages separated by 1, 2, 3, 4, 5, 6, 7, 8, 9, 10, 11, 12, 13 or 14 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of five phosphorothioate or methylphosphonate internucleotide linkages separated by 1, 2, 3, 4, 5, 6, 7, 8, 9, 10, 11 or 12 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of six phosphorothioate or methylphosphonate internucleotide linkages separated by 1, 2, 3, 4, 5, 6, 7, 8, 9 or 10 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of seven phosphorothioate or methylphosphonate internucleotide linkages separated by 1, 2, 3, 4, 5, 6, 7 or 8 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of eight phosphorothioate or methylphosphonate internucleotide linkages separated by 1, 2, 3, 4, 5 or 6 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the antisense strand of the dsRNA molecule comprises two blocks of nine phosphorothioate or methylphosphonate internucleotide linkages separated by 1, 2, 3 or 4 phosphate internucleotide linkages, wherein one of the phosphorothioate or methylphosphonate internucleotide linkages is placed at any position in the oligonucleotide sequence and the said antisense strand is paired with a sense strand comprising any combination of phosphorothioate, methylphosphonate and phosphate internucleotide linkages or an antisense strand comprising either phosphorothioate or methylphosphonate or phosphate linkage.

In some embodiments, the dsRNA molecule comprises one or more phosphorothioate or methylphosphonate internucleotide linkage modification within 1-10 of the termini position(s) of the sense and/or antisense strand. For example, at least 2, 3, 4, 5, 6, 7, 8, 9 or 10 nucleotides may be linked through phosphorothioate or methylphosphonate internucleotide linkage at one end or both ends of the sense and/or antisense strand.

In some embodiments, the dsRNA molecule comprises one or more phosphorothioate or methylphosphonate internucleotide linkage modification within 1-10 of the internal region of the duplex of each of the sense and/or antisense strand. For example, at least 2, 3, 4, 5, 6, 7, 8, 9 or 10 nucleotides may be linked through phosphorothioate methylphosphonate internucleotide linkage at position 8-16 of the duplex region counting from the 5'-end of the sense strand; the dsRNA molecule can optionally further comprise one or more phosphorothioate or methylphosphonate internucleotide linkage modification within 1-10 of the termini position(s).

In some embodiments, the dsRNA molecule comprises one to five phosphorothioate or methylphosphonate internucleotide linkage modification(s) within position 1-5 and one to five phosphorothioate or methylphosphonate internucleotide linkage modification(s) within position 18-23 of the sense strand (counting from the 5'-end), and one to five phosphorothioate or methylphosphonate internucleotide linkage modification at positions 1 and 2 and one to five within positions 18-23 of the antisense strand (counting from the 5'-end).

In some embodiments, the dsRNA molecule comprises one phosphorothioate internucleotide linkage modification within position 1-5 and one phosphorothioate or methylphosphonate internucleotide linkage modification within position 18-23 of the sense strand (counting from the 5'-end), and one phosphorothioate internucleotide linkage modification at positions 1 and 2 and two phosphorothioate or methylphosphonate internucleotide linkage modifications within positions 18-23 of the antisense strand (counting from the 5'-end).

In some embodiments, the dsRNA molecule comprises two phosphorothioate internucleotide linkage modifications within position 1-5 and one phosphorothioate internucleotide linkage modification within position 18-23 of the sense strand (counting from the 5'-end), and one phosphorothioate internucleotide linkage modification at positions 1 and 2 and two phosphorothioate internucleotide linkage modifications within positions 18-23 of the antisense strand (counting from the 5'-end).

In some embodiments, the dsRNA molecule comprises two phosphorothioate internucleotide linkage modifications within position 1-5 and two phosphorothioate internucleotide linkage modifications within position 18-23 of the sense strand (counting from the 5'-end), and one phosphorothioate internucleotide linkage modification at positions 1 and 2 and two phosphorothioate internucleotide linkage modifications within positions 18-23 of the antisense strand (counting from the 5'-end).

In some embodiments, the dsRNA molecule comprises two phosphorothioate internucleotide linkage modifications within position 1-5 and two phosphorothioate internucleotide linkage modifications within position 18-23 of the sense strand (counting from the 5'-end), and one phosphorothioate internucleotide linkage modification at positions 1 and 2 and one phosphorothioate internucleotide linkage modification within positions 18-23 of the antisense strand (counting from the 5'-end).

In some embodiments, the dsRNA molecule comprises one phosphorothioate internucleotide linkage modification within position 1-5 and one phosphorothioate internucleotide linkage modification within position 18-23 of the sense strand (counting from the 5'-end), and two phosphorothioate internucleotide linkage modifications at positions 1 and 2 and two phosphorothioate internucleotide linkage modifications within positions 18-23 of the antisense strand (counting from the 5'-end).

In some embodiments, the dsRNA molecule comprises one phosphorothioate internucleotide linkage modification within position 1-5 and one within position 18-23 of the sense strand (counting from the 5'-end), and two phosphorothioate internucleotide linkage modification at positions 1 and 2 and one phosphorothioate internucleotide linkage modification within positions 18-23 of the antisense strand (counting from the 5'-end).

In some embodiments, the dsRNA molecule comprises one phosphorothioate internucleotide linkage modification within position 1-5 (counting from the 5'-end) of the sense strand, and two phosphorothioate internucleotide linkage modifications at positions 1 and 2 and one phosphorothioate internucleotide linkage modification within positions 18-23 of the antisense strand (counting from the 5'-end).

In some embodiments, the dsRNA molecule comprises two phosphorothioate internucleotide linkage modifications within position 1-5 (counting from the 5'-end) of the sense strand, and one phosphorothioate internucleotide linkage modification at positions 1 and 2 and two phosphorothioate internucleotide linkage modifications within positions 18-23 of the antisense strand (counting from the 5'-end).

In some embodiments, the dsRNA molecule comprises two phosphorothioate internucleotide linkage modifications within position 1-5 and one within position 18-23 of the sense strand (counting from the 5'-end), and two phosphorothioate internucleotide linkage modifications at positions 1 and 2 and one phosphorothioate internucleotide linkage modification within positions 18-23 of the antisense strand (counting from the 5'-end).

In some embodiments, the dsRNA molecule comprises two phosphorothioate internucleotide linkage modifications within position 1-5 and one phosphorothioate internucleotide linkage modification within position 18-23 of the sense strand (counting from the S'-end), and two phosphorothioate internucleotide linkage modifications at positions 1 and 2 and two phosphorothioate internucleotide linkage modifications within positions 18-23 of the antisense strand (counting from the 5'-end).

In some embodiments, the dsRNA molecule comprises two phosphorothioate internucleotide linkage modifications within position 1-5 and one phosphorothioate internucleotide linkage modification within position 18-23 of the sense strand (counting from the 5'-end), and one phosphorothioate internucleotide linkage modification at positions 1 and 2 and two phosphorothioate internucleotide linkage modifications within positions 18-23 of the antisense strand (counting from the 5'-end).

In some embodiments, the dsRNA molecule comprises two phosphorothioate internucleotide linkage modifications at position 1 and 2, and two phosphorothioate internucleotide linkage modifications at position 20 and 21 of the sense strand (counting from the S'-end), and one phosphorothioate internucleotide linkage modification at positions 1 and one at position 21 of the antisense strand (counting from the 5'-end).

In some embodiments, the dsRNA molecule comprises one phosphorothioate internucleotide linkage modification at position 1, and one phosphorothioate internucleotide linkage modification at position 21 of the sense strand (counting from the 5'-end), and two phosphorothioate internucleotide linkage modifications at positions 1 and 2 and two phosphorothioate internucleotide linkage modifications at positions 20 and 21 the antisense strand (counting from the 5'-end).

In some embodiments, the dsRNA molecule comprises two phosphorothioate internucleotide linkage modifications at position 1 and 2, and two phosphorothioate internucleotide linkage modifications at position 21 and 22 of the sense strand (counting from the 5'-end), and one phosphorothioate internucleotide linkage modification at positions 1 and one phosphorothioate internucleotide linkage modification at position 21 of the antisense strand (counting from the 5'-end).

In some embodiments, the dsRNA molecule comprises one phosphorothioate internucleotide linkage modification at position 1, and one phosphorothioate internucleotide linkage modification at position 21 of the sense strand (counting from the 5'-end), and two phosphorothioate internucleotide linkage modifications at positions 1 and 2 and two phosphorothioate internucleotide linkage modifications at positions 21 and 22 the antisense strand (counting from the 5'-end).

In some embodiments, the dsRNA molecule comprises two phosphorothioate internucleotide linkage modifications at position 1 and 2, and two phosphorothioate internucleotide linkage modifications at position 22 and 23 of the sense strand (counting from the 5'-end), and one phosphorothioate internucleotide linkage modification at positions 1 and one phosphorothioate internucleotide linkage modification at position 21 of the antisense strand (counting from the 5'-end).

In some embodiments, the dsRNA molecule one phosphorothioate internucleotide linkage modification at position 1, and one phosphorothioate internucleotide linkage modification at position 21 of the sense strand (counting from the 5'-end), and two phosphorothioate internucleotide linkage modifications at positions 1 and 2 and two phosphorothioate internucleotide linkage modifications at positions 23 and 23 the antisense strand (counting from the 5'-end).

In some exemplary dsRNA molecules, the sense strand can comprise 0, 1, 2, 3 or 4 phosphorothioate internucleotide linkages. For example, the sense strand comprises phosphorothioate internucleotide linkages between nucleotide positions 1 and 2, and between nucleotide positions 2 and 3.

In some exemplary dsRNA molecules, the antisense strand can comprise 1, 2, 3 or 4 phosphorothioate internucleotide linkages. For example, the sense strand comprises phosphorothioate internucleotide linkages between nucleotide positions 21 and 22, and between nucleotide positions 22 and 23. In an additional example, the antisense strand comprises phosphorothioate internucleotide linkages between nucleotide positions 1 and 2, between nucleotide positions 2 and 3, between nucleotide positions 21 and 22, and between nucleotide positions 22 and 23.

In some embodiments, the sense strand comprises phosphorothioate internucleotide linkages between nucleotide positions 1 and 2, and between nucleotide positions 2 and 3, and the antisense strand comprises phosphorothioate internucleotide linkages between nucleotide positions 21 and 22, and between nucleotide positions 22 and 23. For example, the sense strand comprises phosphorothioate internucleotide linkages between nucleotide positions 1 and 2, and between nucleotide positions 2 and 3, and the antisense strand comprises phosphorothioate internucleotide linkages between nucleotide positions 1 and 2, between nucleotide positions 2 and 3, between nucleotide positions 21 and 22, and between nucleotide positions 22 and 23.

5'-Modifications

In some embodiments, the dsRNA molecule can be 5' phosphorylated or include a phosphoryl analog at the 5' terminus. Exemplary 5'-phosphate modifications include those which are compatible with RISC mediated gene silencing. Suitable modifications include: 5'-monophosphate ((HO)$_2$(O)P—O-5'); 5'-diphosphate ((HO)$_2$(O)P—O—P(HO)(O)—O-5'); 5'-triphosphate ((HO)$_2$(O)P—O—(HO)(O)P—O—P(HO)(O)—O-5'); 5'-guanosine cap (7-methylated or non-methylated) (7m-G-O-5'-(HO)(O)P—O—(HO)(O)P—O—P(HO)(O)—O-5'); 5'-adenosine cap (Appp), and any modified or unmodified nucleotide cap structure (N—O-5'-(HO)(O)P—O—(HO)(O)P—O—P(HO)(O)—O-5'); 5'-monothiophosphate (phosphorothioate; (HO)$_2$(S)P—O-5'); 5'-monodithiophosphate (phosphorodithioate; (HO)(HS)(S)P—O—S'), 5'-phosphorothiolate ((HO)$_2$(O)P—S-5'); any additional combination of oxygen/sulfur replaced monophosphate, diphosphate and triphosphates (e.g. 5'-alpha-thiotriphosphate, 5'-gamma-thiotriphosphate, etc.), 5'-phosphoramidates ((HO)$_2$(O)P—NH-5', (HO)(NH$_2$)(O)P—O-5'), 5'-alkylphosphonates (R=alkyl=methyl, ethyl, isopropyl, propyl, etc., e.g. RP(OH)(O)—O-5'-, 5'-alkenylphosphonates (i.e. vinyl, substituted vinyl), (OH) 2(O)P-5'-CH2-), 5'-alkyletherphosphonates (R=alkylether=methoxymethyl (MeOCH2-), ethoxymethyl, etc., e.g. RP(OH)(O)—O-5'-). The modification can in placed in the antisense strand of a dsRNA molecule. For example, the antisense strand can comprise a 5'-vinylphosphonate nucleotide at 5'-end.

In some embodiments, the antisense comprises 5'-E-vinylphosphanate. In some embodiments, the antisense strand comprises 5'-E-vinylphosphanate and a nucleoside at position N−1 that reduces or inhibits activity of siRNA relative to a siRNA having the same antisense strand sequence but unmodified N−1 position and a nucleoside at position N−1 that reduces or inhibits activity of siRNA relative to a siRNA having the same antisense strand sequence but unmodified N−1 position In some embodiments, the sense strand comprises a 5'-morpholino, a 5'-dimethylamino, a 5'-deoxy, an inverted abasic, or an inverted abasic locked nucleic acid modification at the 5'-end.

Generally, the dsRNA has a melting temperature in the range from about 40° C. to about 80° C. For example, the dsRNA has a melting temperature with a lower end of the range from about 40° C., 45° C., 50° C., 55° C., 60° C. or 65° C., and upper end of the range from about 70° C., 75° C. or 80° C. In some embodiments, the dsRNA has a melting temperature in the range from about 55° C. to about 70° C. or in the range from about 60° C. to about 75° C. In some embodiments, the dsRNA has a melting temperature in the range from about 57° C. to about 67° C. In some particular embodiments, the dsRNA has a melting temperature in the range from about 60° C. to about 67° C. In some additional embodiments, the dsRNA has a melting temperature in the range from about 62° C. to about 66° C.

Without wishing to be bound by a theory, dsRNA molecules having a melting temperature of at least 60° C. are more effective in vivo and in vitro. Accordingly, in some embodiments, the dsRNA has a melting temperature of at least 60° C.

Without wishing to be bound by a theory, for the dsRNA molecules to be more effective in vivo, the antisense strand must have some metabolic stability. In other words, for the dsRNA molecules to be more effective in vivo, some amount of the antisense stand may need to be present in vivo after a period time after administration. Accordingly, in some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 5 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 6 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 7 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 8 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 9 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 10 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 11 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 12 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 13 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 14 after in vivo administration. In some embodiments, at least 40%, for example at least 45%, at least 50%, at least 55%, at least 60%, at least 65%, at least 70%, at least 75%, or at least 80% of the antisense strand of the dsRNA is present in vivo, for example in mouse liver, at day 15 after in vivo administration.

Without wishing to be bound by a theory, thermally destabilizing modifications in the 5'-region of the antisense strand (i.e., at positions 2-9 from the 5'-end of the antisense strand) can reduce or inhibit off-target gene silencing. Accordingly, in some embodiments, the antisense strand comprises at least one (e.g., one, two, three, four, five or more) thermally destabilizing modification of the duplex within the first 9 nucleotide positions of the 5' region of the antisense strand. The term "thermally destabilizing modification(s)" includes modification(s) that would result with a dsRNA with a lower overall melting temperature (Tm) (preferably a Tm with one, two, three or four degrees lower than the Tm of the dsRNA without having such modification(s).

In some embodiments, thermally destabilizing modification is located at position 2, 3, 4, 5, 6, 7, 8 or 9, or preferably at position 4, 5, 6, 7, or 8, from the 5'-end of the antisense strand. In some embodiments, the thermally destabilizing modification is located at position 2, 3, 4, 5 or 9 from the 5'-end of the antisense strand. In some other embodiments, the thermally destabilizing modification is located at position 6, 7 or 8 from the 5'-end of the antisense strand. In some particular embodiments, the thermally destabilizing modification is located at position 7 from the 5'-end of the antisense strand.

The thermally destabilizing modifications can include, but are not limited to, abasic modifications; mismatch with the opposing nucleotide in the opposing strand; and sugar modification such as 2'-deoxy modification or acyclic nucleotide, e.g., unlocked nucleic acids (UNA) or glycol nucleic acid (GNA).

Exemplary abasic modifications include, but are not limited to, the following:

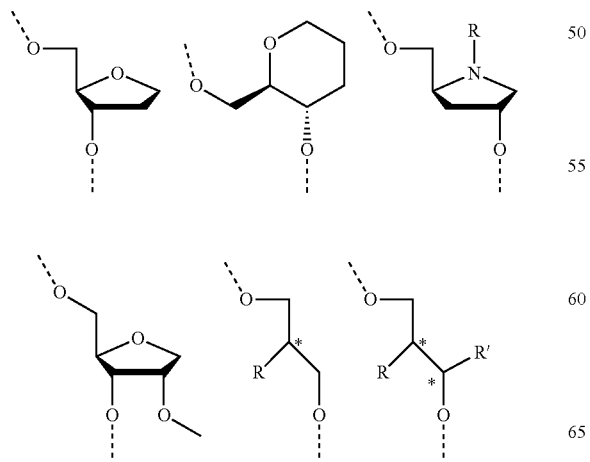

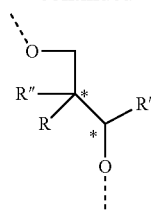

wherein R is H, Me, Et or OMe; R' is H, Me, Et or OMe; R" is H, Me, Et or OMe; and * represents either R, S or racemic.

Exemplary destabilizing sugar modifications include, but are not limited to the following:

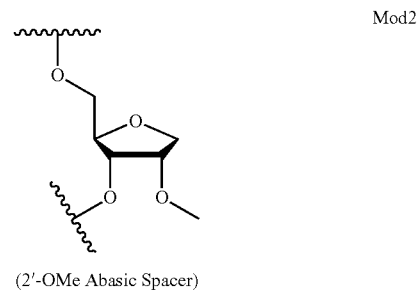

(2'-OMe Abasic Spacer)

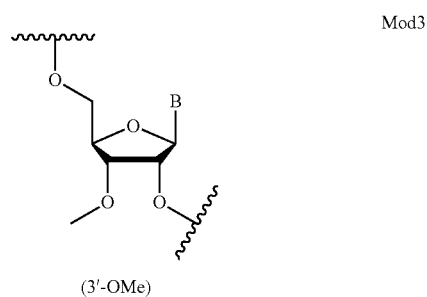

(3'-OMe)

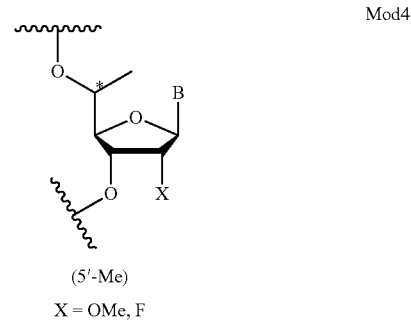

(5'-Me)
X = OMe, F

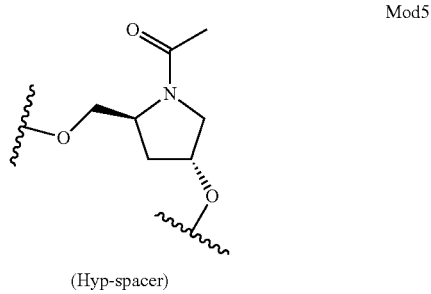

(Hyp-spacer)

wherein B is a modified or unmodified nucleobase.

Additional sugar modifications include, but are not limited to the following:

In some embodiments the thermally destabilizing modification is selected from the group consisting of:

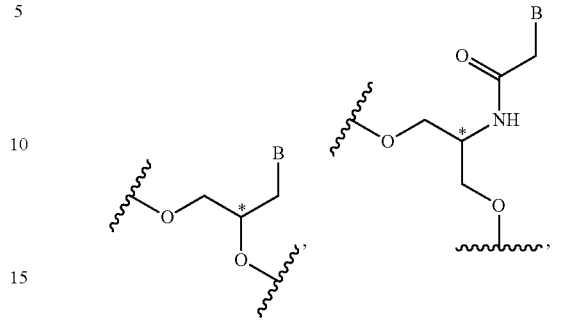

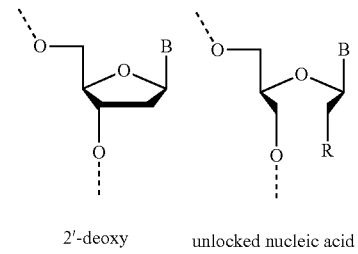

2'-deoxy    unlocked nucleic acid
R = H, OH, O-alkyl

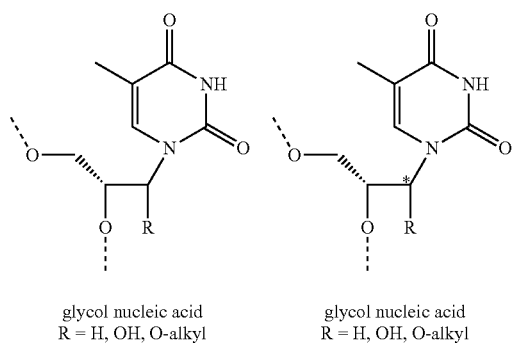

glycol nucleic acid         glycol nucleic acid
R = H, OH, O-alkyl          R = H, OH, O-alkyl

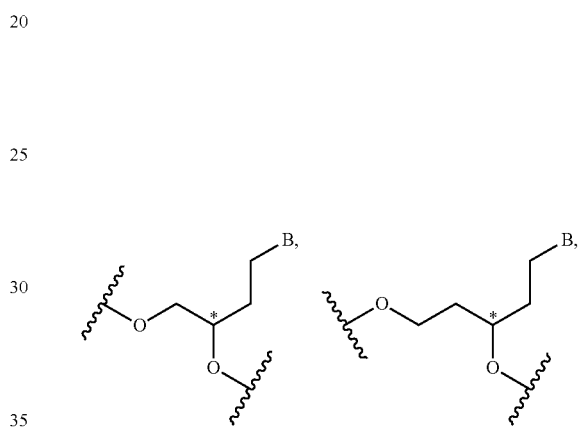

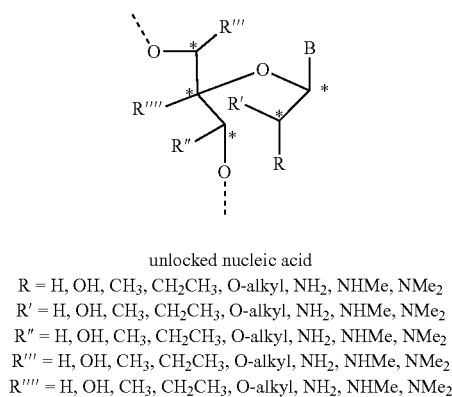

unlocked nucleic acid
R = H, OH, CH$_3$, CH$_2$CH$_3$, O-alkyl, NH$_2$, NHMe, NMe$_2$
R' = H, OH, CH$_3$, CH$_2$CH$_3$, O-alkyl, NH$_2$, NHMe, NMe$_2$
R" = H, OH, CH$_3$, CH$_2$CH$_3$, O-alkyl, NH$_2$, NHMe, NMe$_2$
R''' = H, OH, CH$_3$, CH$_2$CH$_3$, O-alkyl, NH$_2$, NHMe, NMe$_2$
R'''' = H, OH, CH$_3$, CH$_2$CH$_3$, O-alkyl, NH$_2$, NHMe, NMe$_2$

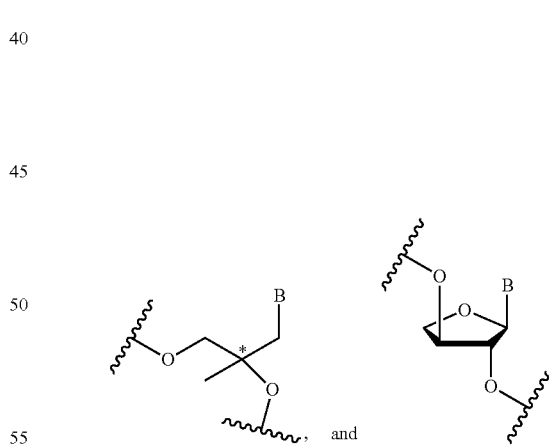

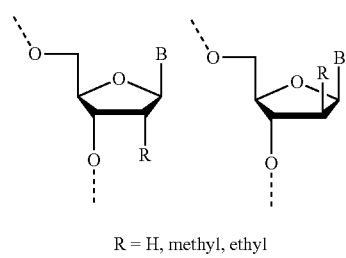

R = H, methyl, ethyl wherein B is a modified or unmodified nucleobase.

wherein B is a modified or unmodified nucleobase and the asterisk on each structure represents either R, S or racemic.

The term "acyclic nucleotide" refers to any nucleotide having an acyclic ribose sugar, for example, where any of bonds between the ribose carbons (e.g., C1'-C2', C2'-C3', C3'-C4', C4'-O4', or C1'-O4') is absent and/or at least one of ribose carbons or oxygen (e.g., C1', C2', C3', C4' or O4') are independently or in combination absent from the nucleotide.

In some embodiments, acyclic nucleotide is

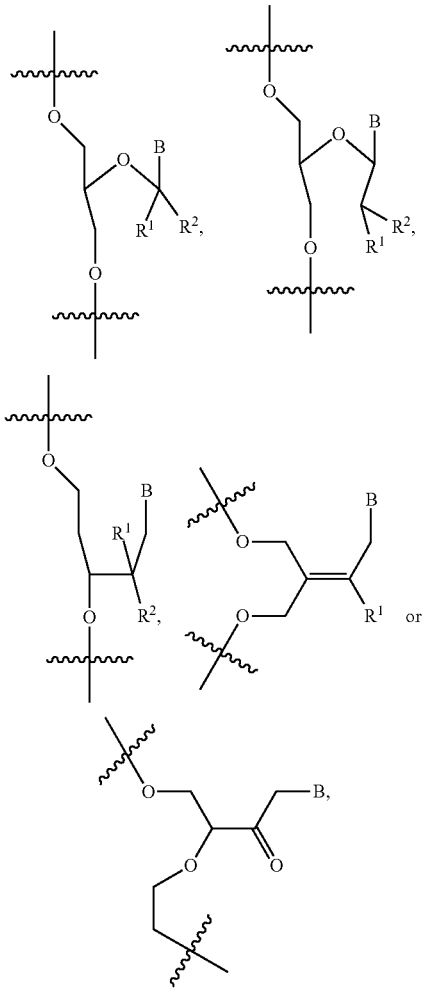

wherein B is a modified or unmodified nucleobase, $R^1$ and $R^2$ independently are H, halogen, $OR^3$, or alkyl; and $R^3$ is H, alkyl, cycloalkyl, aryl, aralkyl, heteroaryl or sugar). The term "UNA" refers to unlocked acyclic nucleic acid, wherein any of the bonds of the sugar has been removed, forming an unlocked "sugar" residue. In one example, UNA also encompasses monomers with bonds between C1'-C4' being removed (i.e. the covalent carbon-oxygen-carbon bond between the C1' and C4' carbons). In another example, the C2'-C3' bond (i.e. the covalent carbon-carbon bond between the C2' and C3' carbons) of the sugar is removed (see Mikhailov et. al., Tetrahedron Letters, 26 (17): 2059 (1985); and Fluiter et al., Mol. Biosyst., 10:1039 (2009), which are hereby incorporated by reference in their entirety). The acyclic derivative provides greater backbone flexibility without affecting the Watson-Crick pairings. The acyclic nucleotide can be linked via 2'-5' or 3'-5' linkage.

The term 'GNA' refers to glycol nucleic acid which is a polymer similar to DNA or RNA but differing in the composition of its "backbone" in that is composed of repeating glycerol units linked by phosphodiester bonds:

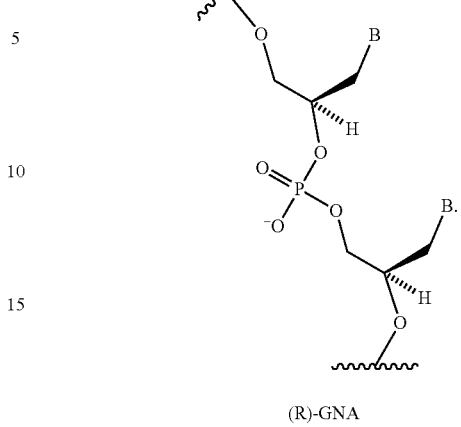

(R)-GNA

The thermally destabilizing modification of the duplex can be mismatches (i.e., noncomplementary base pairs) between the thermally destabilizing nucleotide and the opposing nucleotide in the opposite strand within the dsRNA duplex. Exemplary mismatch base pairs include G:G, G:A, G:U, G:T, A:A, A:C, C:C, C:U, C:T, U:U, T:T, U:T, or a combination thereof. Other mismatch base pairings known in the art are also amenable to the present invention. A mismatch can occur between nucleotides that are either naturally occurring nucleotides or modified nucleotides, i.e., the mismatch base pairing can occur between the nucleobases from respective nucleotides independent of the modifications on the ribose sugars of the nucleotides. In certain embodiments, the dsRNA molecule comprises at least one nucleobase in the mismatch pairing that is a 2'-deoxy nucleobase; e.g., the 2'-deoxy nucleobase is in the sense strand.

In some embodiments, the thermally destabilizing modification in the seed region of the antisense strand includes nucleotides with impaired W—C H-bonding to complementary base on the target mRNA. Exemplary, nucleotides with impaired W—C H-bonding to complementary base on the target mRNA include, but are not limited to, nucleotides comprising a nucleobase independently selected from the following:

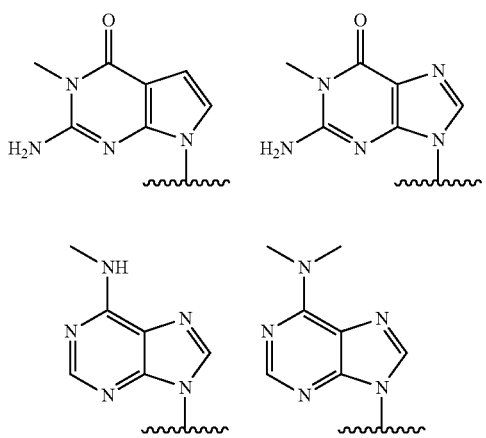

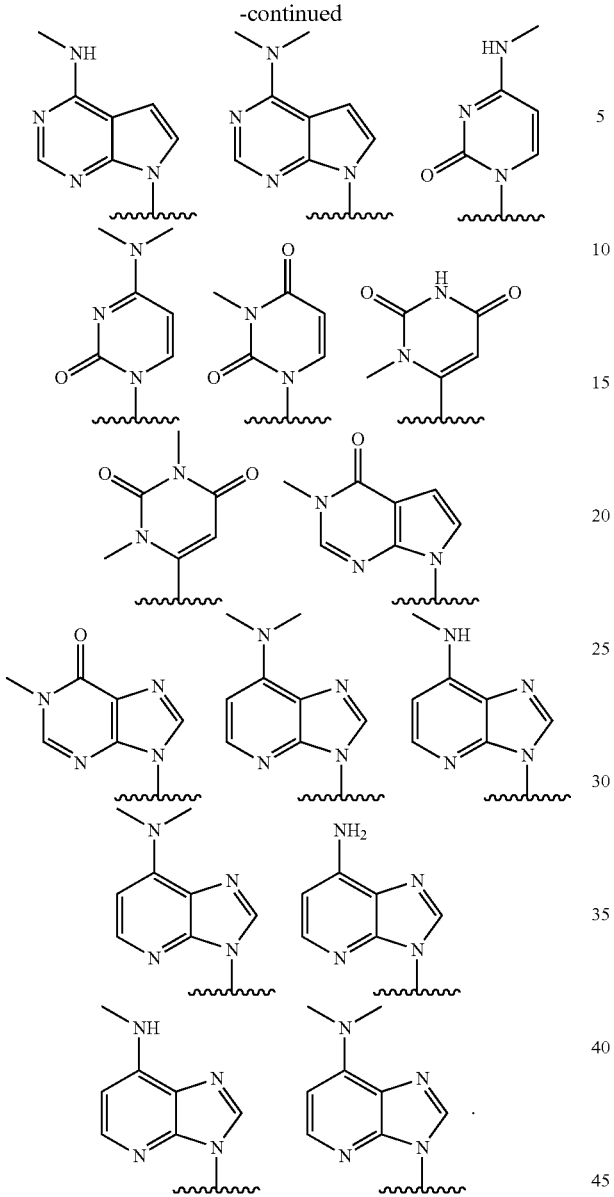

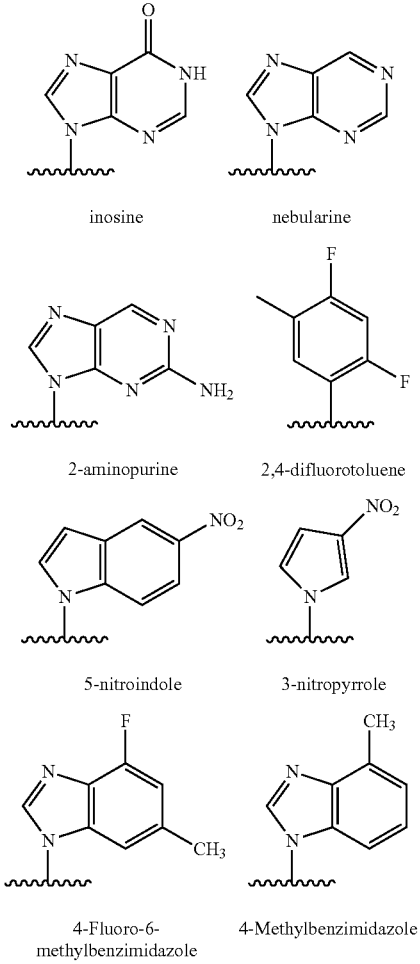

inosine  nebularine 2-aminopurine  2,4-difluorotoluene 5-nitroindole  3-nitropyrrole 4-Fluoro-6-methylbenzimidazole  4-Methylbenzimidazole Additional examples of abasic nucleotide, acyclic nucleotide modifications (including UNA and GNA), and mismatch modifications have been described in detail in WO 2011/133876, which is herein incorporated by reference in its entirety.

The thermally destabilizing modifications can also include a universal nucleobase with reduced or abolished capability to form hydrogen bonds with the opposing bases, and phosphate modifications.

In some embodiments, the thermally destabilizing modification includes nucleotides with non-canonical bases such as, but not limited to, nucleobase modifications with impaired or completely abolished capability to form hydrogen bonds with bases in the opposite strand. These nucleobase modifications have been evaluated for destabilization of the central region of the dsRNA duplex as described in WO 2010/0011895, which is herein incorporated by reference in its entirety. Exemplary such nucleobase modifications are:

In some embodiments, the thermally destabilizing modification includes one or more -nucleotide complementary to the base on the target mRNA, such as:

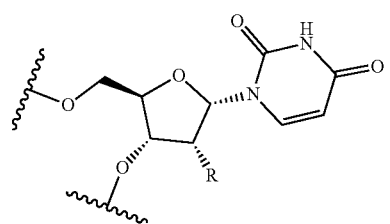

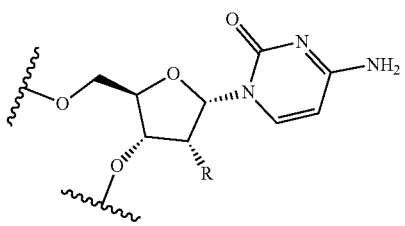

-continued

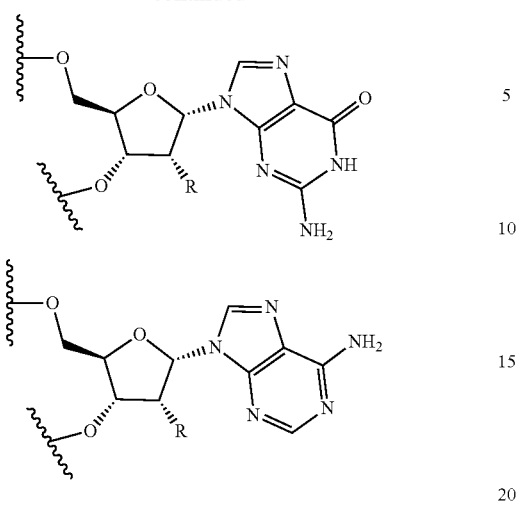

wherein R is H, OH, OCH₃, F, NH₂, NHMe, NMe₂ or O-alkyl

Exemplary phosphate modifications known to decrease the thermal stability of dsRNA duplexes compared to natural phosphodiester linkages include, but are not limited to, the following:

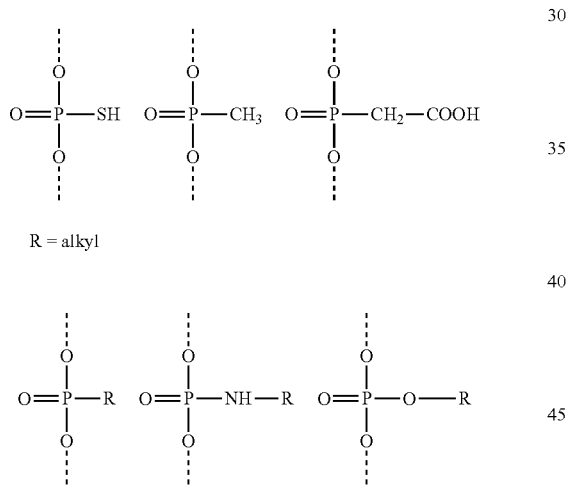

R = alkyl

The alkyl for the R group can be a $C_1$-$C_6$ alkyl. Specific alkyls for the R group include, but are not limited to methyl, ethyl, propyl, isopropyl, butyl, pentyl and hexyl.

In some embodiments, the destabilizing modification is selected from the following:

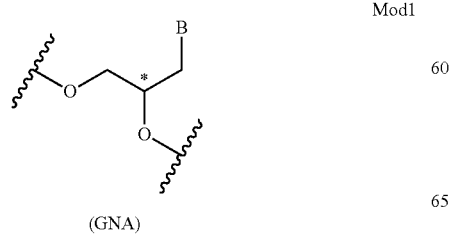

(GNA)

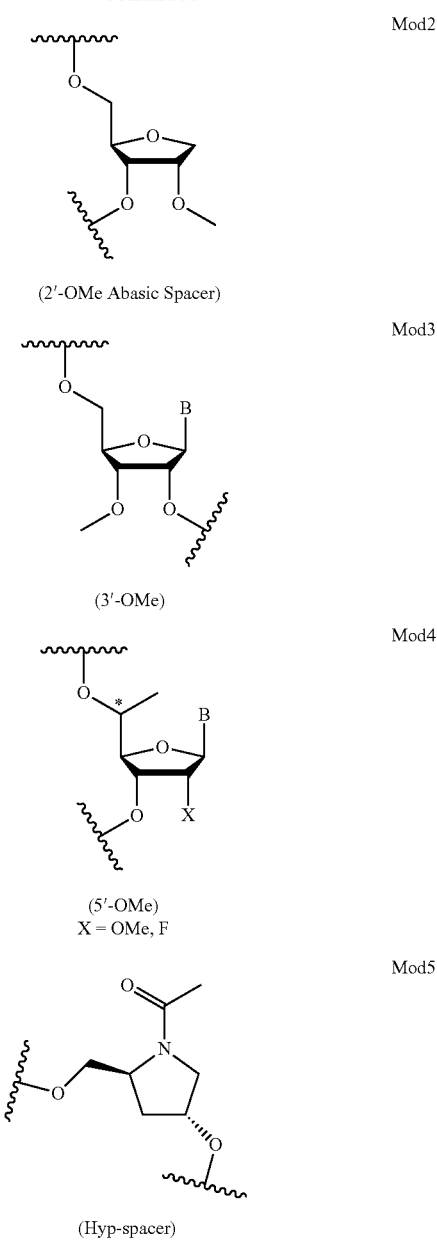

(2'-OMe Abasic Spacer)

(3'-OMe)

(5'-OMe)
X = OMe, F (Hyp-spacer)

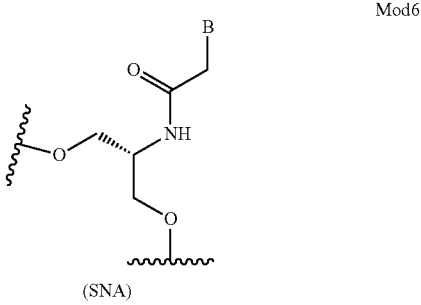

(SNA)

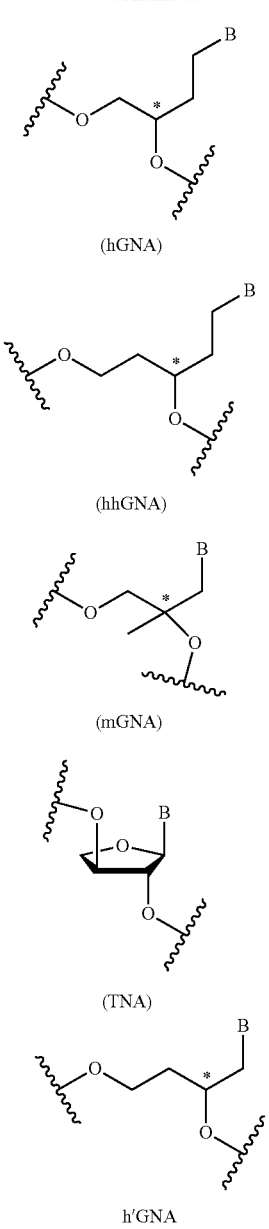

*Both stereoisomers tested

In some embodiments, the antisense strand comprises at least one stabilizing modification adjacent to the destabilizing modification. For example, the stabilizing modification can be the nucleotide at the 5'-end or the 3'-end of the destabilizing modification, i.e., at position −1 or +1 from the position of the destabilizing modification. In some embodiments, the antisense strand comprises a stabilizing modification at each of the 5'-end and the 3'-end of the destabilizing modification, i.e., positions −1 and +1 from the position of the destabilizing modification.

In some embodiments, the antisense strand comprises at least two stabilizing modifications at the 3'-end of the destabilizing modification, i.e., at positions +1 and +2 from the position of the destabilizing modification.

In some embodiments, the sense strand does not comprise a thermally stabilizing modification in position opposite or complimentary to the thermally destabilizing modification of the duplex in the antisense strand.

In some embodiments, the antisense strand comprises at least one 2'-fluoro nucleotide adjacent to the destabilizing modification. For example, the 2'-fluoro nucleotide can be the nucleotide at the 5'-end or the 3'-end of the destabilizing modification, i.e., at position −1 or +1 from the position of the destabilizing modification. In some embodiments, the antisense strand comprises a 2'-fluoro nucleotide at each of the 5'-end and the 3'-end of the destabilizing modification, i.e., positions −1 and +1 from the position of the destabilizing modification.

In some embodiments, the antisense strand comprises at least two 2'-fluoro nucleotides at the 3'-end of the destabilizing modification, i.e., at positions +1 and +2 from the position of the destabilizing modification.

In some embodiments, the sense strand does not comprise a 2'-fluoro nucleotide in position opposite or complimentary to the thermally destabilizing modification of the duplex in the antisense strand.

In some embodiments, every nucleotide in the sense strand and/or the antisense strand of the dsRNA molecule can be modified. Each nucleotide can be modified with the same or different modification which can include one or more alteration of one or both of the non-linking phosphate oxygens and/or of one or more of the linking phosphate oxygens; alteration of a constituent of the ribose sugar, e.g., of the 2' hydroxyl on the ribose sugar; wholesale replacement of the phosphate moiety with "dephospho" linkers; modification or replacement of a naturally occurring base; and replacement or modification of the ribose-phosphate backbone.

As nucleic acids are polymers of monomers, many of the modifications occur at a position which is repeated within a nucleic acid, e.g., a modification of a base, or a phosphate moiety, or a non-linking O of a phosphate moiety. In some cases, the modification will occur at all of the subject positions in the nucleic acid but in many cases it will not. By way of example, a modification may only occur at a 3' or 5' terminal position, may only occur in a terminal region, e.g., at a position on a terminal nucleotide or in the last 2, 3, 4, 5, or 10 nucleotides of a strand. A modification may occur in a double strand region, a single strand region, or in both. A modification may occur only in the double strand region of a RNA or may only occur in a single strand region of a RNA. For example, a phosphorothioate modification at a non-linking O position may only occur at one or both termini, may only occur in a terminal region, e.g., at a position on a terminal nucleotide or in the last 2, 3, 4, 5, or 10 nucleotides of a strand, or may occur in double strand and single strand regions, particularly at termini. The 5' end or ends can be phosphorylated.

It may be possible, e.g., to enhance stability, to include particular bases in overhangs, or to include modified nucleotides or nucleotide surrogates, in single strand overhangs, e.g., in a 5' or 3' overhang, or in both. E.g., it can be desirable to include purine nucleotides in overhangs. In some embodiments all or some of the bases in a 3' or 5' overhang may be modified, e.g., with a modification described herein. Modifications can include, e.g., the use of modifications at the 2' position of the ribose sugar with modifications that are known in the art, e.g., the use of deoxyribonucleotides, 2'-deoxy-2'-fluoro (2'-F) or 2'-O-methyl modified instead of the ribosugar of the nucleobase, and modifications in the phosphate group, e.g., phosphorothioate modifications. Overhangs need not be homologous with the target sequence.

In some embodiments, each residue of the sense strand and antisense strand is independently modified with LNA, HNA, CeNA, 2'-methoxyethyl, 2'-O-methyl, 2'-O-allyl, 2'-C-allyl, 2'-deoxy, or 2'-fluoro. The strands can contain more than one modification. In some embodiments, each residue of the sense strand and antisense strand is independently modified with 2'-O-methyl or 2'-fluoro. It is to be understood that these modifications are in addition to the altritol nucleotide(s) present in the dsRNA In some embodiments, at least two different modifications, in addition to altritol nucleosides(s) can be present on the sense strand and/or antisense strand. Those two modifications can be the 2'-deoxy, 2'-O-methy, 2'-fluoro modifications, acyclic nucleotides or others. In some embodiments, the sense strand and antisense strand each comprises two differently modified nucleotides selected from 2'-O-methyl, 2'-fluoro and/or 2'-deoxy. In some embodiments, each residue of the sense strand and antisense strand is independently modified with 2'-O-methyl nucleotide, 2'-deoxy nucleotide, 2'-deoxy-2'-fluoro nucleotide, 2'-O—N-methylacetamido (2'-O-NMA) nucleotide, a 2'-O-dimethylaminocthoxyethyl (2'-O-DMAEOE) nucleotide, 2'-O-aminopropyl (2'-O-AP) nucleotide, or 2'-ara-F nucleotide. Again, it is to be understood that these modifications are in addition to the altritol nucleotide(s) present in the dsRNA.

In some embodiments, the dsRNA molecule comprises modifications of an alternating pattern, particular in the B1, B2, B3, B1', B2', B3', B4' regions. The term "alternating motif" or "alternative pattern" as used herein refers to a motif having one or more modifications, each modification occurring on alternating nucleotides of one strand. The alternating nucleotide may refer to one per every other nucleotide or one per every three nucleotides, or a similar pattern. For example, if A, B and C each represent one type of modification to the nucleotide, the alternating motif can be "ABABABABABAB . . . ," "AABBAABBAABB . . . ," "AABAABAABAAB . . . ," "AAABAAABAAAB . . . ," "AAABBBAAABBB . . . ," or "ABCABCABCABC . . . ," etc.

The type of modifications contained in the alternating motif may be the same or different. For example, if A, B, C, D each represent one type of modification on the nucleotide, the alternating pattern, i.e., modifications on every other nucleotide, may be the same, but each of the sense strand or antisense strand can be selected from several possibilities of modifications within the alternating motif such as "ABABAB . . . ", "ACACAC . . . " "BDBDBD . . . " or "CDCDCD . . . ," etc.

In some embodiments, the dsRNA molecule comprises the modification pattern for the alternating motif on the sense strand relative to the modification pattern for the alternating motif on the antisense strand is shifted. The shift may be such that the modified group of nucleotides of the sense strand corresponds to a differently modified group of nucleotides of the antisense strand and vice versa. For example, the sense strand when paired with the antisense strand in the dsRNA duplex, the alternating motif in the sense strand may start with "ABABAB" from 5'-3' of the strand and the alternating motif in the antisense strand may start with "BABABA" from 3'-5' of the strand within the duplex region. As another example, the alternating motif in the sense strand may start with "AABBAABB" from 5'-3' of the strand and the alternating motif in the antisense strand may start with "BBAABBAA" from 3'-5' of the strand within the duplex region, so that there is a complete or partial shift of the modification patterns between the sense strand and the antisense strand.

In some embodiments, the dsRNA molecule comprises mismatch(es) with the target, within the duplex, or combinations thereof. The mismatch can occur in the overhang region or the duplex region. The base pair can be ranked on the basis of their propensity to promote dissociation or melting (e.g., on the free energy of association or dissociation of a particular pairing, the simplest approach is to examine the pairs on an individual pair basis, though next neighbor or similar analysis can also be used). In terms of promoting dissociation: A:U is preferred over G:C; G:U is preferred over G:C; and I:C is preferred over G:C (I=inosine). Mismatches, e.g., non-canonical or other than canonical pairings (as described elsewhere herein) are preferred over canonical (A:T, A:U, G:C) pairings; and pairings which include a universal base are preferred over canonical pairings.

In some embodiments, the dsRNA molecule comprises at least one of the first 1, 2, 3, 4, or 5 base pairs within the duplex regions from the 5'-end of the antisense strand can be chosen independently from the group of: A:U, G:U, I:C, and mismatched pairs, e.g., non-canonical or other than canonical pairings or pairings which include a universal base, to promote the dissociation of the antisense strand at the 5'-end of the duplex.

In some embodiments, the nucleotide at the 1 position within the duplex region from the 5'-end in the antisense strand is selected from the group consisting of A, dA, dU, U, and dT. Alternatively, at least one of the first 1, 2 or 3 base pair within the duplex region from the 5'-end of the antisense strand is an AU base pair. For example, the first base pair within the duplex region from the 5'-end of the antisense strand is an AU base pair.

Without wishing to be bound by a theory, introducing 4'-modified and/or 5'-modified nucleotides to the 3'-end of a phosphodiester (PO), phosphorothioate (PS), and/or phosphorodithioate (PS2) linkage of a dinucleotide at any position of single stranded or double stranded oligonucleotide can exert steric effect to the internucleotide linkage and, hence, protecting or stabilizing it against nucleases.

In some embodiments, 5'-modified nucleoside is introduced at the 3'-end of a dinucleotide at any position of the dsRNA molecule. For instance, a 5'-alkylated nucleoside can be introduced at the 3'-end of a dinucleotide at any position of the dsRNA. The alkyl group at the 5' position of the ribose sugar can be racemic or chirally pure R or S isomer. An exemplary 5'-alkylated nucleoside is 5'-methyl nucleoside. The 5'-methyl can be either racemic or chirally pure R or S isomer.

In some embodiments, a 4'-modified nucleoside is introduced at the 3'-end of a dinucleotide at any position of the dsRNA. For instance, a 4'-alkylated nucleoside may be introduced at the 3'-end of a dinucleotide at any position of dsRNA. The alkyl group at the 4' position of the ribose sugar can be racemic or chirally pure R or S isomer. An exemplary 4'-alkylated nucleoside is 4'-methyl nucleoside. The 4'-methyl can be either racemic or chirally pure R or S isomer. Alternatively, a 4'-O-alkylated nucleoside may be introduced at the 3'-end of a dinucleotide at any position of single stranded or double stranded siRNA. The 4'-O-alkyl of the ribose sugar can be racemic or chirally pure R or S isomer. An exemplary 4'-O-alkylated nucleoside is 4'-O-methyl nucleoside. The 4'-O-methyl can be either racemic or chirally pure R or S isomer.

In some embodiments, a 5'-alkylated nucleoside is introduced at any position on the sense strand or antisense strand of the dsRNA, and such modification maintains or improves potency of the dsRNA. The 5'-alkyl can be either racemic or chirally pure R or S isomer. An exemplary 5'-alkylated nucleoside is 5'-methyl nucleoside. The 5'-methyl can be either racemic or chirally pure R or S isomer.

In some embodiments, a 4'-alkylated nucleoside is introduced at any position on the sense strand or antisense strand of the dsRNA, and such modification maintains or improves potency of the dsRNA. The 4'-alkyl can be either racemic or chirally pure R or S isomer. An exemplary 4'-alkylated nucleoside is 4'-methyl nucleoside. The 4'-methyl can be either racemic or chirally pure R or S isomer.

In some embodiments, a 4'-O-alkylated nucleoside is introduced at any position on the sense strand or antisense strand of the dsRNA, and such modification maintains or improves potency of the dsRNA. The 5'-alkyl can be either racemic or chirally pure R or S isomer. An exemplary 4'-O-alkylated nucleoside is 4'-O-methyl nucleoside. The 4'-O-methyl can be either racemic or chirally pure R or S isomer.

In some embodiments, the dsRNA molecule can comprise 2'-5' linkages (with 2'-H, 2'-OH and 2'-OMe and with P=O or P=S). For example, the 2'-5' linkages modifications can be used to promote nuclease resistance or to inhibit binding of the sense to the antisense strand, or can be used at the 5' end of the sense strand to avoid sense strand activation by RISC. In some embodiments, the sense strand comprises a 2'-5'-linkage between positions N−1 and N−2, counting from 5'-end.

In some embodiments, the dsRNA molecule can comprise L sugars (e.g., L ribose, L-arabinose with 2'-H, 2'-OH and 2'-OMe). For example, these L sugars modifications can be used to promote nuclease resistance or to inhibit binding of the sense to the antisense strand, or can be used at the 5' end of the sense strand to avoid sense strand activation by RISC. In some embodiments, the sense strand comprises a L sugar nucleotide at the 5'-end.

Accordingly, at least one of the sense stand and the antisense can comprise at least one, e.g., at least two, at least three, at least four, at least five, at least six, at least seven or more, 2'-deoxy modification in positions 5-17, e.g., positions 6-16, positions 6-15, positions 6-14, positions 6-13, positions 6-12, positions 7-15, positions 7-14, positions 7-13, positions, 7-12, positions 8-16, positions 8-15, positions 8-14, positions 8-13, positions 8-12, positions 9-16, positions 9-15, positions 9-14, positions 9-13, positions 9-12, positions 10-16, positions 10-15, positions 10-14, positions 10-13 or positions 10-12, counting from the S'-end of the sense strand or the antisense strand.

In some embodiments, the dsRNA comprises at least three 2'-deoxy modifications, wherein the 2'-deoxy modifications are at positions 2 and 14 of the antisense strand, counting from 5'-end of the antisense strand, and at position 11 of the sense strand, counting from 5'-end of the sense strand.

In some embodiments, the dsRNA comprises at least five 2'-deoxy modifications, wherein the 2'-deoxy modifications are at positions 2, 12 and 14 of the antisense strand, counting from 5'-end of the antisense strand, and at positions 9 and 11 of the sense strand, counting from 5'-end of the sense strand.

In some embodiments, the dsRNA comprises at least seven 2'-deoxy modifications, wherein the 2'-deoxy modifications are at positions 2, 5, 7, 12 and 14 of the antisense strand, counting from 5'-end of the antisense strand, and at positions 9 and 11 of the sense strand, counting from 5'-end of the sense strand.

In some embodiments, the antisense strand comprises at least five 2'-deoxy modifications at positions 2, 5, 7, 12 and 14, counting from 5'-end of the antisense strand. In some further embodiments of this, the antisense strand has a length of 18-25 nucleotides, preferably, a length of 18-23 nucleotides.

In some embodiments, the dsRNA agent can comprise one or more non-natural nucleotides. For example, the dsRNA agent can comprise less than 20%, e.g., less than 15%, less than 10%, or less than 5% non-natural nucleotides, or the dsRNA comprises no non-natural nucleotides. For example, the dsRNA agent comprises all natural nucleotides. Some exemplary non-natural nucleotides include, but are not limited to, acyclic nucleotides, locked nucleic acid (LNA), HNA, CeNA, 2'-methoxyethyl, 2'-O-allyl, 2'-C-allyl, 2'-fluoro, 2'-O—N-methylacetamido (2'-O-NMA), a 2'-O-dimethylaminoethoxyethyl (2'-O-DMAEOE), 2'-O-aminopropyl (2'-O-AP), and 2'-ara-F.

Ligands

A wide variety of entities can be coupled to the oligonucleotides of the present invention. Preferred moieties are ligands, which are coupled, preferably covalently, either directly or indirectly via an intervening tether.

In preferred embodiments, a ligand alters the distribution, targeting or lifetime of the molecule into which it is incorporated. In preferred embodiments a ligand provides an enhanced affinity for a selected target, e.g., molecule, cell or cell type, compartment, receptor e.g., a cellular or organ compartment, tissue, organ or region of the body, as, e.g., compared to a species absent such a ligand. Ligands providing enhanced affinity for a selected target are also termed targeting ligands.

Some ligands can have endosomolytic properties. The endosomolytic ligands promote the lysis of the endosome and/or transport of the composition of the invention, or its components, from the endosome to the cytoplasm of the cell. The endosomolytic ligand may be a polyanionic peptide or peptidomimetic which shows pH-dependent membrane activity and fusogenicity. In some embodiments, the endosomolytic ligand assumes its active conformation at endosomal pH. The "active" conformation is that conformation in which the endosomolytic ligand promotes lysis of the endosome and/or transport of the composition of the invention, or its components, from the endosome to the cytoplasm of the cell. Exemplary endosomolytic ligands include the GALA peptide (Subbarao et al., Biochemistry, 1987, 26:2964-2972, which is incorporated by reference in its entirety), the EALA peptide (Vogel et al., J. Am. Chem. Soc., 1996, 118:1581-1586, which is incorporated by reference in its entirety), and their derivatives (Turk et al., Biochem. Biophys. Acta, 2002, 1559:56-68, which is incorporated by reference in its entirety). In some embodiments, the endosomolytic component may contain a chemical group (e.g., an amino acid) which will undergo a change in charge or protonation in response to a change in pH. The endosomolytic component may be linear or branched.

Ligands can improve transport, hybridization, and specificity properties and may also improve nuclease resistance of the resultant natural or modified oligoribonucleotide, or a polymeric molecule comprising any combination of monomers described herein and/or natural or modified ribonucleotides.

Ligands in general can include therapeutic modifiers, e.g., for enhancing uptake; diagnostic compounds or reporter groups e.g., for monitoring distribution; cross-linking agents; and nuclease-resistance conferring moieties. General examples include lipids, steroids, vitamins, sugars, proteins, peptides, polyamines, and peptide mimics.

Ligands can include a naturally occurring substance, such as a protein (e.g., human serum albumin (HSA), low-density lipoprotein (LDL), high-density lipoprotein (HDL), or globulin); a carbohydrate (e.g., a dextran, pullulan, chitin, chitosan, inulin, cyclodextrin or hyaluronic acid); or a lipid. The ligand may also be a recombinant or synthetic molecule, such as a synthetic polymer, e.g., a synthetic polyamino acid, an oligonucleotide (e.g. an aptamer). Examples of polyamino acids include polyamino acid is a polylysine (PLL), poly L-aspartic acid, poly L-glutamic acid, styrene-maleic acid anhydride copolymer, poly(L-lactide-co-glycolide) copolymer, divinyl ether-maleic anhydride copolymer, N-(2-hydroxypropyl) methacrylamide copolymer (HMPA), polyethylene glycol (PEG), polyvinyl alcohol (PVA), polyurethane, poly(2-ethylacryllic acid), N-isopropylacrylamide polymers, or polyphosphazine. Example of polyamines include: polyethylenimine, polylysine (PLL), spermine, spermidine, polyamine, pseudopeptide-polyamine, peptidomimetic polyamine, dendrimer polyamine, arginine, amidine, protamine, cationic lipid, cationic porphyrin, quaternary salt of a polyamine, or an alpha helical peptide.

Ligands can also include targeting groups, e.g., a cell or tissue targeting agent, e.g., a lectin, glycoprotein, lipid or protein, e.g., an antibody, that binds to a specified cell type such as a kidney cell. A targeting group can be a thyrotropin, melanotropin, lectin, glycoprotein, surfactant protein A, Mucin carbohydrate, multivalent lactose, multivalent galactose, N-acetyl-galactosamine, N-acetyl-glucosamine multivalent mannose, multivalent fucose, glycosylated polyamino acids, multivalent galactose, transferrin, bisphosphonate, polyglutamate, polyaspartate, a lipid, cholesterol, a steroid, bile acid, folate, vitamin B12, biotin, an RGD peptide, an RGD peptide mimetic or an aptamer. Table 2 shows some examples of targeting ligands and their associated receptors.

Other examples of ligands include dyes, intercalating agents (e.g. acridines), cross-linkers (e.g. psoralen, mitomycin C), porphyrins (TPPC4, texaphyrin, Sapphyrin), polycyclic aromatic hydrocarbons (e.g., phenazine, dihydrophenazine), artificial endonucleases or a chelating agent (e.g. EDTA), lipophilic molecules, e.g., cholesterol, cholic acid, adamantane acetic acid, 1-pyrene butyric acid, dihydrotestosterone, 1,3-Bis-O(hexadecyl)glycerol, geranyloxyhexyl group, hexadecylglycerol, borneol, menthol, 1,3-propanediol, heptadecyl group, palmitic acid, myristic acid, O3-(oleoyl) lithocholic acid, O3-(oleoyl) cholenic acid, dimethoxytrityl, or phenoxazine) and peptide conjugates (e.g., antennapedia peptide, Tat peptide), alkylating agents, phosphate, amino, mercapto, PEG (e.g., PEG-40K), MPEG, [MPEG]$_2$, polyamino, alkyl, substituted alkyl, radiolabeled markers, enzymes, haptens (e.g. biotin), transport/absorption facilitators (e.g., aspirin, vitamin E, folic acid), synthetic ribonucleases (e.g., imidazole, bisimidazole, histamine, imidazole clusters, acridine-imidazole conjugates, Eu3+ complexes of tetraazamacrocycles), dinitrophenyl, HRP, or AP.

Ligands can be proteins, e.g., glycoproteins, or peptides, e.g., molecules having a specific affinity for a co-ligand, or antibodies e.g., an antibody, that binds to a specified cell type such as a cancer cell, endothelial cell, or bone cell. Ligands may also include hormones and hormone receptors. They can also include non-peptide species, such as lipids, lectins, carbohydrates, vitamins, cofactors, multivalent lactose, multivalent galactose, N-acetyl-galactosamine, N-acetyl-glucosamine multivalent mannose, multivalent fucose, or aptamers. The ligand can be, for example, a lipopolysaccharide, an activator of p38 MAP kinase, or an activator of NF-κB.

The ligand can be a substance, e.g., a drug, which can increase the uptake of the iRNA agent into the cell, for example, by disrupting the cell's cytoskeleton, e.g., by disrupting the cell's microtubules, microfilaments, and/or intermediate filaments. The drug can be, for example, taxon, vincristine, vinblastine, cytochalasin, nocodazole, japlakinolide, latrunculin A, phalloidin, swinholide A, indanocine, or myoservin.

The ligand can increase the uptake of the oligonucleotide into the cell by activating an inflammatory response, for example. Exemplary ligands that would have such an effect include tumor necrosis factor alpha (TNF-alpha), interleukin-1 beta, or gamma interferon.

In one aspect, the ligand is a lipid or lipid-based molecule. Such a lipid or lipid-based molecule preferably binds a serum protein, e.g., human serum albumin (HSA), An HSA binding ligand allows for distribution of the conjugate to a target tissue, e.g., a non-kidney target tissue of the body. For example, the target tissue can be the liver, including parenchymal cells of the liver. Other molecules that can bind HSA can also be used as ligands. For example, naproxen or aspirin can be used. A lipid or lipid-based ligand can (a) increase resistance to degradation of the conjugate, (b) increase targeting or transport into a target cell or cell membrane, and/or (c) can be used to adjust binding to a serum protein, e.g., HSA.

A lipid based ligand can be used to modulate, e.g., control the binding of the conjugate to a target tissue. For example, a lipid or lipid-based ligand that binds to HSA more strongly will be less likely to be targeted to the kidney and therefore less likely to be cleared from the body. A lipid or lipid-based ligand that binds to HSA less strongly can be used to target the conjugate to the kidney.

In a preferred embodiment, the lipid based ligand binds HSA. Preferably, it binds HSA with a sufficient affinity such that the conjugate will be preferably distributed to a non-kidney tissue. However, it is preferred that the affinity not be so strong that the HSA-ligand binding cannot be reversed.

In another preferred embodiment, the lipid based ligand binds HSA weakly or not at all, such that the conjugate will be preferably distributed to the kidney. Other moieties that target to kidney cells can also be used in place of or in addition to the lipid based ligand.

In another aspect, the ligand is a moiety, e.g., a vitamin, which is taken up by a target cell, e.g., a proliferating cell. These are particularly useful for treating disorders characterized by unwanted cell proliferation, e.g., of the malignant or non-malignant type, e.g., cancer cells. Exemplary vitamins include vitamin A, E, and K. Other exemplary vitamins include B vitamins, e.g., folic acid, B12, riboflavin, biotin, pyridoxal or other vitamins or nutrients taken up by cancer cells. Also included are HAS, low density lipoprotein (LDL) and high-density lipoprotein (HDL).

In another aspect, the ligand is a cell-permeation agent, preferably a helical cell-permeation agent. Preferably, the agent is amphipathic. An exemplary agent is a peptide such as tat or antennapedia. If the agent is a peptide, it can be modified, including a peptidylmimetic, invertomers, non-peptide or pseudo-peptide linkages, and use of D-amino acids. The helical agent is preferably an alpha-helical agent, which preferably has a lipophilic and a lipophobic phase.

The ligand can be a peptide or peptidomimetic. A peptidomimetic (also referred to herein as an oligopeptidomimetic) is a molecule capable of folding into a defined three-dimensional structure similar to a natural peptide. The peptide or peptidomimetic moiety can be about 5-50 amino acids long, e.g., about 5, 10, 15, 20, 25, 30, 35, 40, 45, or 50 amino acids long. A peptide or peptidomimetic can be, for example, a cell permeation peptide, cationic peptide, amphipathic peptide, or hydrophobic peptide (e.g., consisting primarily of Tyr, Trp or Phe). The peptide moiety can be a dendrimer peptide, constrained peptide or cross-linked peptide. In another alternative, the peptide moiety can include a hydrophobic membrane translocation sequence (MTS). An exemplary hydrophobic MTS-containing peptide is RFGF having the amino acid sequence AAVALLPAVL-LALLAP (SEQ ID NO: 1). An RFGF analogue (e.g., amino acid sequence AALLPVLLAAP (SEQ ID NO: 2)) containing a hydrophobic MTS can also be a targeting moiety. The peptide moiety can be a "delivery" peptide, which can carry large polar molecules including peptides, oligonucleotides, and protein across cell membranes. For example, sequences from the HIV Tat protein (GRKKRRQRRRPPQ (SEQ ID NO: 3)) and the Drosophila Antennapedia protein (RQIKIWFQNRRMKWKK (SEQ ID NO: 4)) have been found to be capable of functioning as delivery peptides. A peptide or peptidomimetic can be encoded by a random sequence of DNA, such as a peptide identified from a phage-display library, or one-bead-one-compound (OBOC) combinatorial library (Lam et al., Nature, 354:82-94, 1991, which is incorporated by reference in its entirety). Preferably the peptide or peptidomimetic tethered to an iRNA agent via an incorporated monomer unit is a cell targeting peptide such as an arginine-glycine-aspartic acid (RGD)-peptide, or RGD mimic. A peptide moiety can range in length from about 5 amino acids to about 40 amino acids. The peptide moieties can have a structural modification, such as to increase stability or direct conformational properties. Any of the structural modifications described below can be utilized. An RGD peptide moiety can be used to target a tumor cell, such as an endothelial tumor cell or a breast cancer tumor cell (Zitzmann et al., Cancer Res., 62:5139-43, 2002, which is incorporated by reference in its entirety). An RGD peptide can facilitate targeting of an iRNA agent to tumors of a variety of other tissues, including the lung, kidney, spleen, or liver (Aoki et al., Cancer Gene Therapy 8:783-787, 2001, which is incorporated by reference in its entirety). Preferably, the RGD peptide will facilitate targeting of an iRNA agent to the kidney. The RGD peptide can be linear or cyclic, and can be modified, e.g., glycosylated or methylated to facilitate targeting to specific tissues. For example, a glycosylated RGD peptide can deliver an iRNA agent to a tumor cell expressing $\alpha v\beta_3$ (Haubner et al., Jour. Nucl. Med., 42:326-336, 2001, which is incorporated by reference in its entirety). Peptides that target markers enriched in proliferating cells can be used. E.g., RGD containing peptides and peptidomimetics can target cancer cells, in particular cells that exhibit an integrin. Thus, one could use RGD peptides, cyclic peptides containing RGD, RGD peptides that include D-amino acids, as well as synthetic RGD mimics. In addition to RGD, one can use other moieties that target the integrin ligand. Generally, such ligands can be used to control proliferating cells and angiogenesis. Preferred conjugates of this type ligands that targets PECAM-1, VEGF, or other cancer gene, e.g., a cancer gene described herein.

A "cell permeation peptide" is capable of permeating a cell, e.g., a microbial cell, such as a bacterial or fungal cell, or a mammalian cell, such as a human cell. A microbial cell-permeating peptide can be, for example, an α-helical linear peptide (e.g., LL-37 or Ceropin PI), a disulfide bond-containing peptide (e.g., α-defensin, β-defensin or bactenecin), or a peptide containing only one or two dominating amino acids (e.g., PR-39 or indolicidin). A cell permeation peptide can also include a nuclear localization signal (NLS). For example, a cell permeation peptide can be a bipartite amphipathic peptide, such as MPG, which is derived from the fusion peptide domain of HIV-1 gp41 and the NLS of SV40 large T antigen (Simconi et al., Nucl. Acids Res. 31:2717-2724, 2003, which is incorporated by reference in its entirety).

In some embodiments, a targeting peptide can be an amphipathic α-helical peptide. Exemplary amphipathic α-helical peptides include, but are not limited to, cecropins, lycotoxins, paradaxins, buforin, CPF, bombinin-like peptide (BLP), cathelicidins, ceratotoxins, S. clava peptides, hagfish intestinal antimicrobial peptides (HFIAPs), magainines, brevinins-2, dermaseptins, melittins, pleurocidin, $H_2A$ peptides, Xenopus peptides, esculentinis-1, and cacrins. A number of factors will preferably be considered to maintain the integrity of helix stability. For example, a maximum number of helix stabilization residues will be utilized (e.g., leu, ala, or lys), and a minimum number of helix destabilization residues will be utilized (e.g., proline, or cyclic monomeric units. The capping residue will be considered (for example Gly is an exemplary N-capping residue and/or C-terminal amidation can be used to provide an extra H-bond to stabilize the helix. Formation of salt bridges between residues with opposite charges, separated by i±3, or i±4 positions can provide stability. For example, cationic residues such as lysine, arginine, homo-arginine, ornithine or histidine can form salt bridges with the anionic residues glutamate or aspartate.

Peptide and peptidomimetic ligands include those having naturally occurring or modified peptides, e.g., D or L peptides; α, β, or γ peptides; N-methyl peptides; azapeptides; peptides having one or more amide, i.e., peptide, linkages replaced with one or more urea, thiourea, carbamate, or sulfonyl urea linkages; or cyclic peptides.

The targeting ligand can be any ligand that is capable of targeting a specific receptor. Examples are: folate, GalNAc, galactose, mannose, mannose-6P, clusters of sugars such as GalNAc cluster, mannose cluster, galactose cluster, or an aptamer. A cluster is a combination of two or more sugar units. The targeting ligands also include integrin receptor ligands, Chemokine receptor ligands, transferrin, biotin, serotonin receptor ligands, PSMA, endothelin, GCPII, somatostatin, LDL and HDL ligands. The ligands can also be based on nucleic acid, e.g., an aptamer. The aptamer can be unmodified or have any combination of modifications disclosed herein.

Endosomal release agents include imidazoles, poly or oligoimidazoles, PEIs, peptides, fusogenic peptides, polycarboxylates, polycations, masked oligo or poly cations or anions, acetals, polyacetals, ketals/polyketals, orthoesters, polymers with masked or unmasked cationic or anionic charges, dendrimers with masked or unmasked cationic or anionic charges.

PK modulator stands for pharmacokinetic modulator. PK modulator include lipophiles, bile acids, steroids, phospholipid analogues, peptides, protein binding agents, PEG, vitamins etc. Exemplary PK modulator include, but are not limited to, cholesterol, fatty acids, cholic acid, lithocholic acid, dialkylglycerides, diacylglyceride, phospholipids, sphingolipids, naproxen, ibuprofen, vitamin E, biotin etc. Oligonucleotides that comprise a number of phosphorothioate linkages are also known to bind to serum protein, thus short oligonucleotides, e.g. oligonucleotides of about 5 bases, 10 bases, 15 bases or 20 bases, comprising multiple of phosphorothioate linkages in the backbone are also amenable to the present invention as ligands (e.g. as PK modulating ligands).

In addition, aptamers that bind serum components (e.g. serum proteins) are also amenable to the present invention as PK modulating ligands.

Other ligand conjugates amenable to the invention are described in U.S. patent applications U.S. Ser. No. 10/916,185, filed Aug. 10, 2004; U.S. Ser. No. 10/946,873, filed Sep. 21, 2004; U.S. Ser. No. 10/833,934, filed Aug. 3, 2007; U.S. Ser. No. 11/115,989 filed Apr. 27, 2005 and U.S. Ser. No. 11/944,227 filed Nov. 21, 2007, which are incorporated by reference in their entireties for all purposes.

When two or more ligands are present, the ligands can all have same properties, all have different properties or some ligands have the same properties while others have different properties. For example, a ligand can have targeting properties, have endosomolytic activity or have PK modulating properties. In a preferred embodiment, all the ligands have different properties.

Ligands can be coupled to the oligonucleotides at various places, for example, 3'-end, 5'-end, and/or at an internal position. In preferred embodiments, the ligand is attached to the oligonucleotides via an intervening tether, e.g. a carrier described herein. The ligand or tethered ligand may be present on a monomer when said monomer is incorporated into the growing strand. In some embodiments, the ligand may be incorporated via coupling to a "precursor" monomer after said "precursor" monomer has been incorporated into the growing strand. For example, a monomer having, e.g., an amino-terminated tether (i.e., having no associated ligand), e.g., TAP-$(CH_2)_n NH_2$ may be incorporated into a growing oligonucleotide strand. In a subsequent operation, i.e., after incorporation of the precursor monomer into the strand, a ligand having an electrophilic group, e.g., a pentafluorophenyl ester or aldehyde group, can subsequently be attached to the precursor monomer by coupling the electrophilic group of the ligand with the terminal nucleophilic group of the precursor monomer's tether.

In another example, a monomer having a chemical group suitable for taking part in Click Chemistry reaction may be incorporated e.g., an azide or alkyne terminated tether/linker. In a subsequent operation, i.e., after incorporation of the precursor monomer into the strand, a ligand having complementary chemical group, e.g. an alkyne or azide can be attached to the precursor monomer by coupling the alkyne and the azide together.

For double-stranded oligonucleotides, ligands can be attached to one or both strands. In some embodiments, a double-stranded iRNA agent contains a ligand conjugated to the sense strand. In other embodiments, a double-stranded iRNA agent contains a ligand conjugated to the antisense strand.

In some embodiments, ligand can be conjugated to nucleobases, sugar moieties, or internucleosidic linkages of nucleic acid molecules. Conjugation to purine nucleobases or derivatives thereof can occur at any position including, endocyclic and exocyclic atoms. In some embodiments, the 2-, 6-, 7-, or 8-positions of a purine nucleobase are attached to a conjugate moiety. Conjugation to pyrimidine nucleobases or derivatives thereof can also occur at any position. In some embodiments, the 2-, 5-, and 6-positions of a pyrimidine nucleobase can be substituted with a conjugate moiety. Conjugation to sugar moieties of nucleosides can occur at any carbon atom. Example carbon atoms of a sugar moiety that can be attached to a conjugate moiety include the 2', 3', and 5' carbon atoms. The 1' position can also be attached to a conjugate moiety, such as in an abasic residue. Internucleosidic linkages can also bear conjugate moieties. For phosphorus-containing linkages (e.g., phosphodiester, phosphorothioate, phosphorodithioate, phosphoroamidate, and the like), the conjugate moiety can be attached directly to the phosphorus atom or to an O, N, or S atom bound to the phosphorus atom. For amine- or amide-containing internucleosidic linkages (e.g., PNA), the conjugate moiety can be attached to the nitrogen atom of the amine or amide or to an adjacent carbon atom.

In some embodiments, the ligand is conjugated to the sense strand. As described herein, the ligand can be conjugated at the 3'-end, 5'-end or at an internal position of the sense strand. In some embodiments, the ligand is conjugated to the 3'-end of the sense strand. Further, the ligand can be conjugated to a nucleobase, sugar moiety or internucleotide linkage of the sense strand.

Any suitable ligand in the field of RNA interference may be used, although the ligand is typically a carbohydrate e.g. monosaccharide (such as GalNAc), disaccharide, trisaccharide, tetrasaccharide, polysaccharide.

Linkers that conjugate the ligand to the nucleic acid include those discussed above. For example, the ligand can be one or more GalNAc (N-acetylgalactosamine) derivatives attached through a monovalent, bivalent or trivalent branched linker.

In some embodiments, the dsRNA of the invention is conjugated to a bivalent and trivalent branched linkers include the structures shown in any of formula (IV)-(VII):

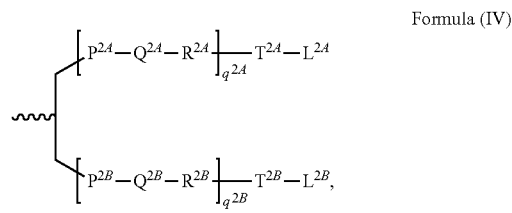

Formula (IV)

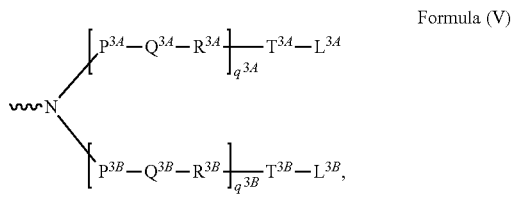

Formula (V)

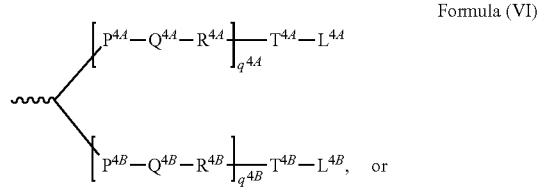

Formula (VI)

-continued

Formula (VII)

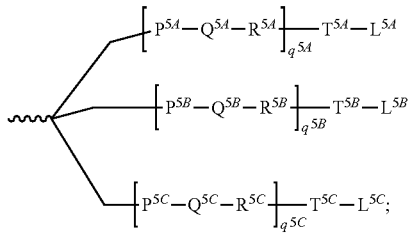

wherein:
$q^{2A}$, $q^{2B}$, $q^{3A}$, $q^{3B}$, $q^{4A}$, $q^{4B}$, $q^{5A}$, $q^{5B}$, and $q^{5C}$ represent independently for each occurrence 0-20 and wherein the repeating unit can be the same or different;

$P^{2A}$, $P^{2B}$, $P^{3A}$, $P^{3B}$, $P^{4A}$, $P^{4B}$, $P^{5A}$, $P^{5B}$, $P^{5C}$, $T^{2A}$, $T^{2B}$, $T^{3A}$, $T^{3B}$, $T^{4A}$, $T^{4B}$, $T^{5A}$, $T^{5B}$, $T^{5C}$ are each independently for each occurrence absent, CO, NH, O, S, OC(O), NHC(O), $CH_2$, $CH_2NH$ or $CH_2O$;

$Q^{2A}$, $Q^{2B}$, $Q^{3A}$, $Q^{3B}$, $Q^{4A}$, $Q^{4B}$, $Q^{5A}$, $Q^{5B}$, $Q^{5C}$ are independently for each occurrence absent, alkylene, substituted alkylene wherein one or more methylenes can be interrupted or terminated by one or more of O, S, S(O), $SO_2$, $N(R^N)$, C(R')=C(R''), C≡C or C(O);

$R^{2A}$, $R^{2B}$, $R^{3A}$, $R^{3B}$, $R^{4A}$, $R^{4B}$, $R^{5A}$, $R^{5B}$, $R^{5C}$ are each independently for each occurrence absent, NH, O, S, $CH_2$, C(O)O, C(O)NH, $NHCH(R^a)C(O)$, —C(O)—CH($R^a$)—NH—, CO, CH=N—O,

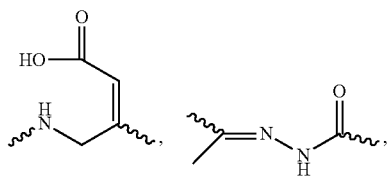

or heterocyclyl;

$L^{2A}$, $L^{2B}$, $L^{3A}$, $L^{3B}$, $L^{4A}$, $L^{4B}$, $L^{5A}$, $L^{5B}$, and $L^{5C}$ represent the ligand; i.e. each independently for each occurrence a monosaccharide (such as GalNAc), disaccharide, trisaccharide, tetrasaccharide, oligosaccharide, or polysaccharide; and $R^a$ is H or amino acid side chain.

Trivalent conjugating GalNAc derivatives are particularly useful for use with RNAi agents for inhibiting the expression of a target gene, such as those of formula (VII):

Formula (VII)

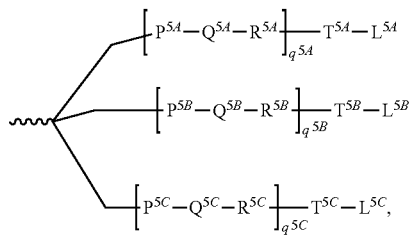

wherein $L^{5A}$, $L^{5B}$ and $L^{5C}$ represent a monosaccharide, such as GalNAc derivative.

Examples of suitable bivalent and trivalent branched linker groups conjugating GalNAc derivatives include, but are not limited to, the following compounds:

Ligand 1

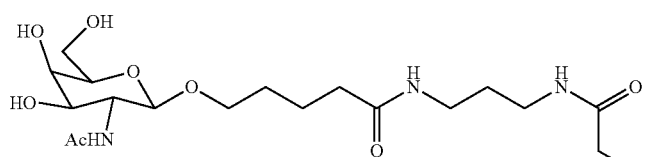
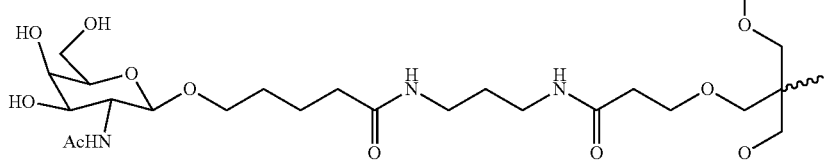
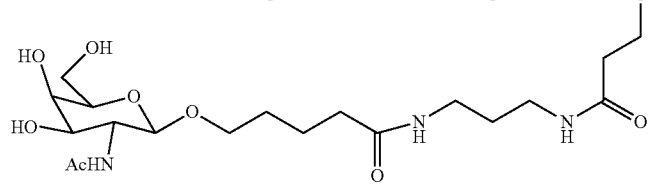

Ligand 2
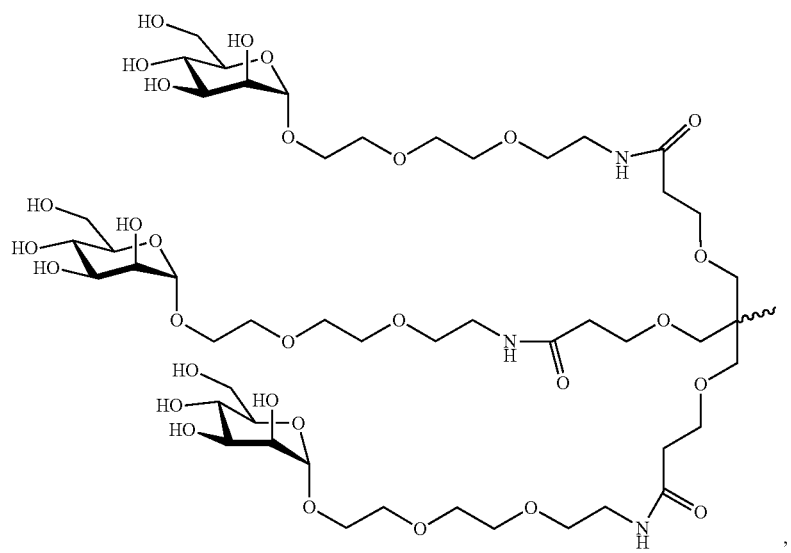
Ligand 3
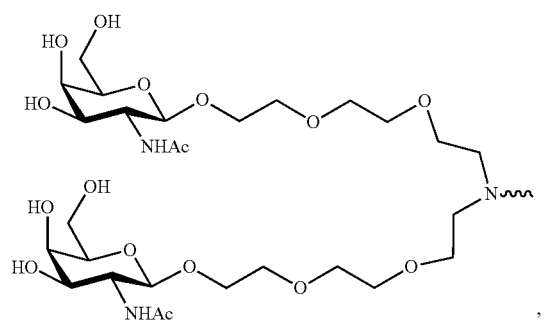
Ligand 4
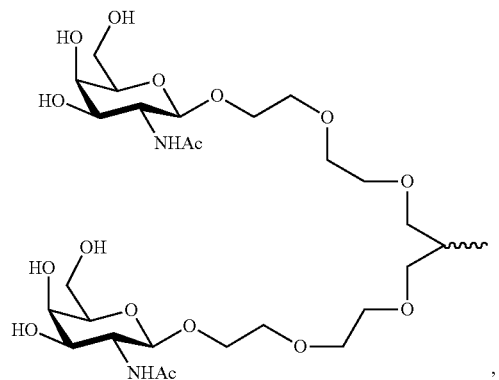
Ligand 5
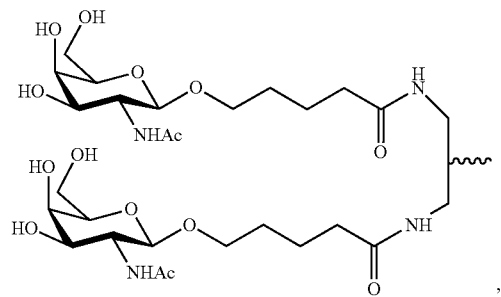

Ligand 6
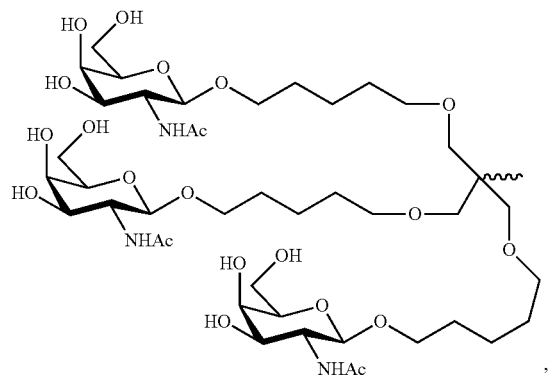
Ligand 7
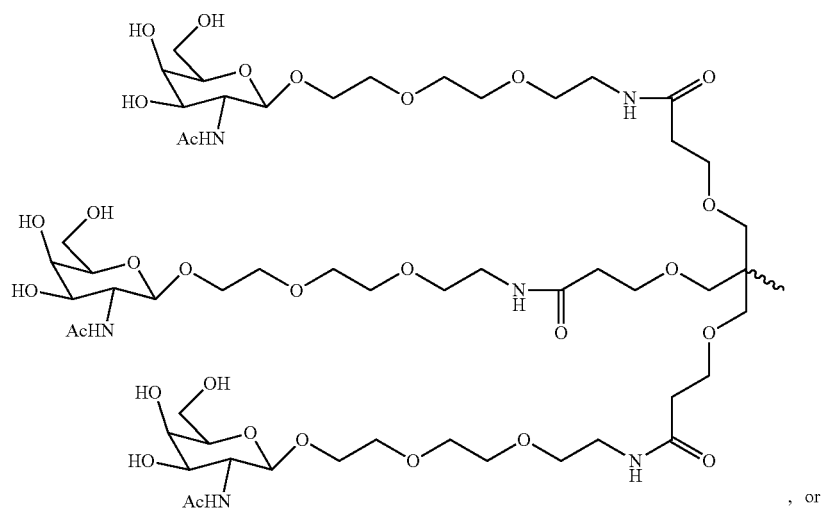
, or
Ligand 8
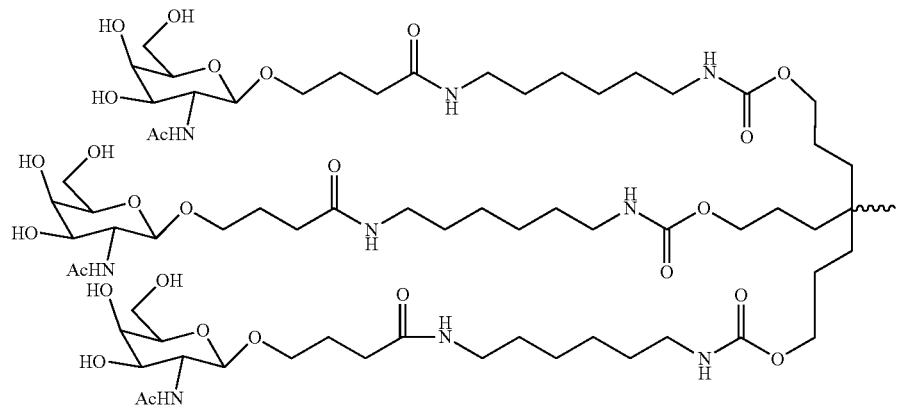

In some embodiments, a dsRNA described herein comprises Ligand 1, i.e., a ligand having the following structure;

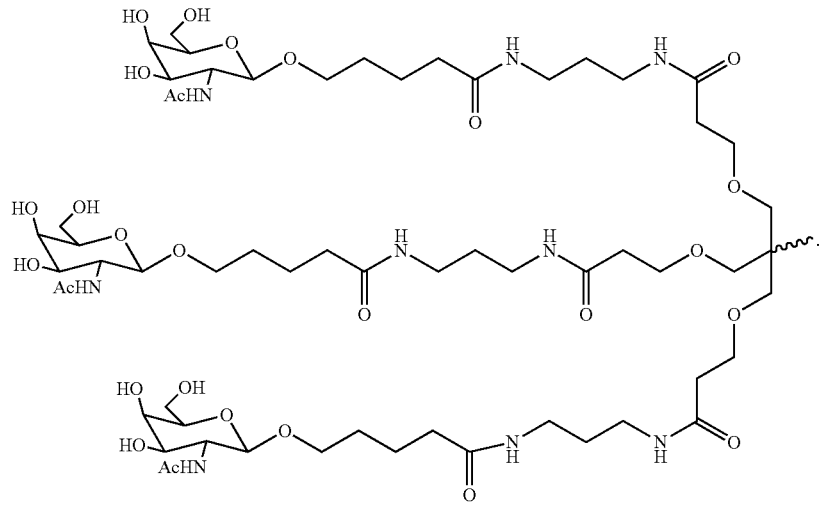 [SMILES: CC(=O)NC1C(OCCCCC(=O)NCCCNC(=O)CCOCC(C)(COCCC(=O)NCCCNC(=O)CCCCOC2OC(CO)C(O)C(O)C2NC(C)=O)COCCC(=O)NCCCNC(=O)CCCCOC2OC(CO)C(O)C(O)C2NC(C)=O)OC(CO)C(O)C1O]

In some embodiments, a dsRNA described herein comprises a ligand described in U.S. Pat. No. 5,994,517 or U.S. Pat. No. 6,906,182, content of each of which is incorporated herein by reference in its entirety.

Figure 3:
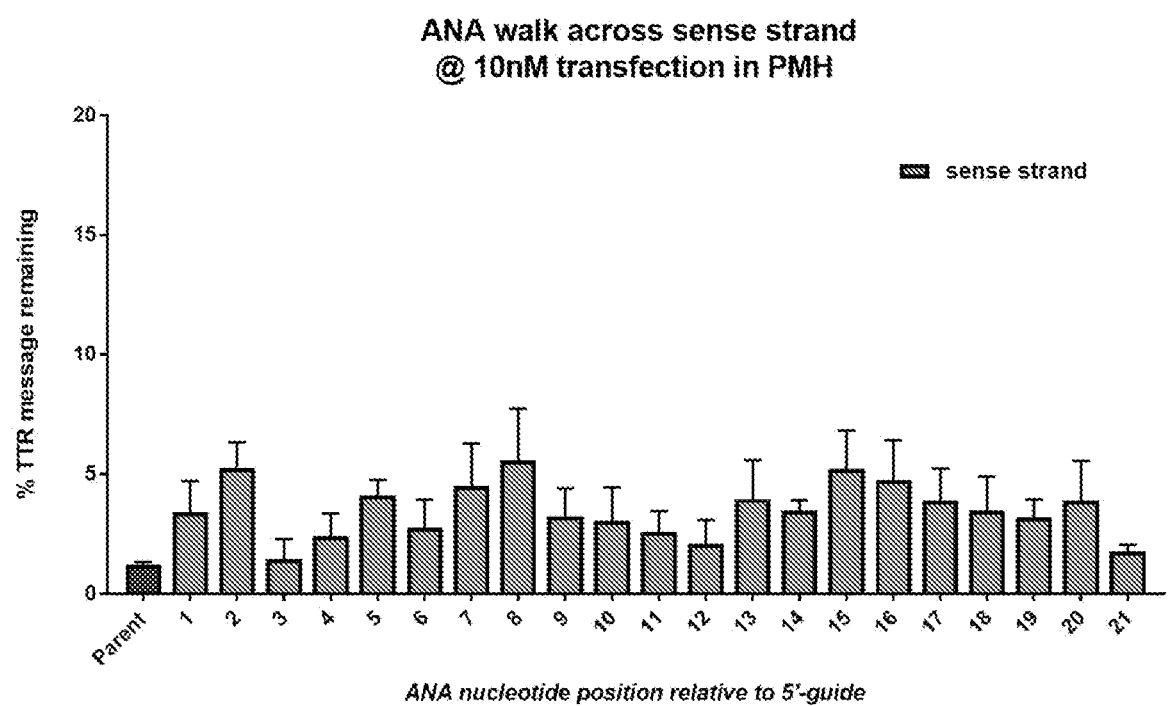
FIG. 3 is a bar graph showing the in vitro RNAi activity of duplexes with ANA in the sense strand. The nucleotide at the indicated position of the sense strand, also called the passenger strand, was substituted with the corresponding ANA nucleotide.

In some embodiments, the ligand can be a tri-antennary ligand described in FIG. 3 of U.S. Pat. No. 6,906,182. For example, a dsRNA described herein can comprise a ligand selected from the following tri-antennary ligands:

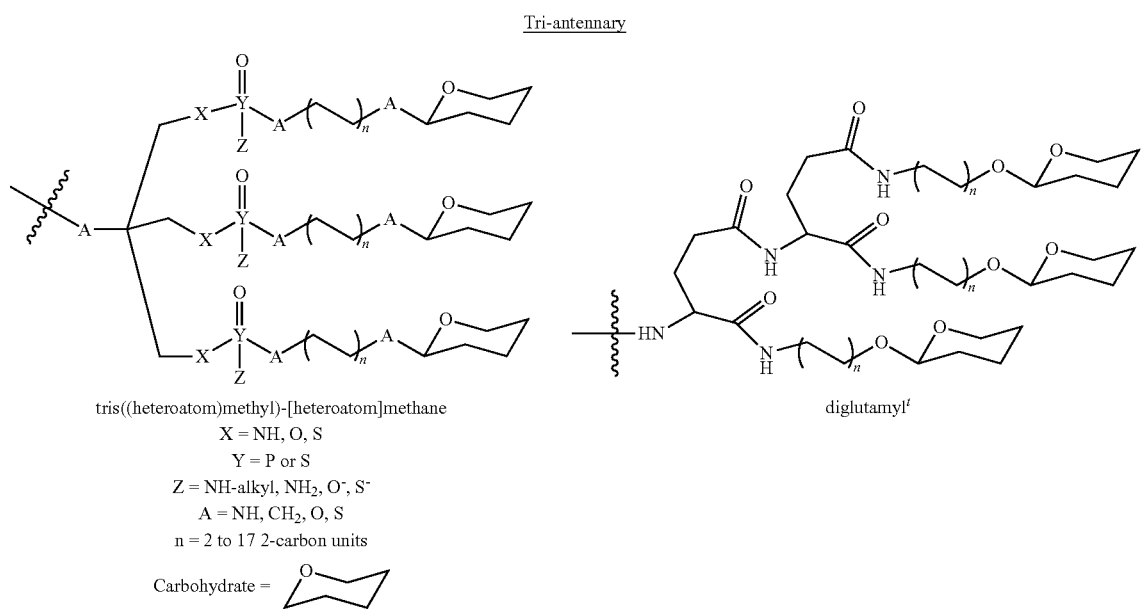

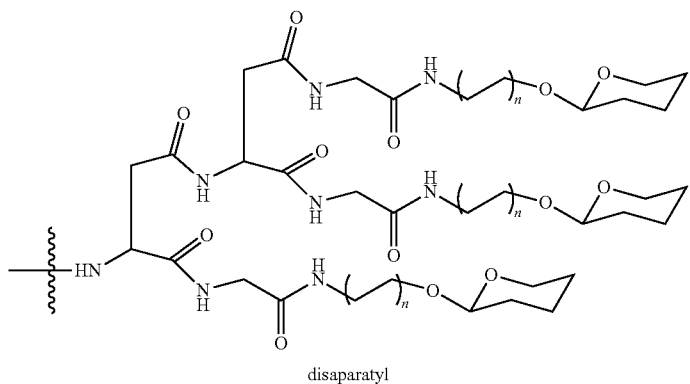

disaparatyl

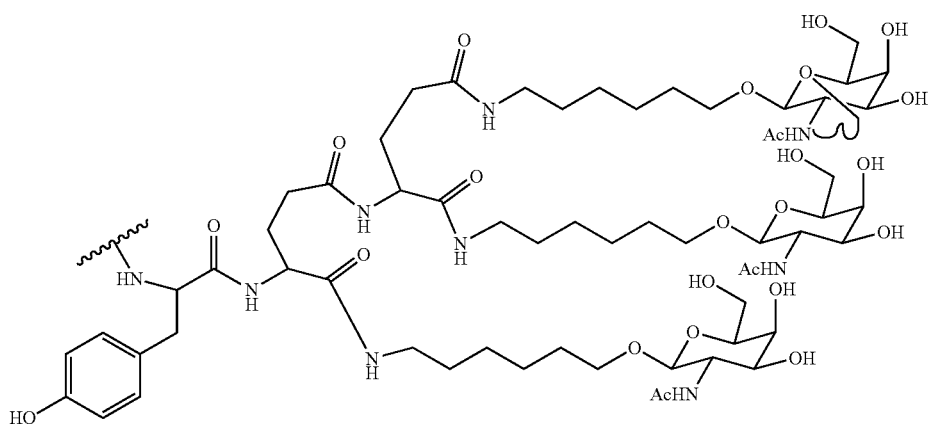

In some embodiments, the ligand is a multivalent ligand, e.g., a ligand of Formula (VII). In some further embodiments, the ligand is a GalNAc derivative, e.g., a ligand selected from the Ligands 1-8 disclosed herein.

The ligand may be attached to the dsRNA via a carrier. The carriers include (i) at least one "backbone attachment point," preferably two "backbone attachment points" and (ii) at least one "tethering attachment point." A "backbone attachment point" as used herein refers to a functional group, e.g. a hydroxyl group, or generally, a bond available for, and that is suitable for incorporation of the carrier into the backbone, e.g., the phosphate, or modified phosphate, e.g., sulfur containing, backbone, of a ribonucleic acid. A "tethering attachment point" (TAP) in some embodiments refers to a constituent ring atom of the cyclic carrier, e.g., a carbon atom or a heteroatom (distinct from an atom which provides a backbone attachment point), that connects a selected moiety. The moiety can be, e.g., a carbohydrate, e.g. monosaccharide, disaccharide, trisaccharide, tetrasaccharide, oligosaccharide and polysaccharide. Optionally, the selected moiety is connected by an intervening tether to the cyclic carrier. Thus, the cyclic carrier will often include a functional group, e.g., an amino group, or generally, provide a bond, that is suitable for incorporation or tethering of another chemical entity, e.g., a ligand to the constituent ring.

In one embodiment the dsRNA molecule of the invention is conjugated to a ligand via a carrier, wherein the carrier can be cyclic group or acyclic group; preferably, the cyclic group is selected from pyrrolidinyl, pyrazolinyl, pyrazolidinyl, imidazolinyl, imidazolidinyl, piperidinyl, piperazinyl, [1,3] dioxolane, oxazolidinyl, isoxazolidinyl, morpholinyl, thiazolidinyl, isothiazolidinyl, quinoxalinyl, pyridazinonyl, tetrahydrofuryl and decalin; preferably, the acyclic group is selected from serinol backbone or diethanolamine backbone.

The ligand can be attached to the sense strand, antisense strand or both strands, at the 3'-end, 5'-end or both ends. For instance, the ligand can be conjugated to the sense strand, in particular, the 3'-end of the sense strand.

In some embodiments, the dsRNA molecule comprises at least one ASGPR ligand. For example, the ASGPR ligand is one or more GalNAc derivatives attached through a bivalent or trivalent branched linker, such as:

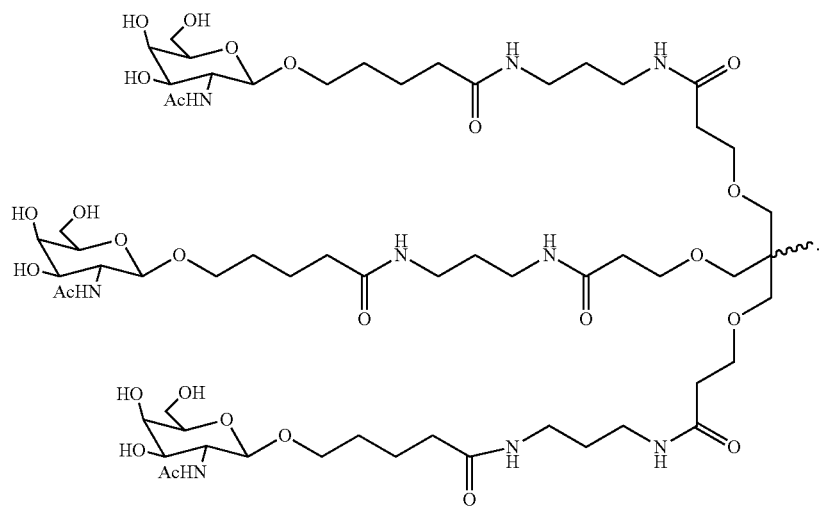 [SMILES: CC(=O)NC1C(OCCCCC(=O)NCCCNC(=O)CCOCC(C)(COCCC(=O)NCCCNC(=O)CCCCOC2OC(CO)C(O)C(O)C2NC(C)=O)COCCC(=O)NCCCNC(=O)CCCCOC2OC(CO)C(O)C(O)C2NC(C)=O)OC(CO)C(O)C1O]

In one example, the ASGPR ligand is attached to the 3' end of the sense strand.

Linkers

Aspects of the conjugates disclosed herein include linkers, which can comprise one or more linker components. The term "linker" means an organic moiety that connects two parts of a compound, e.g., a DVD immunoglobulin to a dsRNA. Linkers typically comprise a direct bond or an atom such as oxygen or sulfur, a unit such as $NR^1$, C(O), C(O)O, $C(O)NR^1$, SO, $SO_2$, $SO_2NH$ or a chain of atoms, such as substituted or unsubstituted alkyl, substituted or unsubstituted alkenyl, substituted or unsubstituted alkynyl, arylalkyl, arylalkenyl, arylalkynyl, heteroarylalkyl, heteroarylalkenyl, heteroarylalkynyl, heterocyclylalkyl, heterocyclylalkenyl, heterocyclylalkynyl, aryl, heteroaryl, heterocyclyl, cycloalkyl, cycloalkenyl, alkylarylalkyl, alkylarylalkenyl, alkylarylalkynyl, alkenylarylalkyl, alkenylarylalkenyl, alkenylarylalkynyl, alkynylarylalkyl, alkynylarylalkenyl, alkynylarylalkynyl, alkylheteroarylalkyl, alkylheteroarylalkenyl, alkylheteroarylalkynyl, alkenylheteroarylalkyl, alkenylheteroarylalkenyl, alkenylheteroarylalkynyl, alkynylheteroarylalkyl, alkynylheteroarylalkenyl, alkynylheteroarylalkynyl, alkylheterocyclylalkyl, alkylheterocyclylalkenyl, alkenylheterocyclylalkyl, alkylhererocyclylalkynyl, alkenylheterocyclylalkenyl, alkenylheterocyclylalkynyl, alkynylheterocyclylalkyl, alkynylheterocyclylalkenyl, alkynylheterocyclylalkynyl, alkylaryl, alkenylaryl, alkynylaryl, alkylheteroaryl, alkenylheteroaryl, alkynylhereroaryl, where one or more methylenes can be interrupted or terminated by O, S, S(O), $SO_2$, $N(R^1)_2$, C(O), cleavable linking group, substituted or unsubstituted aryl, substituted or unsubstituted heteroaryl, substituted or unsubstituted heterocyclic; where $R^1$ is hydrogen, acyl, aliphatic or substituted aliphatic.

Without limitations, various types of linker functionality can be included in the subject dsRNAs, including but not limited to cleavable linkers, and non-cleavable linkers, as well as reversible linkers and irreversible linkers.

In some embodiments, the linker is a cleavable linker. Cleavable linkers are those that rely on processes inside a target cell to liberate the two parts the linker is holding together, as reduction in the cytoplasm, exposure to acidic conditions in a lysosome or endosome, or cleavage by specific enzymes (e.g. proteases) within the cell. As such, cleavable linkers allow the two parts to be released in their original form after internalization and processing inside a target cell. Cleavable linkers include, but are not limited to, those whose bonds can be cleaved by enzymes (e.g., peptide linkers); reducing conditions (e.g., disulfide linkers); or acidic conditions (e.g., hydrazones and carbonates).

Generally, the cleavable linker comprises at least one cleavable linking group. A cleavable linking group is one which is sufficiently stable outside the cell, but which upon entry into a target cell is cleaved to release the two parts the linker is holding together. In a preferred embodiment, the cleavable linking group is cleaved at least 10 times or more, preferably at least 100 times faster in the target cell or under a first reference condition (which can, e.g., be selected to mimic or represent intracellular conditions) than in the blood or serum of a subject, or under a second reference condition (which can, e.g., be selected to mimic or represent conditions found in the blood or serum).

Cleavable linking groups are susceptible to cleavage agents, e.g., pH, redox potential or the presence of degradative molecules. Generally, cleavage agents are more prevalent or found at higher levels or activities inside cells than in serum or blood. Examples of such degradative agents include: redox agents which are selected for particular substrates or which have no substrate specificity, including, e.g., oxidative or reductive enzymes or reductive agents such as mercaptans, present in cells, that can degrade a redox cleavable linking group by reduction; esterases; endosomes or agents that can create an acidic environment, e.g., those that result in a pH of five or lower; enzymes that can hydrolyze or degrade an acid cleavable linking group by acting as a general acid, peptidases (which can be substrate specific), and phosphatases.

A cleavable linkage group, such as a disulfide bond can be susceptible to pH. The pH of human serum is 7.4, while the average intracellular pH is slightly lower, ranging from about 7.1-7.3. Endosomes have a more acidic pH, in the range of 5.5-6.0, and lysosomes have an even more acidic pH at around 5.0. Some linkers will have a cleavable linking group that is cleaved at a preferred pH, thereby releasing the cationic lipid from the ligand inside the cell, or into the desired compartment of the cell.

A linker can include a cleavable linking group that is cleavable by a particular enzyme. The type of cleavable linking group incorporated into a linker can depend on the cell to be targeted. For example, liver targeting ligands can be linked to the cationic lipids through a linker that includes an ester group. Liver cells are rich in esterases, and therefore the linker will be cleaved more efficiently in liver cells than in cell types that are not esterase-rich. Other cell-types rich in esterases include cells of the lung, renal cortex, and testis. Linkers that contain peptide bonds can be used when targeting cell types rich in peptidases, such as liver cells and synoviocytes.

In general, the suitability of a candidate cleavable linking group can be evaluated by testing the ability of a degradative agent (or condition) to cleave the candidate linking group. It will also be desirable to also test the candidate cleavable linking group for the ability to resist cleavage in the blood or when in contact with other non-target tissue. Thus one can determine the relative susceptibility to cleavage between a first and a second condition, where the first is selected to be indicative of cleavage in a target cell and the second is selected to be indicative of cleavage in other tissues or biological fluids, e.g., blood or serum. The evaluations can be carried out in cell free systems, in cells, in cell culture, in organ or tissue culture, or in whole animals. It may be useful to make initial evaluations in cell-free or culture conditions and to confirm by further evaluations in whole animals. In preferred embodiments, useful candidate compounds are cleaved at least 2, 4, 10 or 100 times faster in the cell (or under in vitro conditions selected to mimic intracellular conditions) as compared to blood or serum (or under in vitro conditions selected to mimic extracellular conditions).

One class of cleavable linking groups is redox cleavable linking groups, which may be used in the dsRNA molecule according to the present invention that are cleaved upon reduction or oxidation. An example of reductively cleavable linking group is a disulfide linking group (—S—S—). To determine if a candidate cleavable linking group is a suitable "reductively cleavable linking group," or for example is suitable for use with a particular iRNA moiety and particular targeting agent one can look to methods described herein. For example, a candidate can be evaluated by incubation with dithiothreitol (DTT), or other reducing agent using reagents know in the art, which mimic the rate of cleavage which would be observed in a cell, e.g., a target cell. The candidates can also be evaluated under conditions which are selected to mimic blood or serum conditions. In a preferred embodiment, candidate compounds are cleaved by at most 10% in the blood. In preferred embodiments, useful candidate compounds are degraded at least 2, 4, 10 or 100 times faster in the cell (or under in vitro conditions selected to mimic intracellular conditions) as compared to blood (or under in vitro conditions selected to mimic extracellular conditions). The rate of cleavage of candidate compounds can be determined using standard enzyme kinetics assays under conditions chosen to mimic intracellular media and compared to conditions chosen to mimic extracellular media.

Phosphate-based cleavable linking groups, which may be used in the dsRNA molecule according to the present invention, are cleaved by agents that degrade or hydrolyze the phosphate group. An example of an agent that cleaves phosphate groups in cells are enzymes such as phosphatases in cells. Examples of phosphate-based linking groups are —O—P(O)(ORk)-O—, —O—P(S)(ORk)-O—, —O—P(S)(SRk)-O—, —S—P(O)(ORk)-O—, —O—P(O)(ORk)-S—, —S—P(O)(ORk)-S—, —O—P(S)(ORk)-S—, —S—P(S)(ORk)-O—, —O—P(O)(Rk)-O—, —O—P(S)(Rk)-O—, —S—P(O)(Rk)-O—, —S—P(S)(Rk)-O—, —S—P(O)(Rk)-S—, —O—P(S)(Rk)-S—. Preferred embodiments are —O—P(O)(OH)—O—, —O—P(S)(OH)—O—, —O—P(S)(SH)—O—, —S—P(O)(OH)—O—, —O—P(O)(OH)—S—, —S—P(O)(OH)—S—, —O—P(S)(OH)—S—, —S—P(S)(OH)—O—, —O—P(O)(H)—O—, —O—P(S)(H)—O—, —S—P(O)(H)—O—, —S—P(S)(H)—O—, —S—P(O)(H)—S—, —O—P(S)(H)—S—, A preferred embodiment is —O—P(O)(OH)—O—. These candidates can be evaluated using methods analogous to those described above.

Acid cleavable linking groups, which may be used in the dsRNA molecule according to the present invention, are linking groups that are cleaved under acidic conditions. In preferred embodiments acid cleavable linking groups are cleaved in an acidic environment with a pH of about 6.5 or lower (e.g., about 6.0, 5.5, 5.0, or lower), or by agents such as enzymes that can act as a general acid. In a cell, specific low pH organelles, such as endosomes and lysosomes can provide a cleaving environment for acid cleavable linking groups. Examples of acid cleavable linking groups include but are not limited to hydrazones, esters, and esters of amino acids. Acid cleavable groups can have the general formula —C=NN—, C(O)O, or —OC(O). A preferred embodiment is when the carbon attached to the oxygen of the ester (the alkoxy group) is an aryl group, substituted alkyl group, or tertiary alkyl group such as dimethyl pentyl or t-butyl. These candidates can be evaluated using methods analogous to those described above.

Ester-based cleavable linking groups, which may be used in the dsRNA molecule according to the present invention, are cleaved by enzymes such as esterases and amidases in cells. Examples of ester-based cleavable linking groups include but are not limited to esters of alkylene, alkenylene and alkynylene groups. Ester cleavable linking groups have the general formula —C(O)O—, or —OC(O)—. These candidates can be evaluated using methods analogous to those described above.

Peptide-based cleavable linking groups, which may be used in the dsRNA molecule according to the present invention, are cleaved by enzymes such as peptidases and proteases in cells. Peptide-based cleavable linking groups are peptide bonds formed between amino acids to yield oligopeptides (e.g., dipeptides, tripeptides etc.) and polypeptides. Peptide-based cleavable groups do not include the amide group (—C(O)NH—). The amide group can be formed between any alkylene, alkenylene or alkynylene. A peptide bond is a special type of amide bond formed between amino acids to yield peptides and proteins. The peptide based cleavage group is generally limited to the peptide bond (i.e., the amide bond) formed between amino acids yielding peptides and proteins and does not include the entire amide functional group. Peptide-based cleavable linking groups have the general formula —NHCHR$^A$C(O)NHCHR$^B$C(O)—, where R$^A$ and R$^B$ are the R groups of the two adjacent amino acids. These candidates can be evaluated using methods analogous to those described above.

Uses of the dsRNAs

The dsRNAs described herein can be used for inhibiting the expression of a target gene. Accordingly, in another aspect, provided herein is a method for inhibiting the expression of a target gene. The method comprises the step of administering a dsRNA described herein to a cell in an amount sufficient to inhibit expression of the target gene. In a preferred embodiment, the present invention further relates to a use of a dsRNA described herein for inhibiting expression of a target gene in a target cell in vitro.

Exemplary target genes include, but are not limited to, β-catenin (CTNNB1), IRF4, Factor VII, Eg5, PCSK9, TPX2, apoB, SAA, TTR, RSV, PDGF beta gene, Erb-B gene, Src gene, CRK gene, GRB2 gene, RAS gene, MEKK gene, JNK gene, RAF gene, Erk1/2 gene, PCNA(p21) gene, MYB gene, JUN gene, FOS gene, BCL-2 gene, hepcidin, Activated Protein C, Cyclin D gene, VEGF gene, EGFR gene, Cyclin A gene, Cyclin E gene, WNT-1 gene, beta-catenin gene, c-MET gene, PKC gene, NFKB gene, STAT3 gene, survivin gene, Her2/Neu gene, topoisomerase I gene, topoisomerase II alpha gene, p73 gene, mutations in the p21 (WAF1/CIP1) gene, mutations in the p27(KIP1) gene, mutations in the PPM1D gene, mutations in the RAS gene, mutations in the caveolin I gene, mutations in the MIB I gene, mutations in the MTAI gene, mutations in the M68 gene, mutations in tumor suppressor genes, and mutations in the p53 tumor suppressor gene.

In some aspects, a dsRNA described herein can be used for treatment of a subject or mammal.

Pharmaceutical Compositions

For therapeutic uses, dsNRAs described herein can be formulated into pharmaceutical compositions. Accordingly, in another aspect, the invention provides a pharmaceutical composition comprising a dsRNA as defined herein. Pharmaceutically acceptable compositions comprise a therapeutically-effective amount of one or more of the dsRNAs described herein, taken alone or formulated together with one or more pharmaceutically acceptable carriers (additives), excipient and/or diluents.

The pharmaceutical compositions can be specially formulated for administration in solid or liquid form, including those adapted for the following: (1) oral administration, for example, drenches (aqueous or non-aqueous solutions or suspensions), tablets, e.g., those targeted for buccal, sublingual, and systemic absorption, boluses, powders, granules, pastes for application to the tongue; (2) parenteral administration, for example, by subcutaneous, intramuscular, intravenous or epidural injection as, for example, a sterile solution or suspension, or sustained-release formulation; (3) topical application, for example, as a cream, ointment, or a controlled-release patch or spray applied to the skin; (4) intravaginally or intrarectally, for example, as a pessary, cream or foam; (5) sublingually; (6) ocularly; (7) transdermally; or (8) nasally. Delivery using subcutaneous or intravenous methods can be particularly advantageous.

The phrase "therapeutically-effective amount" as used herein means that amount of a compound, material, or composition comprising a conjugate described herein which is effective for producing some desired therapeutic effect in at least a sub-population of cells in an animal at a reasonable benefit/risk ratio applicable to any medical treatment.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable carrier" as used herein means a pharmaceutically-acceptable material, composition or vehicle, such as a liquid or solid filler, diluent, excipient, manufacturing aid (e.g., lubricant, talc magnesium, calcium or zinc stearate, or steric acid), or solvent encapsulating material, involved in carrying or transporting the subject compound from one organ, or portion of the body, to another organ, or portion of the body. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) lubricating agents, such as magnesium state, sodium lauryl sulfate and talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) pH buffered solutions; (21) polyesters, polycarbonates and/or polyanhydrides; (22) bulking agents, such as polypeptides and amino acids (23) serum component, such as serum albumin, HDL and LDL; and (22) other non-toxic compatible substances employed in pharmaceutical formulations.

As used herein the language "pharmaceutically acceptable carrier" is intended to include any and all solvents, dispersion media, coatings, antibacterial and antifungal agents, isotonic and absorption delaying agents, and the like, compatible with pharmaceutical administration. The use of such media and agents for pharmaceutically active substances is well known in the art. Except insofar as any conventional media or agent is incompatible with the active compound, use thereof in the compositions is contemplated. Supplementary active compounds can also be incorporated into the compositions. Pharmaceutical carriers include sterile aqueous solutions or dispersions and sterile powders for the extemporaneous preparation of sterile injectable solutions or dispersion. The use of such media and agents for pharmaceutically active substances is known in the art.

The formulations can conveniently be presented in unit dosage form and can be prepared by any methods well known in the art of pharmacy. The amount of active ingredient which can be combined with a carrier material to produce a single dosage form will vary depending upon the host being treated, the particular mode of administration. The amount of active ingredient which can be combined with a carrier material to produce a single dosage form will generally be that amount of the compound which produces a therapeutic effect. Generally, out of one hundred percent, this amount will range from about 0.1 percent to about ninety-nine percent of active ingredient, preferably from about 5 percent to about 70 percent, most preferably from about 10 percent to about 30 percent.

In certain embodiments, a formulation of the present invention comprises an excipient selected from the group consisting of cyclodextrins, celluloses, liposomes, micelle forming agents, e.g., bile acids, and polymeric carriers, e.g., polyesters and polyanhydrides; and a conjugate described herein. In certain embodiments, an aforementioned formulation renders orally bioavailable a conjugate described herein.

The dsRNA preparation can be formulated in combination with another agent, e.g., another therapeutic agent or an agent that stabilizes the dsRNA. Still other agents include chelating agents, e.g., EDTA (e.g., to remove divalent cations such as $Mg^{2+}$), salts, RNAse inhibitors (e.g., a broad specificity RNAse inhibitor such as RNAsin) and so forth.

Methods of preparing these formulations or compositions include the step of bringing into association a dsRNA of the present invention with the carrier and, optionally, one or more accessory ingredients. In general, the formulations are prepared by uniformly and intimately bringing into association a dsRNA of the present invention with liquid carriers, or finely divided solid carriers, or both, and then, if necessary, shaping the product.

In some cases, in order to prolong the effect of a drug, it is desirable to slow the absorption of the drug from subcutaneous or intramuscular injection. This can be accomplished by the use of a liquid suspension of crystalline or amorphous material having poor water solubility. The rate of absorption of the drug then depends upon its rate of dissolution which, in turn, may depend upon crystal size and crystalline form. Alternatively, delayed absorption of a parenterally-administered drug form is accomplished by dissolving or suspending the drug in an oil vehicle.

The dsRNAs according to the invention can be formulated for administration in any convenient way for use in human or veterinary medicine, by analogy with other pharmaceuticals.

Compositions can also contain adjuvants such as preservatives, wetting agents, emulsifying agents and/or dispersing agents. Prevention of the presence of microorganisms can be ensured both by sterilization procedures and by the inclusion of various antibacterial and antifungal agents, for example, paraben, chlorobutanol, phenol, sorbic acid, and the like. It can also be desirable to include isotonic agents, such as sugars, sodium chloride, and the like into the compositions. In addition, prolonged absorption of the injectable pharmaceutical form can be brought about by the inclusion of agents that delay absorption, such as aluminum monostearate and gelatin.

A composition must be sterile and fluid to the extent that the composition is deliverable by syringe. In addition to water, the carrier preferably is an isotonic buffered saline solution.

Routes of Administration

The dsRNAs described herein or a pharmaceutical composition comprising same can be administered by a variety of methods known in the art. As will be appreciated by the skilled artisan, the route and/or mode of administration will vary depending upon the target disease or condition and the desired results. To administer a dsRNA described herein by certain routes of administration, it can be necessary to coat the dsRNA with, or co-administer the dsRNA with, a material to prevent its inactivation. For example, a dsRNA can be administered to a subject in an appropriate carrier, for example, liposomes, or a diluent. Pharmaceutically acceptable diluents include saline and aqueous buffer solutions.

Exemplary routes for administration include, but are not limited to, intravenous, subcutaneous, intratumoral, topical, rectal, anal, vaginal, nasal, pulmonary, and ocular.

The compositions of the present invention can be administered in a number of ways depending upon whether local or systemic treatment is desired and upon the area to be treated. Administration can be topical (including ophthalmic, vaginal, rectal, intranasal, transdermal), oral or parenteral. Parenteral administration includes intravenous drip, subcutaneous, intraperitoneal or intramuscular injection, or intrathecal or intraventricular administration.

The route and site of administration can be chosen to enhance targeting. For example, to target muscle cells, intramuscular injection into the muscles of interest would be a logical choice. Lung cells might be targeted by administering the dsRNA in aerosol form. The vascular endothelial cells could be targeted by coating a balloon catheter with the dsRNA and mechanically introducing the dsRNA.

Dosage

Actual dosage levels of the active ingredients, e.g., the dsRNA described herein, in the pharmaceutical compositions of the present invention can be varied so as to obtain an amount of the active ingredient which is effective to achieve the desired therapeutic response for a particular patient, composition, and mode of administration, without being toxic to the patient. A selected dosage level will depend upon a variety of pharmacokinetic factors including the activity of the particular compositions of the present invention employed, the route of administration, the time of administration, the rate of excretion of the particular compound being employed, the duration of the treatment, other drugs, compounds and/or materials used in combination with the particular compositions employed, the age, sex, weight, condition, general health and prior medical history of the patient being treated, and like factors well known in the medical arts.

In some embodiments, the unit dose is less than 10 mg per kg of bodyweight, or less than 10, 5, 2, 1, 0.5, 0.1, 0.05, 0.01, 0.005, 0.001, 0.0005, 0.0001, 0.00005 or 0.00001 mg per kg of bodyweight, and less than 200 nmole of dsRNA molecule (e.g., about $4.4 \times 10^{16}$ copies) per kg of bodyweight, or less than 1500, 750, 300, 150, 75, 15, 7.5, 1.5, 0.75, 0.15, 0.075, 0.015, 0.0075, 0.0015, 0.00075, 0.00015 nmole of dsRNA molecule per kg of bodyweight.

The defined amount can be an amount effective to treat or prevent a disease or disorder, e.g., a disease or disorder associated with the target gene. The unit dose, for example, can be administered by injection (e.g., intravenous, subcutaneous or intramuscular), an inhaled dose, or a topical application. In some embodiments dosages may be less than 10, 5, 2, 1, or 0.1 mg/kg of body weight.

In some embodiments, the unit dose is administered less frequently than once a day, e.g., less than every 2, 4, 8 or 30 days. In another embodiment, the unit dose is not administered with a frequency (e.g., not a regular frequency). For example, the unit dose may be administered a single time.

In some embodiments, the effective dose is administered with other traditional therapeutic modalities.

In some embodiments, a subject is administered an initial dose and one or more maintenance doses. The maintenance dose or doses can be the same or lower than the initial dose, e.g., one-half less of the initial dose. A maintenance regimen can include treating the subject with a dose or doses ranging from 0.01 µg to 15 mg/kg of body weight per day, e.g., 10, 1, 0.1, 0.01, 0.001, or 0.00001 mg per kg of bodyweight per day. The maintenance doses are, for example, administered no more than once every 2, 5, 10, or 30 days. Further, the treatment regimen may last for a period of time which will vary depending upon the nature of the particular disease, its severity and the overall condition of the patient. In certain embodiments the dosage may be delivered no more than once per day, e.g., no more than once per 24, 36, 48, or more hours, e.g., no more than once for every 5 or 8 days. Following treatment, the patient can be monitored for changes in his condition and for alleviation of the symptoms of the disease state. The dosage of the compound may either be increased in the event the patient does not respond significantly to current dosage levels, or the dose may be decreased if an alleviation of the symptoms of the disease state is observed, if the disease state has been ablated, or if undesired side-effects are observed.

The effective dose can be administered in a single dose or in two or more doses, as desired or considered appropriate under the specific circumstances. If desired to facilitate repeated or frequent infusions, implantation of a delivery device, e.g., a pump, semi-permanent stent (e.g., intravenous, intraperitoneal, intracisternal or intracapsular), or reservoir may be advisable.

In some embodiments, the composition includes a plurality of dsRNA molecule species. In another embodiment, the dsRNA molecule species has sequences that are non-overlapping and non-adjacent to another species with respect to a naturally occurring target sequence. In another embodiment, the plurality of dsRNA molecule species is specific for different naturally occurring target genes. In another embodiment, the dsRNA molecule is allele specific.

The dsRNAs described herein can be administered to mammals, particularly large mammals such as nonhuman primates or humans in a number of ways.

In some embodiments, the administration of the dsRNA is parenteral, e.g., intravenous (e.g., as a bolus or as a diffusible infusion), intradermal, intraperitoneal, intramuscular, intrathecal, intraventricular, intracranial, subcutaneous, transmucosal, buccal, sublingual, endoscopic, rectal, oral, vaginal, topical, pulmonary, intranasal, urethral or ocular. Administration can be provided by the subject or by another person, e.g., a health care provider. The medication can be provided in measured doses or in a dispenser which delivers a metered dose.

Liposomes and Lipid Formulations

The dsRNAs described herein can be formulated for delivery in a membranous molecular assembly, e.g., a liposome or a micelle. As used herein, the term "liposome" refers to a vesicle composed of amphiphilic lipids arranged in at least one bilayer, e.g., one bilayer or a plurality of bilayers. Liposomes include unilamellar and multilamellar vesicles that have a membrane formed from a lipophilic material and an aqueous interior. The aqueous portion contains the siRNA composition. The lipophilic material isolates the aqueous interior from an aqueous exterior, which typically does not include the dsRNA composition, although in some examples, it may. Liposomes are useful for the transfer and delivery of active ingredients to the site of action. Because the liposomal membrane is structurally similar to biological membranes, when liposomes are applied to a tissue, the liposomal bilayer fuses with bilayer of the cellular membranes. As the merging of the liposome and cell progresses, the internal aqueous contents that include a dsRNA described herein are delivered into the cell where the dsRNA can specifically bind to a target RNA and can mediate RNAi. In some cases, the liposomes are also specifically targeted, e.g., to direct the conjugate to particular cell types.

A liposome containing a dsRNA described herein can be prepared by a variety of methods. In one example, the lipid component of a liposome is dissolved in a detergent so that micelles are formed with the lipid component. For example, the lipid component can be an amphipathic cationic lipid or lipid conjugate. The detergent can have a high critical micelle concentration and may be nonionic. Exemplary detergents include cholate, CHAPS, octylglucoside, deoxycholate, and lauroyl sarcosine. The dsRNA preparation is then added to the micelles that include the lipid component. The cationic groups on the lipid interact with the dsRNA and condense around the dsRNA to form a liposome. After condensation, the detergent is removed, e.g., by dialysis, to yield a liposomal preparation of dsRNA.

If necessary a carrier compound that assists in condensation can be added during the condensation reaction, e.g., by controlled addition. For example, the carrier compound can be a polymer other than a nucleic acid (e.g., spermine or spermidine). pH can also be adjusted to favor condensation.

Further description of methods for producing stable polynucleotide delivery vehicles, which incorporate a polynucleotide/cationic lipid complex as structural components of the delivery vehicle, are described in, e.g., WO 96/37194. Liposome formation can also include one or more aspects of exemplary methods described in Felgner, P. L. et al., *Proc. Natl. Acad. Sci., USA* 8:7413-7417, 1987; U.S. Pat. Nos. 4,897,355; 5,171,678; Bangham, et al. *M. Mol. Biol.* 23:238, 1965; Olson, et al. *Biochim. Biophys. Acta* 557:9, 1979; Szoka, et al. *Proc. Natl. Acad. Sci.* 75:4194, 1978; Mayhew, et al. *Biochim. Biophys. Acta* 775:169, 1984; Kim, et al. *Biochim. Biophys. Acta* 728:339, 1983; and Fukunaga, et al. *Endocrinol.* 115:757, 1984, which are incorporated by reference in their entirety. Commonly used techniques for preparing lipid aggregates of appropriate size for use as delivery vehicles include sonication and freeze-thaw plus extrusion (see, e.g., Mayer, et al. *Biochim. Biophys. Acta* 858:161, 1986, which is incorporated by reference in its entirety). Microfluidization can be used when consistently small (50 to 200 nm) and relatively uniform aggregates are desired (Mayhew, et al. *Biochim. Biophys. Acta* 775:169, 1984, which is incorporated by reference in its entirety). These methods are readily adapted to packaging siRNA preparations into liposomes.

Liposomes that are pH-sensitive or negatively-charged entrap nucleic acid molecules rather than complex with them. Since both the nucleic acid molecules and the lipid are similarly charged, repulsion rather than complex formation occurs. Nevertheless, some nucleic acid molecules are entrapped within the aqueous interior of these liposomes. pH-sensitive liposomes have been used to deliver DNA encoding the thymidine kinase gene to cell monolayers in culture. Expression of the exogenous gene was detected in the target cells (Zhou et al., *Journal of Controlled Release*, 19, (1992) 269-274, which is incorporated by reference in its entirety).

One major type of liposomal composition includes phospholipids other than naturally-derived phosphatidylcholine. Neutral liposome compositions, for example, can be formed from dimyristoyl phosphatidylcholine (DMPC) or dipalmitoyl phosphatidylcholine (DPPC). Anionic liposome compositions generally are formed from dimyristoyl phosphatidylglycerol, while anionic fusogenic liposomes are formed primarily from dioleoyl phosphatidylethanolamine (DOPE). Another type of liposomal composition is formed from phosphatidylcholine (PC) such as, for example, soybean PC, and egg PC. Another type is formed from mixtures of phospholipid and/or phosphatidylcholine and/or cholesterol.

Examples of other methods to introduce liposomes into cells in vitro and include U.S. Pat. Nos. 5,283,185; 5,171,678; WO 94/00569; WO 93/24640; WO 91/16024; Felgner, *J. Biol. Chem.* 269:2550, 1994; Nabel, *Proc. Natl. Acad. Sci.* 90:11307, 1993; Nabel, *Human Gene Ther.* 3:649, 1992; Gershon, *Biochem.* 32:7143, 1993; and Strauss *EMBO J.* 11:417, 1992.

In some embodiments, cationic liposomes are used. Cationic liposomes possess the advantage of being able to fuse to the cell membrane. Non-cationic liposomes, although not able to fuse as efficiently with the plasma membrane, are taken up by macrophages in vivo and can be used to deliver siRNAs to macrophages.

Further advantages of liposomes include: liposomes obtained from natural phospholipids are biocompatible and biodegradable; liposomes can incorporate a wide range of water and lipid soluble drugs; liposomes can protect encapsulated siRNAs in their internal compartments from metabolism and degradation (Rosoff, in "Pharmaceutical Dosage Forms," Lieberman, Rieger and Banker (Eds.), 1988, volume 1, p. 245). Important considerations in the preparation of liposome formulations are the lipid surface charge, vesicle size and the aqueous volume of the liposomes.

A positively charged synthetic cationic lipid, N-[1-(2,3-dioleyloxy)propyl]-N,N,N-trimethylammonium chloride (DOTMA) can be used to form small liposomes that interact spontaneously with nucleic acid to form lipid-nucleic acid complexes which are capable of fusing with the negatively charged lipids of the cell membranes of tissue culture cells, resulting in delivery of siRNA (see, e.g., Felgner, P. L. et al., Proc. Natl. Acad. Sci., USA 8:7413-7417, 1987 and U.S. Pat. No. 4,897,355 for a description of DOTMA and its use with DNA, which are incorporated by reference in their entirety).

A DOTMA analogue, 1,2-bis(oleoyloxy)-3-(trimethylammonia) propane (DOTAP) can be used in combination with a phospholipid to form DNA-complexing vesicles. Lipofectin™ Bethesda Research Laboratories, Gaithersburg, Md.) is an effective agent for the delivery of highly anionic nucleic acids into living tissue culture cells that comprise positively charged DOTMA liposomes which interact spontaneously with negatively charged polynucleotides to form complexes. When enough positively charged liposomes are used, the net charge on the resulting complexes is also positive. Positively charged complexes prepared in this way spontaneously attach to negatively charged cell surfaces, fuse with the plasma membrane, and efficiently deliver functional nucleic acids into, for example, tissue culture cells. Another commercially available cationic lipid, 1,2-bis(oleoyloxy)-3,3-(trimethylammonia) propane ("DOTAP") (Boehringer Mannheim, Indianapolis, Indiana) differs from DOTMA in that the oleoyl moieties are linked by ester, rather than ether linkages.

Other reported cationic lipid compounds include those that have been conjugated to a variety of moieties including, for example, carboxyspermine which has been conjugated to one of two types of lipids and includes compounds such as 5-carboxyspermylglycine dioctaoleoylamide ("DOGS") (Transfectam™, Promega, Madison, Wisconsin) and dipalmitoylphosphatidylethanolamine 5-carboxyspermylamide ("DPPES") (see, e.g., U.S. Pat. No. 5,171,678).

Another cationic lipid conjugate includes derivatization of the lipid with cholesterol ("DC-Chol") which has been formulated into liposomes in combination with DOPE (Sec, Gao, X. and Huang, L., Biochim. Biophys. Res. Commun. 179:280, 1991). Lipopolylysine, made by conjugating polylysine to DOPE, has been reported to be effective for transfection in the presence of serum (Zhou, X. et al., Biochim. Biophys. Acta 1065:8, 1991, which is incorporated by reference in its entirety). For certain cell lines, these liposomes containing conjugated cationic lipids, are said to exhibit lower toxicity and provide more efficient transfection than the DOTMA-containing compositions. Other commercially available cationic lipid products include DMRIE and DMRIE-HP (Vical, La Jolla, California) and Lipofectamine (DOSPA) (Life Technology, Inc., Gaithersburg, Maryland). Other cationic lipids suitable for the delivery of oligonucleotides are described in WO 98/39359 and WO 96/37194.

Liposomal formulations are particularly suited for topical administration. Liposomes present several advantages over other formulations. Such advantages include reduced side effects related to high systemic absorption of the administered drug, increased accumulation of the administered drug at the desired target, and the ability to administer siRNA, into the skin. In some implementations, liposomes are used for delivering siRNA to epidermal cells and also to enhance the penetration of siRNA into dermal tissues, e.g., into skin. For example, the liposomes can be applied topically. Topical delivery of drugs formulated as liposomes to the skin has been documented (see, e.g., Weiner et al., Journal of Drug Targeting, 1992, vol. 2, 405-410 and du Plessis et al., Antiviral Research, 18, 1992, 259-265; Mannino, R. J. and Fould-Fogerite, S., Biotechniques 6:682-690, 1988; Itani, T. et al. Gene 56:267-276. 1987; Nicolau, C. et al. Meth. Enz. 149:157-176, 1987; Straubinger, R. M. and Papahadjopoulos, D. Meth. Enz. 101:512-527, 1983; Wang, C. Y. and Huang, L., Proc. Natl. Acad. Sci. USA 84:7851-7855, 1987, which are incorporated by reference in their entirety).

Non-ionic liposomal systems have also been examined to determine their utility in the delivery of drugs to the skin, in particular systems comprising non-ionic surfactant and cholesterol. Non-ionic liposomal formulations comprising Novasome 1 (glyceryl dilaurate/cholesterol/polyoxyethylene-10-stearyl ether) and Novasome II (glyceryl distearate/cholesterol/polyoxyethylene-10-stearyl ether) were used to deliver a drug into the dermis of mouse skin. Such formulations with siRNA are useful for treating a dermatological disorder.

Liposomes that include a conjugate described herein can be made highly deformable. Such deformability can enable the liposomes to penetrate through pore that are smaller than the average radius of the liposome. For example, transfersomes are a type of deformable liposomes. Transfersomes can be made by adding surface edge activators, usually surfactants, to a standard liposomal composition. Transfersomes that include siRNA can be delivered, for example, subcutaneously by infection in order to deliver siRNA to keratinocytes in the skin. In order to cross intact mammalian skin, lipid vesicles must pass through a series of fine pores, each with a diameter less than 50 nm, under the influence of a suitable transdermal gradient. In addition, due to the lipid properties, these transfersomes can be self-optimizing (adaptive to the shape of pores, e.g., in the skin), self-repairing, and can frequently reach their targets without fragmenting, and often self-loading.

Other formulations amenable to the present invention are described in U.S. provisional application Ser. No. 61/018, 616, filed Jan. 2, 2008; 61/018,611, filed Jan. 2, 2008; 61/039,748, filed Mar. 26, 2008; 61/047,087, filed Apr. 22, 2008 and 61/051,528, filed May 8, 2008. PCT application no PCT/US2007/080331, filed Oct. 3, 2007 also describes formulations that are amenable to the present invention.

Surfactants. Surfactants find wide application in formulations such as emulsions (including microemulsions) and liposomes (see above). A conjugate formulation can include a surfactant. In some embodiments, a conjugate described herein is formulated as an emulsion that includes a surfactant. The most common way of classifying and ranking the properties of the many different types of surfactants, both natural and synthetic, is by the use of the hydrophile/lipophile balance (HLB). The nature of the hydrophilic group provides the most useful means for categorizing the different surfactants used in formulations (Rieger, in "Pharmaceutical Dosage Forms," Marcel Dekker, Inc., New York, NY, 1988, p. 285).

If the surfactant molecule is not ionized, it is classified as a nonionic surfactant. Nonionic surfactants find wide application in pharmaceutical products and are usable over a wide range of pH values. In general, their HLB values range from 2 to about 18 depending on their structure. Nonionic surfactants include nonionic esters such as ethylene glycol esters, propylene glycol esters, glyceryl esters, polyglyceryl esters, sorbitan esters, sucrose esters, and ethoxylated esters. Nonionic alkanolamides and ethers such as fatty alcohol ethoxylates, propoxylated alcohols, and ethoxylated/propoxylated block polymers are also included in this class. The polyoxyethylene surfactants are the most popular members of the nonionic surfactant class.

If the surfactant molecule carries a negative charge when it is dissolved or dispersed in water, the surfactant is classified as anionic. Anionic surfactants include carboxylates such as soaps, acyl lactylates, acyl amides of amino acids, esters of sulfuric acid such as alkyl sulfates and ethoxylated alkyl sulfates, sulfonates such as alkyl benzene sulfonates, acyl isethionates, acyl taurates and sulfosuccinates, and phosphates. The most important members of the anionic surfactant class are the alkyl sulfates and the soaps.

If the surfactant molecule carries a positive charge when it is dissolved or dispersed in water, the surfactant is classified as cationic. Cationic surfactants include quaternary ammonium salts and ethoxylated amines. The quaternary ammonium salts are the most used members of this class.

If the surfactant molecule has the ability to carry either a positive or negative charge, the surfactant is classified as amphoteric. Amphoteric surfactants include acrylic acid derivatives, substituted alkylamides, N-alkylbetaines and phosphatides.

The use of surfactants in drug products, formulations and in emulsions has been reviewed (Rieger, in "Pharmaceutical Dosage Forms," Marcel Dekker, Inc., New York, NY, 1988, p. 285).

Micelles and other Membranous Formulations. Formulations comprising a conjugate described herein can be provided as a micellar formulation. "Micelles" are defined herein as a particular type of molecular assembly in which amphipathic molecules are arranged in a spherical structure such that all the hydrophobic portions of the molecules are directed inward, leaving the hydrophilic portions in contact with the surrounding aqueous phase. The converse arrangement exists if the environment is hydrophobic.

A mixed micellar formulation suitable for delivery through transdermal membranes may be prepared by mixing an aqueous solution of the siRNA composition, an alkali metal $C_8$ to $C_{22}$ alkyl sulphate, and a micelle forming compounds. Exemplary micelle forming compounds include lecithin, hyaluronic acid, pharmaceutically acceptable salts of hyaluronic acid, glycolic acid, lactic acid, chamomile extract, cucumber extract, oleic acid, linoleic acid, linolenic acid, monoolein, monooleates, monolaurates, borage oil, evening of primrose oil, menthol, trihydroxy oxo cholanyl glycine and pharmaceutically acceptable salts thereof, glycerin, polyglycerin, lysine, polylysine, triolein, polyoxyethylene ethers and analogues thereof, polidocanol alkyl ethers and analogues thereof, chenodeoxycholate, deoxycholate, and mixtures thereof. The micelle forming compounds may be added at the same time or after addition of the alkali metal alkyl sulphate. Mixed micelles will form with substantially any kind of mixing of the ingredients but vigorous mixing in order to provide smaller size micelles.

In one method a first micellar composition is prepared which contains conjugate described herein and at least the alkali metal alkyl sulphate. The first micellar composition is then mixed with at least three micelle forming compounds to form a mixed micellar composition. In another method, the micellar composition is prepared by mixing conjugate described herein, the alkali metal alkyl sulphate and at least one of the micelle forming compounds, followed by addition of the remaining micelle forming compounds, with vigorous mixing.

Phenol and/or m-cresol may be added to the mixed micellar composition to stabilize the formulation and protect against bacterial growth. Alternatively, phenol and/or m-cresol may be added with the micelle forming ingredients. An isotonic agent such as glycerin may also be added after formation of the mixed micellar composition.

For delivery of the micellar formulation as a spray, the formulation can be put into an aerosol dispenser and the dispenser is charged with a propellant. The propellant, which is under pressure, is in liquid form in the dispenser. The ratios of the ingredients are adjusted so that the aqueous and propellant phases become one, i.e., there is one phase. If there are two phases, it is necessary to shake the dispenser prior to dispensing a portion of the contents, e.g., through a metered valve. The dispensed dose of pharmaceutical agent is propelled from the metered valve in a fine spray.

Propellants may include hydrogen-containing chlorofluorocarbons, hydrogen-containing fluorocarbons, dimethyl ether and diethyl ether. In certain embodiments, HFA 134a (1,1,1,2 tetrafluoroethane) may be used.

The specific concentrations of the essential ingredients can be determined by relatively straightforward experimentation. For absorption through the oral cavities, it is often desirable to increase, e.g., at least double or triple, the dosage for through injection or administration through the gastrointestinal tract.

Particles. In some embodiments, conjugate described herein can be incorporated into a particle, e.g., a microparticle. Microparticles can be produced by spray-drying, but may also be produced by other methods including lyophilization, evaporation, fluid bed drying, vacuum drying, or a combination of these techniques.

Kits

The invention also provides kits comprising the dsRNA described herein.

Exemplary embodiments of any one of the aspects can be described as follows:

Embodiment 1: A double-stranded RNA (dsRNA) molecule capable of inhibiting the expression of a target gene, comprising a sense strand and an antisense strand, each strand having 14 to 40 nucleotides, wherein the antisense strand has sufficient complementarity to the target sequence to mediate RNA interference, wherein the dsRNA molecule comprises an hexopyranose nucleoside and wherein the dsRNA comprises a ligand.

Embodiment 2: A double-stranded RNA molecule capable of inhibiting the expression of a target gene, comprising a sense strand and an antisense strand, each strand having 14 to 40 nucleotides, wherein the antisense strand has sufficient complementarity to the target sequence to mediate RNA interference, wherein the antisense strand comprises at least one hexopyranose nucleoside in a seed region of the antisense strand or the sense strand comprises at least one altritol nucleotide in a central region of the sense strand.

Embodiment 3: A double-stranded RNA molecule capable of inhibiting the expression of a target gene, comprising a sense strand and an antisense strand, each strand having 14 to 40 nucleotides, wherein the antisense strand has sufficient complementarity to the target sequence to mediate RNA interference, wherein the dsRNA comprises at least one hexopyranose nucleoside, at least one 2'-fluoro nucleotide and at least one 2'-OMe nucleotide.

Embodiment 4: A double-stranded RNA molecule capable of inhibiting the expression of a target gene, comprising a sense strand and an antisense strand, each strand having 14 to 40 nucleotides, wherein the antisense strand has sufficient complementarity to the target sequence to mediate RNA interference, wherein the dsRNA comprises at least one hexopyranose nucleoside and the dsRNA comprises at least four phosphorothioate internucleotide linkages.

Embodiment 5: The double-stranded RNA molecule of any one of embodiments 1-4, wherein the antisense strand comprises a hexopyranose nucleoside in the seed region of the antisense strand.

Embodiment 6; The double-stranded RNA molecule of any one of embodiments 1-5, wherein the antisense strand comprises a hexopyranose nucleoside at least at one of positions 3-8, counting from 5'-end of the antisense strand.

Embodiment 7: The double-stranded RNA molecule of any one of embodiments 1-6, wherein the antisense strand comprises a hexopyranose nucleoside at least at one of positions 6, 7, 9, 12, 16, 21 and 22, counting from the 5'-end of the antisense strand.

Embodiment 8: The double-stranded RNA molecule of embodiment 7, wherein the antisense strand comprises a hexopyranose nucleoside at least at one of positions 6, 7 and 16.

Embodiment 9: The double-stranded RNA molecule of embodiment 8, wherein the antisense strand comprises a hexopyranose nucleoside at least at one of positions 6 and 7.

Embodiment 10: The double-stranded RNA molecule of embodiment 9, wherein the antisense strand comprises a hexopyranose nucleoside at position 7.

Embodiment 11: The double-stranded RNA molecule of any one of embodiments 1-10, wherein the sense strand comprises at least two or more consecutive independently selected hexopyranose nucleosides.

Embodiment 12: The double-stranded RNA molecule of any one of embodiments 1-11, wherein the sense strand comprises at least three or more consecutive independently selected hexopyranose nucleosides.

Embodiment 13: The double-stranded RNA molecule of any one of embodiments 1-12, wherein the sense strand comprises a hexopyranose nucleoside in the central region of the sense strand.

Embodiment 14: The double-stranded RNA molecule of any one of embodiments 1-13, wherein the sense strand comprises a hexopyranose nucleoside at least at one of positions 3 and 12.

Embodiment 15: The double-stranded RNA molecule of any one of embodiments 1-14, wherein the antisense strand comprises at least two or more consecutive independently selected hexopyranose nucleosides.

Embodiment 16: The double-stranded RNA molecule of any one of embodiments 1-15, wherein the antisense strand comprises at least three or more consecutive independently selected hexopyranose nucleosides.

Embodiment 17: The double-stranded RNA molecule of any one of embodiments 1-16, wherein the sense strand comprises a hexopyranose nucleoside at 5'-end of the sense strand.

Embodiment 18: The double-stranded RNA molecule of any one of embodiments 1-17, wherein the sense strand comprises a hexopyranose nucleoside at 5'-end of the sense strand.

Embodiment 19: The double-stranded RNA molecule of any one of embodiments 1-18, wherein sense strand comprises a 5'-vinylphosphonate (VP) group.

Embodiment 20: The double-stranded RNA molecule of any one of embodiments 1-19, wherein the hexopyranose nucleotide is selected from the group consisting of allopyranose nucleotide, altriol nucleotide, glucopyranose nucleotide, mannopyranose nucleotide, gulopyranose nucleotide, idopyranose nucleotide, galactopyranose nucleotide, talopyranose nucleotide, fucopyranose nucleotide, rhamopyranose nucleotide, quinovopyranose nucleotide, pneumopyranose nucleotide, and any combinations thereof.

Embodiment 21: The double-stranded RNA molecule of any one of embodiments 1-20, wherein the hexopyranose nucleotide is selected from the group consisting of altriol nucleotide, glucopyranose nucleotide, mannopyranose nucleotide, galactopyranose nucleotide, fucopyranose nucleotide, and any combinations thereof.

Embodiment 22: The double-stranded RNA molecule of any one of embodiments 2-21, wherein the dsRNA comprises a ligand.

Embodiment 23: The double-stranded RNA molecule of embodiment 1 or 22, wherein the ligand is an ASGPR ligand.

Embodiment 24: The double-stranded RNA molecule of embodiment 23, wherein the ASGPR ligand is:

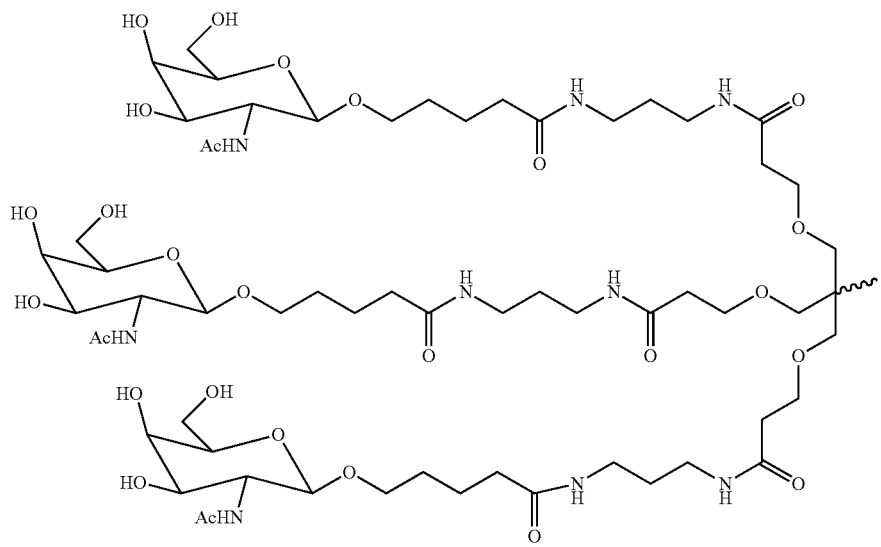 [SMILES: CC(=O)NC1C(OCCCCC(=O)NCCCNC(=O)CCOCC(C)(COCCC(=O)NCCCNC(=O)CCCCOC2OC(CO)C(O)C(O)C2NC(C)=O)COCCC(=O)NCCCNC(=O)CCCCOC2OC(CO)C(O)C(O)C2NC(C)=O)OC(CO)C(O)C1O]

Embodiment 25: The double-stranded RNA molecule of any one of embodiments 1-24, wherein the sense strand comprises 1, 2, 3 or 4 phosphorothioate internucleotide linkages.

Embodiment 26: The double-stranded RNA molecule of any one of embodiments 1-25, wherein the sense strand comprises phosphorothioate internucleotide linkages between nucleotide positions 1 and 2, and between positons 2 and 3 (counting from the 5' end).

Embodiment 27: The double-stranded RNA molecule of any one of embodiments 1-26, wherein the antisense strand comprises 1, 2, 3 or 4 phosphorothioate internucleotide linkages.

Embodiment 28: The double-stranded RNA molecule of any one of embodiments 1-27, wherein the antisense strand comprises phosphorothioate internucleotide linkages between nucleotide positions 21 and 22, and between nucleotide positions 22 and 23 (counting from the 5' end).

Embodiment 29: The double-stranded RNA molecule of any one of embodiments 1-28, wherein the antisense strand comprises phosphorothioate internucleotide linkages between nucleotide positions 1 and 2, between nucleotide positions 2 and 3, between nucleotide positions 21 and 22, and between nucleotide positions 22 and 23 (counting from the 5' end).

Embodiment 30: The double-stranded RNA molecule of any one of embodiments 1-29, wherein the sense strand and the antisense strand are independently 19-25 nucleotides in length.

Embodiment 31: The double-stranded RNA molecule of any one of embodiments 1-30, wherein the sense strand is 21 nucleotides in length.

Embodiment 32: The double-stranded RNA molecule of any one of embodiments 1-31, wherein the antisense strand is 23 nucleotides in length.

Embodiment 33: The double-stranded RNA molecule of any one of embodiments 1-32, wherein the sense strand is 21 nucleotides in length and the antisense strand is 23 nucleotides in length.

Embodiment 34: The double-stranded RNA molecule of any one of embodiments 1-33, wherein the dsRNA comprises a single stranded overhang at 3'-end of the antisense strand.

Embodiment 35: The double-stranded RNA molecule of any one of embodiments 1-34, wherein the dsRNA comprises a blunt end at the 5'-end of the antisense strand.

Embodiment 36: The double-stranded RNA molecule of any one of embodiments 1-35, wherein the dsRNA comprises a 2'-fluoro or 2'-OMe nucleotide in positions complimentary to the hexopyranose nucleotide.

Embodiment 37: The double-stranded RNA molecule of any one of embodiments 1-36, wherein the dsRNA does not comprise nucleotides other than hexopyranose, 2'-fluoro and 2-OMe nucleotides.

Embodiment 38: The double-stranded RNA molecule of any one of embodiments 1-36, wherein the dsRNA comprises a nucleotide selected from the group consisting of acyclic nucleotides, locked nucleic acid (LNA), HNA, CeNA, 2'-methoxyethyl, 2'-O-allyl, 2'-C-allyl, 2'-O—N-methylacetamido (2'-O-NMA), a 2'-O-dimethylaminoethoxyethyl (2'-O-DMAEOE), 2'-O-aminopropyl (2'-O-AP), 2'-ara-F, and 2'-deoxy.

Embodiment 39: The double-stranded RNA molecule of any one of embodiments 1-38, wherein the sense strand comprises a 5'-morpholino, a 5'-dimethylamino, a 5'-deoxy, an inverted abasic, or an inverted abasic locked nucleic acid modification at the 5'-end.

Embodiment 40: The double-stranded RNA molecule of any one of embodiments 1-39, wherein the dsRNA has a melting temperature in the range from about 40° C. to about 80° C.

Embodiment 41: A pharmaceutical composition comprising the dsRNA agent according to any one of embodiments 1-40 alone or in combination with a pharmaceutically acceptable carrier or excipient.

Embodiment 42: A gene silencing kit containing the dsRNA molecule of any one of any one embodiments 1-40.

Embodiment 43: A method for silencing a target gene in a cell, the method comprising a step of introducing the dsRNA molecule of any one of embodiments 1-40 into the cell.

Embodiment 44: The method of embodiment 43, wherein the dsRNA agent is administered through subcutaneous or intravenous administration.

Embodiment 45: A method for silencing a target gene in a cell, the method comprising a step of expressing the dsRNA molecule of any one of embodiments 1-40 into the cell.

Some Selected Definitions

For convenience, certain terms employed herein, in the specification, examples and appended claims are collected herein. Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments, and are not intended to limit the claimed invention, because the scope of the invention is limited only by the claims. Further, unless otherwise required by context, singular terms shall include pluralities and plural terms shall include the singular.

Unless defined otherwise, all technical and scientific terms used herein have the same meaning as those commonly understood to one of ordinary skill in the art to which this invention pertains. Although any known methods, devices, and materials may be used in the practice or testing of the invention, the methods, devices, and materials in this regard are described herein.

Further, the practice of the present invention can employ, unless otherwise indicated, conventional techniques of molecular biology (including recombinant techniques), microbiology, cell biology, biochemistry, and immunology, which are within the skill of the art. Such techniques are explained fully in the literature, such as, "Molecular Cloning: A Laboratory Manual", second edition (Sambrook et al., 1989); "Oligonucleotide Synthesis" (M. J. Gait, ed., 1984); "Animal Cell Culture" (R. I. Freshney, ed., 1987); "Methods in Enzymology" (Academic Press, Inc.); "Current Protocols in Molecular Biology" (F. M. Ausubel et al., eds., 1987, and periodic updates); "PCR: The Polymerase Chain Reaction", (Mullis et al., ed., 1994); "A Practical Guide to Molecular Cloning" (Perbal Bernard V., 1988); "Phage Display: A Laboratory Manual" (Barbas et al., 2001).

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

As used herein the term "comprising" or "comprises" is used in reference to compositions, methods, and respective component(s) thereof, that are essential to the invention, yet open to the inclusion of unspecified elements, whether essential or not.

The singular terms "a," "an," and "the" include plural referents unless context clearly indicates otherwise. Similarly, the word "or" is intended to include "and" unless the context clearly indicates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

As used herein, the terms "dsRNA", "siRNA", and "iRNA agent" are used interchangeably to refer to agents that can mediate silencing of a target RNA, e.g., mRNA, e.g., a transcript of a gene that encodes a protein. For convenience, such mRNA is also referred to herein as mRNA to be silenced. Such a gene is also referred to as a target gene. In general, the RNA to be silenced is an endogenous gene, exogenous gene or a pathogen gene. In addition, RNAs other than mRNA, e.g., tRNAs, and viral RNAs, can also be targeted.

As used herein, the phrase "mediates RNAi" refers to the ability to silence, in a sequence specific manner, a target gene, e.g., mRNA. While not wishing to be bound by theory, it is believed that silencing uses the RNAi machinery or process and a guide RNA, e.g., antisense strand of a dsRNA, where the antisense strand is 21 to 23 nucleotides in length.

As used herein, "specifically hybridizable" and "complementary" are terms which are used to indicate a sufficient degree of complementarity such that stable and specific binding occurs between a compound of the invention and a target RNA molecule. Specific binding requires a sufficient degree of complementarity to avoid non-specific binding of the oligomeric compound to non-target sequences under conditions in which specific binding is desired, i.e., under physiological conditions in the case of assays or therapeutic treatment, or in the case of in vitro assays, under conditions in which the assays are performed. The non-target sequences typically differ by at least 5 nucleotides.

In some embodiments, a dsRNA molecule is "sufficiently complementary" to a target RNA, e.g., a target mRNA, such that the dsRNA molecule silences production of protein encoded by the target mRNA. In another embodiment, the dsRNA molecule is "exactly complementary" to a target RNA, e.g., the target RNA and the dsRNA duplex agent anneal, for example to form a hybrid made exclusively of Watson-Crick base pairs in the region of exact complementarity. A "sufficiently complementary" target RNA can include an internal region (e.g., of at least 10 nucleotides) that is exactly complementary to a target RNA. Moreover, in some embodiments, the dsRNA molecule specifically discriminates a single-nucleotide difference. In this case, the dsRNA molecule only mediates RNAi if exact complementary is found in the region (e.g., within 7 nucleotides of) the single-nucleotide difference.

As used herein, the term "oligonucleotide" refers to a nucleic acid molecule (RNA or DNA) for example of length less than 100, 200, 300, or 400 nucleotides.

The term 'BNA' refers to bridged nucleic acid, and is often referred as constrained or inaccessible RNA. BNA can contain a 5-, 6-membered, or even a 7-membered bridged structure with a "fixed" $C_3'$-endo sugar puckering. The bridge is typically incorporated at the 2'-, 4'-position of the ribose to afford a 2', 4'-BNA nucleotide (e.g., LNA, or ENA). Examples of BNA nucleotides include the following nucleosides:

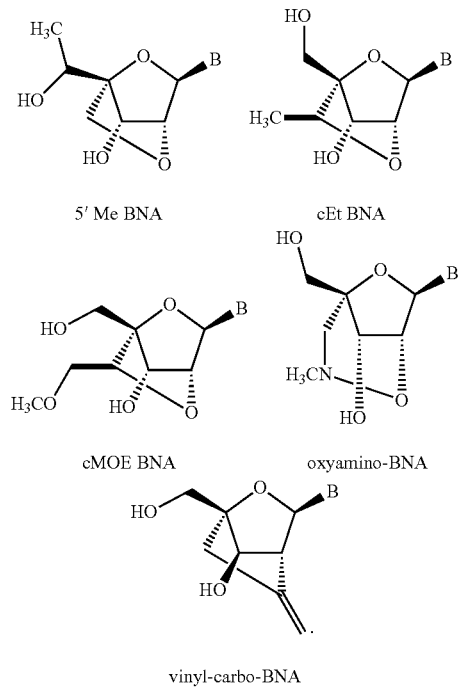

The term 'LNA' refers to locked nucleic acid, and is often referred as constrained or inaccessible RNA. LNA is a modified RNA nucleotide. The ribose moiety of an LNA nucleotide is modified with an extra bridge (e.g., a methylene bridge or an ethylene bridge) connecting the 2' hydroxyl to the 4' carbon of the same ribose sugar. For instance, the bridge can "lock" the ribose in the 3'-endo North) conformation:

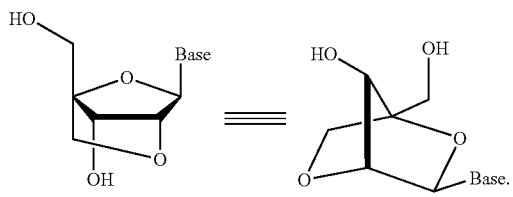

The term 'ENA' refers to ethylene-bridged nucleic acid, and is often referred to as constrained or inaccessible RNA.

The "cleavage site" herein means the backbone linkage in the target gene or the sense strand that is cleaved by the RISC mechanism by utilizing the iRNA agent. And the target cleavage site region comprises at least one or at least two nucleotides on both side of the cleavage site. For the sense strand, the cleavage site is the backbone linkage in the sense strand that would get cleaved if the sense strand itself was the target to be cleaved by the RNAi mechanism. The cleavage site can be determined using methods known in the art, for example the 5'-RACE assay as detailed in Soutschek et al., Nature (2004) 432, 173-178, which is incorporated by reference in its entirety. As is well understood in the art, the cleavage site region for a conical double stranded RNAi agent comprising two 21-nucleotides long strands (wherein the strands form a double stranded region of 19 consecutive base pairs having 2-nucleotide single stranded overhangs at the 3'-ends), the cleavage site region corresponds to positions 9-12 from the 5'-end of the sense strand.

The terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g. the absence of a given treatment) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. A decrease can be preferably down to a level accepted as within the range of normal for an individual without a given disorder.

As used herein, a "central region" of a strand refers to positions 8-16, e.g., positions 8-15, positions 8-14, positions 8-13, positions 8-12, positions 9-16, positions 9-15, positions 9-14, positions 9-13, positions 9-12, positions 10-16, positions 10-15, positions 10-14, positions 10-13 or positions 10-12, counting from the 5'-end of the strand. For example, the central region of a strand means positions 8, 9, 10, 11, 12, 13, 14, 15 and 16 of the strand. A preferred central region for the sense strand is positions 8, 9, 10, 11, 12, 13, and 14, counting from the 5'-end of the sense strand. A more preferred central region for the sense strand is positions 10, 11, 12 and 13, counting from the 5'-end of the sense strand. A preferred central region for the antisense strand is positions 9, 10, 11, 12, 13, 14, 15, and 16, counting from 5'-end of the antisense strand. A more preferred central region for the antisense strand is positions 10, 11, 12, 13, 14 and 15 and, counting from 5'-end of the antisense strand.

The term "specific binding" or "specifically binds to" or is "specific for" refers to the binding of a binding moiety to a binding target, such as the binding of an immunoglobulin to a target antigen, e.g., an epitope on a particular polypeptide, peptide, or other target (e.g. a glycoprotein target), and means binding that is measurably different from a non-specific interaction (e.g., a non-specific interaction can be binding to bovine serum albumin or casein). Specific binding can be measured, for example, by determining binding of a binding moiety, or an immunoglobulin, to a target molecule compared to binding to a control molecule. For example, specific binding can be determined by competition with a control molecule that is similar to the target, for example, an excess of non-labeled target. In this case, specific binding is indicated if the binding of the labeled target to a probe is competitively inhibited by excess unlabeled target. The term "specific binding" or "specifically binds to" or is "specific for" as used herein can be exhibited, for example, by a molecule having a $K_d$ for the target of at least about 200 nM, alternatively at least about 150 nM, alternatively at least about 100 nM, alternatively at least about 60 nM, alternatively at least about 50 nM, alternatively at least about 40 nM, alternatively at least about 30 nM, alternatively at least about 20 nM, alternatively at least about 10 nM, alternatively at least about 8 nM, alternatively at least about 6 nM, alternatively at least about 4 nM, alternatively at least about 2 nM, alternatively at least about 1 nM, or greater. In certain instances, the term "specific binding" refers to binding where a molecule binds to a particular target molecule without substantially binding to any other molecule.

"Binding affinity" refers to the strength of the sum total of noncovalent interactions between a single binding site of a molecule (e.g., an immunoglobulin) and its binding partner (e.g., an antigen). Unless indicated otherwise, as used herein, "binding affinity" refers to intrinsic binding affinity which reflects a 1:1 interaction between members of a binding pair (e.g., immunoglobulin and antigen). The affinity of a molecule X for its partner Y can generally be represented by the dissociation constant ($K_d$). For example, the $K_d$ can be about 200 nM, 150 nM, 100 nM, 60 nM, 50 nM, 40 nM, 30 nM, 20 nM, 10 nM, 8 nM, 6 nM, 4 nM, 2 nM, 1 nM, or stronger. Affinity can be measured by common methods known in the art, including those described herein. Low-affinity antibodies generally bind antigen slowly and tend to dissociate readily, whereas high-affinity antibodies generally bind antigen faster and tend to remain bound longer. A variety of methods of measuring binding affinity are known in the art.

As used herein, the "$K_d$" or "$K_d$ value" refers to a dissociation constant measured by a technique appropriate for the immunoglobulin and target pair, for example using surface plasmon resonance assays, for example, using a Biacore X100 or a Biacore T200 (GE Healthcare, Piscataway, N.J.) at 25° C. with immobilized antigen CM5 chips.

"Treating" or "treatment" refers to both therapeutic treatment and prophylactic or preventative measures, wherein the object is to prevent or slow down (lessen) a targeted pathologic condition or disorder. For example, a subject or mammal is successfully "treated" for cancer, if, after receiving a therapeutic amount of a conjugate described herein, the subject shows observable and/or measurable reduction in or absence of one or more of the following: reduction in the number of cancer cells or absence of the cancer cells; reduction in the tumor size; inhibition (i.e., slowing to some extent and preferably stopping) of cancer cell infiltration into peripheral organs, including the spread of cancer into soft tissue and bone; inhibition (i.e., slowing to some extent and preferably stopping) of tumor metastasis; inhibition, to some extent, of tumor growth; and/or relief to some extent of one or more of the symptoms associated with the specific cancer; reduced morbidity and/or mortality, and improvement in quality of life. In some embodiments, "treating" or "treatment" refers to therapeutic treatment.

As used herein, a "subject" means a human or animal. Usually the animal is a vertebrate such as a primate, rodent, domestic animal or game animal. Primates include chimpanzees, cynomologous monkeys, spider monkeys, and macaques, e.g., Rhesus. Rodents include mice, rats, woodchucks, ferrets, rabbits and hamsters. Domestic and game animals include cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human. The terms, "individual," "patient" and "subject" are used interchangeably herein.

Preferably, the subject is a mammal. The mammal can be a human, non-human primate, mouse, rat, dog, cat, horse, or cow, but is not limited to these examples. Mammals other than humans can be advantageously used as subjects that represent animal models of cancer. A subject can be male or female.

A subject can be one who has been previously diagnosed with or identified as suffering from or having a condition in need of treatment (e.g. cancer) or one or more complications related to such a condition, and optionally, have already undergone treatment for cancer or the one or more complications related to cancer. Alternatively, a subject can also be one who has not been previously diagnosed as having cancer or one or more complications related to cancer. For example, a subject can be one who exhibits one or more risk factors for cancer or one or more complications related to cancer or a subject who does not exhibit risk factors.

A "subject in need" of treatment for a particular condition can be a subject having that condition, diagnosed as having that condition, or at risk of developing that condition.

As will be apparent to those of skill in the art upon reading this disclosure, each of the individual aspects described and illustrated herein has discrete components and features which can be readily separated from or combined with the features of any of the other several aspects without departing from the scope or spirit of the present invention. Any recited method can be carried out in the order of events recited or in any other order which is logically possible.

The invention is further illustrated by the following examples, which should not be construed as further limiting. The contents of all references, pending patent applications and published patents, cited throughout this application are hereby expressly incorporated by reference.

EXAMPLES

Example 1: Altritol-Modified siRNAs: In Vitro and In Vivo RNAi Activity, and Structural Studies Natural RNA nucleotides contain a ribose sugar that adopts a C3'-endo conformation and form an A-type duplex. Interestingly, when the ribose sugar is replaced by a six-membered altritol sugar, the backbone of the resulting oligonucleotide (called altritol nucleic acid or ANA) maintains the A-type geometry. Thus, ANA is considered an RNA analog and may find useful applications in cases where the RNA geometry needs to be preserved. In this study, the inventors investigated ANA as a modification in small interfering RNA (siRNA) duplexes that were otherwise fully modified with the 2'-F RNA and 2'-OMe RNA chemical modifications. The siRNAs were designed to silence the expression of the transthyretin (Ttr) gene and were conjugated to N-acetylgalactosamine (GalNAc) for targeted delivery to hepatocytes. A single nucleotide positional walk of ANA modification was performed along the sense and antisense strands of the parent duplex, and the resulting modified duplexes were screened for their potential to target Ttr mRNA in vitro. This analysis unexpectedly and surprisingly revealed that ANA is well accommodated in the seed region, especially at positions 6 and 7 of the antisense strand. The corresponding duplexes also showed good on- and off-target activity in a luciferase reporter assay. Finally, the duplex with ANA at position 7 of the antisense strand in the seed region maintained RNAi activity in vivo and incorporation of ANA at the 5'-end of an oligonucleotide showed improvement in metabolic stability due to stability against 5'-exonucleases.

Figure 1B:
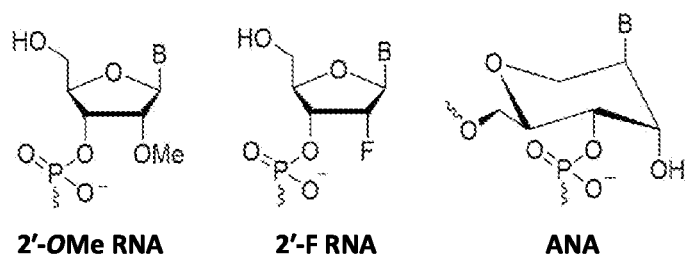
FIG. 1B depicts structures of 2'-OMe RNA, 2'-F RNA and altritol nucleic acid (ANA) nucleotides.

The tremendous potential of small interfering RNAs (siRNAs) in the development of new medicines is evident from the success of Onpattro®, a first in class drug for the treatment of polyneuropathy of hereditary transthyretin-mediated amyloidosis.[1] Many other siRNAs are being evaluated in early to late stage clinical trials.[2] siRNAs take advantage of a natural gene regulatory mechanism called RNA interference (RNAi) for silencing the expression of a given gene of interest.[3,4] siRNAs composed of natural RNA nucleotides are susceptible to fast enzymatic degradation and do not readily reach their target organ when administered systemically. Thus, it is necessary to use chemically modified siRNAs for therapeutic applications.[5]. 2'-Deoxy-2'-fluoro-(2'-F RNA, FIG. 1b)[6,7] and 2'-O-methyl-(2'-OMe RNA, FIG. 1b) RNA modifications are compatible with natural RNA induced silencing complex (RISC) and are widely used to stabilize siRNAs. siRNAs composed of 2'-F and 2'-OMe RNA with strategic placement of phosphorothioate linkages and conjugated to the N-acetylgalactosamine (GalNAc) ligand, are being studied in the clinic.[8] We have been investigating a number of additional chemically modified nucleotides that can be used in synergy with 2'-F RNA and 2'-OMe RNA for generating potent and safe siRNAs.[9-12] For instance, rational use of glycol nucleic acid (GNA) in the seed region of siRNAs otherwise fully modified with 2'-F RNA and 2'-OMe RNA, can reduce seed-mediated off-target toxicity.[10, 12] Similarly, placing a 5'-morpholino-2'-OMe RNA nucleotide on the sense strand can improve RNAi activity,[9] while 4'-C-Methoxy-2'-deoxy-2'-fluoro uridine can improve metabolic stability while maintaining gene silencing.[13] Thus, the strategy of using modified nucleotides in synergy with the 2'-F RNA and 2'-OMe RNA modifications is a validated approach to generate siRNA with improved efficacy and specificity.

Altritol nucleic acids (ANA) carry a six-membered sugar with a nucleobase at the 2'-(S)-position and a hydroxyl group at the 3'-position (FIG. 1).[14, 15] ANA has a preorganized structure mimicking an N-type furanose sugar, while the presence of the hydroxyl group at the 3'-position contributes to duplex stabilization via hydration. The RNA-like (A-type geometry of ANA renders it a suitable candidate for incorporation into siRNAs, where maintaining RNA-like structure is advantageous. ANA-modified siRNAs have evaluated and showed better RNAi activity compared to unmodified siRNAs.[16-19] However, it remains to be seen how ANA would behave when used in synergy with other modified nucleotides/ligands. In this context we present for the first time the in vitro and in vivo gene silencing activity of siRNA duplexes modified with ANA, 2'-F RNA, and 2'-OMe RNA nucleotides. The impact of ANA to protect from nucleolytic degradation when present at the 3'- or 5'-end of an oligonucleotide is also evaluated. The crystal structure of an RNA octamer duplex with incorporated ANA-A residues was determined at the 2 Å resolution. We also built models of an siRNA guide strand with an ANA modification at position 7 bound to Argonaute 2 (Ago2) and an RNA with two 5'-terminal ANA-U residues bound to Xml RNA 5'-exonuclease to help rationalize the favorable activity and metabolic stability, respectively, of RNAs with regiospecifically incorporated ANA nucleotides.

Materials and Methods

Oligonucleotide synthesis: ANA-modified oligonucleotides were obtained following the previously published protocol[12] except that 3% trichloroacetic acid in $CH_2Cl_2$ was used for detritylation. Briefly, all oligonucleotides were prepared on an ABI 394 or MerMade 192 synthesizer on a 1 μmole scale using universal or custom supports. For ABI, all phosphoramidites were dissolved at a concentration of 0.15M in 100% acetonitrile or 9:1 acetonitrile:DMF (2'-OMe-C, 2'-OMe-U). For Mermade 192 a concentration of 0.10M was used. ETT was used as an activator and 3% trichloroacetic acid in dichloromethane for detritylation.

MerMade 192 Workup: After the trityl-off synthesis using the MerMade 192, columns were incubated with 150 μL of 40% aqueous methylamine for 30 min at room temperature and the solution was drained via vacuum into a 96-well plate. After repeating the incubation and draining with a fresh portion of aqueous methylamine, the plate containing the crude oligonucleotides was sealed and shaken at room temperature for an additional 60 min to completely remove all protecting groups. Precipitation of the crude oligonucleotides was accomplished via the addition of 1.2 mL of 9:1 acetonitrile:EtOH to each well, followed by incubation at −20° C. overnight. The plate was then centrifuged at 3000 rpm for 45 min at 4° C., the supernatant removed from each well, and the pellets resuspended in 950 μL of 20 mM aqueous NaOAc. Each crude solution was finally desalted over a GE Hi-Trap desalting column (Sephadex G25 Superfine) using water to elute the final oligonucleotide products. The identities and purities of all oligonucleotides were confirmed using ESI-MS and IEX HPLC, respectively.

ABI 394 Workup: Standard protocols were used for cleavage and deprotection. Crude oligonucleotides were purified using strong anion exchange and phosphate buffers (pH=8.5) containing sodium bromide. The identities and purities of all oligonucleotides were confirmed using ESI-LC/MS and IEX HPLC, respectively.

In vitro mRNA knockdown: 5 μL of siRNA was placed in a 384-well collagen-coated plate, followed by addition of 4.90 μL of Opti-MEM and 0.1 μL of Lipofectamine RNAiMax (Invitrogen) to each well. The final siRNA concentrations were 0.1 or 10 nM. Plates were incubated at room temperature for 15 min. Primary mouse hepatocytes cells were suspended in media Invitrogro CP rodent medium (#Z990028 BioIVT) and 40 μL of this suspension (containing approximately 5000 cells) was added to each well. Each siRNA was assessed in quadruplicate. After incubating the cells for 24 h, RNA was isolated using DynaBeads (ThermoFisher). The RNA was then reverse transcribed into cDNA according to the manufacturer's protocol (Applied Biosystems). Multiplex qPCR reactions were performed using a gene specific TaqMan assay for Ttr (ThermoFisher Scientific, #Mm00443267_m1) and mouse Gapdh (#4352339E) as an endogenous control. Real-Time PCR was performed on a Roche LightCycler 480 using LightCycler 480 Probes Master Mix (Roche).

Off-target assay: COS-7 cells were cultured at 37° C., 5% $CO_2$ in Dulbecco's Modified Eagle Medium (DMEM) supplemented with 10% fetal bovine serum (FBS). Cells were co-transfected in 96-well plates (15,000 cells/well) with 10 ng luciferase reporter plasmid and 0.64 pM to 50 nM siRNA in 5-fold dilutions using 2 μg/mL Lipofectamine 2000 (Thermo Fisher Scientific) according to the manufacturer's instructions. Cells were harvested at 48 h after transfection for the dual luciferase assay (Promega) according to the manufacturer's instructions. The on-target reporter plasmid contained a single perfectly-complementary site to the antisense strand in the 3'-untranslated (3' UTR) of Renilla luciferase. The off-target reporter plasmid contained four tandem seed-complementary sites separated by a 19-nucleotide spacer (TAATATTACATAAATAAAA (SEQ ID NO: 5)) in the 3'-UTR of Renilla luciferase. Both plasmids co-expressed Firefly luciferase as a transfection control.

In vivo gene expression silencing: All studies were conducted using protocols consistent with local, state and federal regulations, as applicable, and were approved by the Institutional Animal Care and Use Committee (IACUC) at Alnylam Pharmaceuticals. 6-8 weeks old female C56BL/6 mice (Charles River Laboratories) were dosed subcutaneously with 1 mg/kg GalNAc-siRNAs formulated in 1×PBS, with the control cohort receiving 1×PBS of the same volume as the siRNA-receiving animals (200 μL). Since pre-albumin/Ttr can be found in circulation, blood samples were collected just prior to treatment administration, and 7 and 14 days after siRNA dosing. The collected serum samples were stored at −80° C. until further analysis. Two weeks after compound administration, the animals were euthanized, with the livers harvested and then cryopreserved. Isolation of RNA from liver was done with the PerkinElmer Chemagic system (Waltham, MA), according to the supplier's guidelines, followed by cDNA preparation and multiplexed RT-qPCR analysis to assess the Ttr transcript levels (Taqman probe Mm00443267_m1; mouse Gapdh 4351309 from ABI). Quantification of the Ttr protein levels in serum was done spectrophotometrically with a mouse pre-albumin/Ttr ELISA kit (41-PALMS-E01), in accordance to the manufacturer's protocol (ALPCO, Salem, NH).

Nuclease stability assay: Modified oligonucleotides were prepared in a final concentration of 0.1 mg/mL in either 50 mM Tris (pH 7.2) with 10 mM $MgCl_2$ or 50 mM sodium acetate (pH 6.5) with 10 mM MgCl for assessing the stability towards 3'- or 5'-specific exonucleases, respectively. The exonuclease (150 mU/mL SVPDE or 500 mU/mL phosphodiesterase II) was added immediately prior to analysis via IEX HPLC (dionex DNAPac PA200, 4×250 mm) using a gradient of 37-52% mobile phase (1 M NaBr, 20 mM sodium phosphate, pH 11, 15% MeCN; stationary phase: 20 mM sodium phosphate, 15% MeCN, pH 11) over 7.5 min with a flow of 1 mL/min. Samples were injected at the given timepoints and monitored for up to 24 h. The quantity of full-length ON was determined as the area under the curve at $A_{260}$. The percent full length ON was calculated by dividing by the area under the curve at t=0 and multiplying by 100. The activity of enzyme was verified for each experiment by including a oligo-2'-deoxythymidylate with a terminal phosphorothioate linkage (5'-$T_{19}$·T (SEQ ID NO: 6) or 5'-T·$T_{19}$ (SEQ ID NO: 6) for 3'- or 5'-exonuclease activity, respectively). Each aliquot of enzyme was thawed just prior to the experiment. The half-life was determined by fitting to first order kinetics.

X-ray crystallography: Two ANA-modified oligonucleotides were subjected to crystallization trials. Crystal of the dodecamer CGCGA(ANA-A)BrUUAGCG (SEQ ID NO: 7) were of space group/222 with unit cell constants a=47.26 Å, b=81.71, c=125.62 Å and diffracted to 4.4 Å resolution. Crystals of the octamer BrCGA(ANA-A)UUCG were of space group $P6_522$ with unit cell constants a=b=96.14, c=125.99 Å, γ=120° and diffracted to 2.1 Å resolution. Single-wavelength anomalous dispersion data at the bromine edge (Br-SAD) for the latter were collected on the 21-ID-D beam line of the Life Sciences Collaborative Access Team (LS-CAT) at the Advanced Photon Source (APS, Argonne National Laboratory, Argonne, IL). Data were processed with the program . . . (continue if structure can be phased).

Molecular modeling: Coordinates of the crystal structure of the ANA:RNA hybrid duplex a(CCGUAAUGCC-P):r(GGCAUUACGG) (SEQ ID NOS 8-9, respectively) with PDB ID code 3OK2 [ref. Ovaere et al. NAR 2012] and the crystal structure of micro-RNA miR-20a bound to human Argonaute 2 (Ago2) with PDB ID 4F3T[20] were retrieved from the Protein Data Bank at www.rcsb.org. The G residue at position 7 of the RNA in the Ago2 complex was excised and replaced by ANA-G3 from the hybrid duplex with the ANA A-strand using the program UCSF Chimera [ref. Petterson et al. J. Comput. Chem. 2004]. The geometry of the resulting fusion model was locally refined with Amber14 [ref. Case et al. UCSF 2014] and the glycosidic torsion angle of the ANA purine residue adjusted slightly to restore stacking on the adjacent residue C8 as seen in the crystal structure of the Ago2 complex with native RNA. The crystal structure of the complex between the Xrn1 5'-exoribonuclease and 5'P-dTdTdT-3' with PDB ID 2Y35[21] was retrieved from the Protein Data Bank. The dimer 5'P-aC9aC10-3'P was excised from strand A of the crystal structure of the ANA:RNA hybrid duplex and the bases converted to U using the program UCSF Chimera. The dimer was then superimposed on the first two nucleotides of the dT trimer in the Xrn1 complex using the match function in UCSF Chimera with selected backbone and base atoms.

In vitro mRNA knockdown: The position-dependent impact of the ANA modification on in vitro RNAi activity was assessed by systemically replacing each nucleotide of a previously studied siRNA designed to target the rodent (mouse and rat) transthyretin (Ttr) mRNA (FIG. 1).[12, 22-24] The design includes a 21-mer duplex with a two-nucleotide overhang on the antisense strand, modified with 2'-F RNA and 2'-OMe RNA nucleotides. The ends were protected by introducing two phosphorothioate linkages at each strand extremity, except for the 3'-end of the sense strand which is conjugated to a GalNac moiety.

Figure 2:
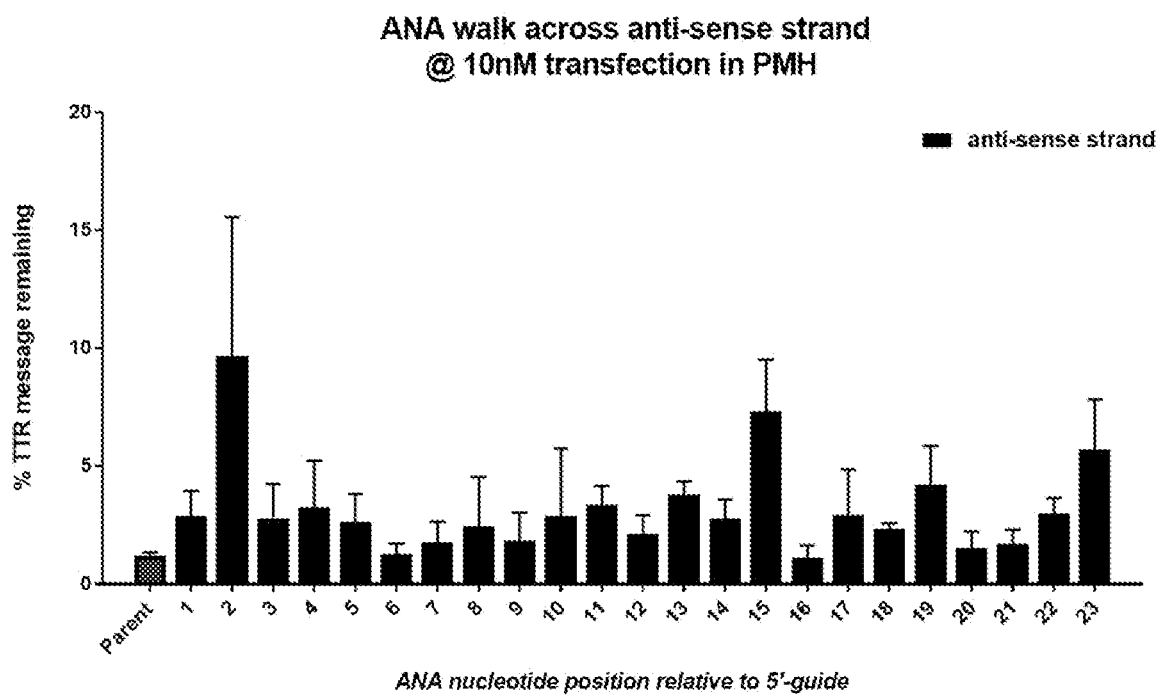
FIG. 2 is a bar graph showing the in vitro RNAi activity of duplexes with ANA in the antisense strand. The nucleotide at the indicated position of the antisense, also called the guide strand, was substituted with the corresponding ANA nucleotide.

The ANA nucleotides were walked across the nucleotide positions of the sense and antisense strands, and the RNAi activity of the resulting modified siRNAs were studied in primary hepatocytes (FIG. 2). In agreement with a previous study,[16] ANA at the 5'-end of the antisense strand (position 1; AS1) reduced potency. This loss in activity is probably due to the inability of cellular kinases to introduce a 5'-monophosphate group on the ANA nucleotide. The 5'-Monophosphate plays an important role in RISC loading by interacting with the Ago2 MID domain and therefore, the lack of a 5'-monophosphate is known to impair RNAi activity.[25-28] Presence of ANA modification at position AS2 was detrimental to RNAi activity.

Unexpectedly, ANA modification in the seed (nucleotides 3-8) was better accommodated, and two modified duplexes with an ANA nucleotide at position AS6 or AS7 showed RNAi activity comparable to the parent duplex at 10 nM (FIG. 2). In addition, ANA at position AS16 also maintained the RNAi activity. However, none of the modified duplexes showed higher activity compared to the parent siRNA. Similar results were obtained at a lower concentration of 0.1 nM (Figure S1), In vitro RNAi activity of siRNA duplexes with modification in the sense strand is shown in FIGS. 3 and S2. In general, the presence of the ANA modification in the sense strand led to a slight loss in activity. However, no significant changes were observed for most of the modified duplexes.

Figure 4:
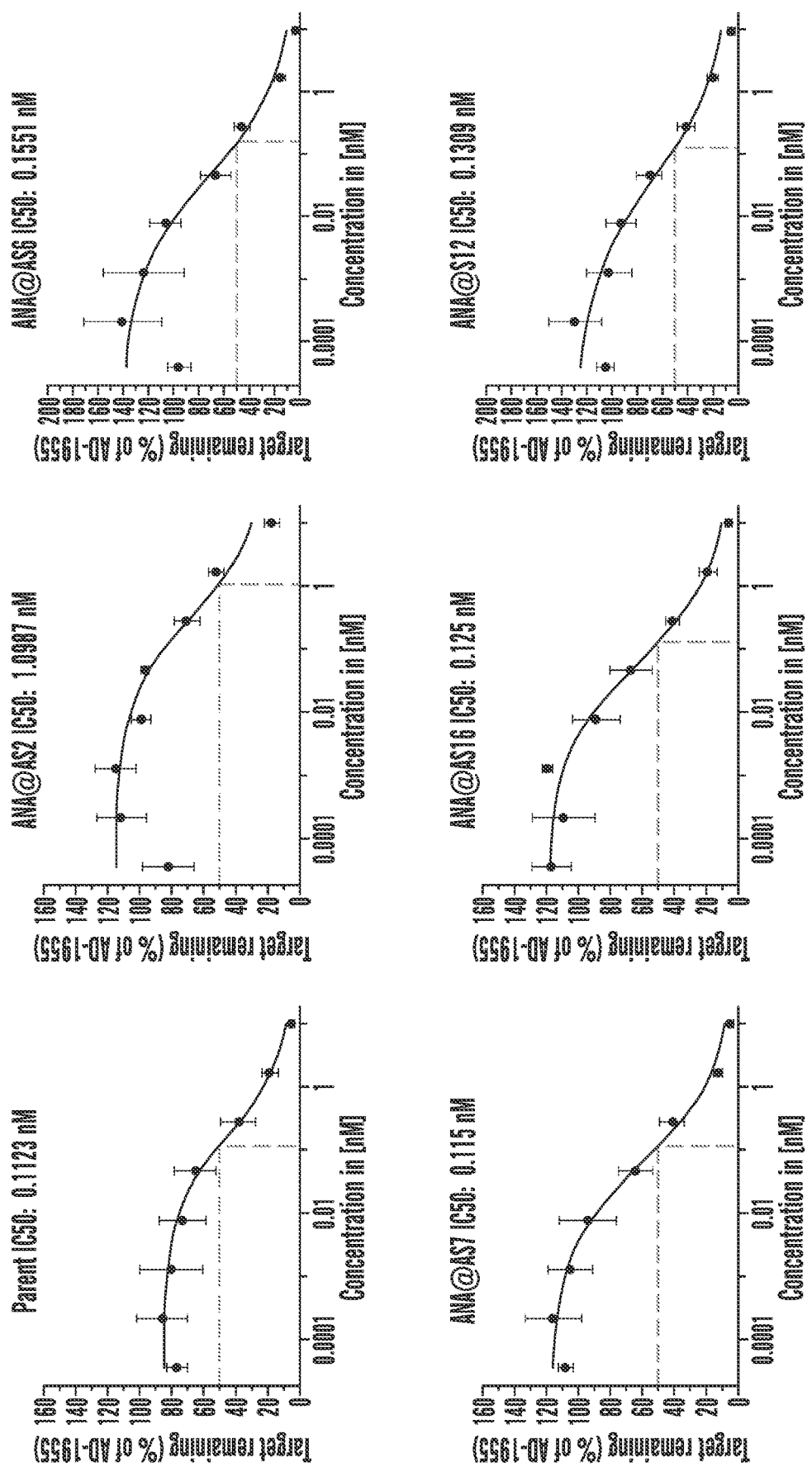
FIG. 4 are line graphs showing $IC_{50}$ values of selected exemplary siRNAs comprising ANA modifications. The indicated position of the antisense or sense strand carries the corresponding ANA nucleotide.

Based on the initial in vitro screening results, a subset of duplexes was selected for recording concentration-dependent RNA activity and $IC_{50}$ values for those were determined (FIG. 4). In accordance with the initial results, an siRNA duplex with ANA AS7 stood out with an $IC_{50}$ value of 0.115 nM (the parent duplex showed an $IC_{50}$ value of 0.112).

Figure 5A:
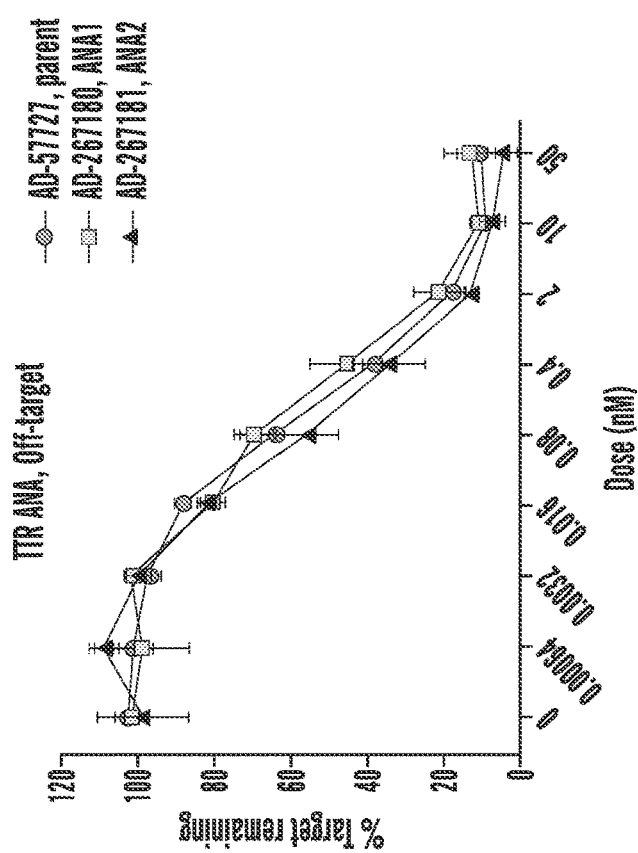
FIGS. 5A and 5B are line graphs showing on-target (FIG. 5A) and off-target (FIG. 5B) inhibitory effect of exemplary siRNAs in a luciferase reporter assay. Luciferase reporter plasmids were co-transfected with indicated siRNAs into COS-7 cells. The cells were harvested at 48 h after transfection for the dual luciferase assay. % Target remaining was calculated by dividing the ratio of Renilla/Firefly at each siRNA concentration by the ratio in the absence of siRNA.
Figure 5B:
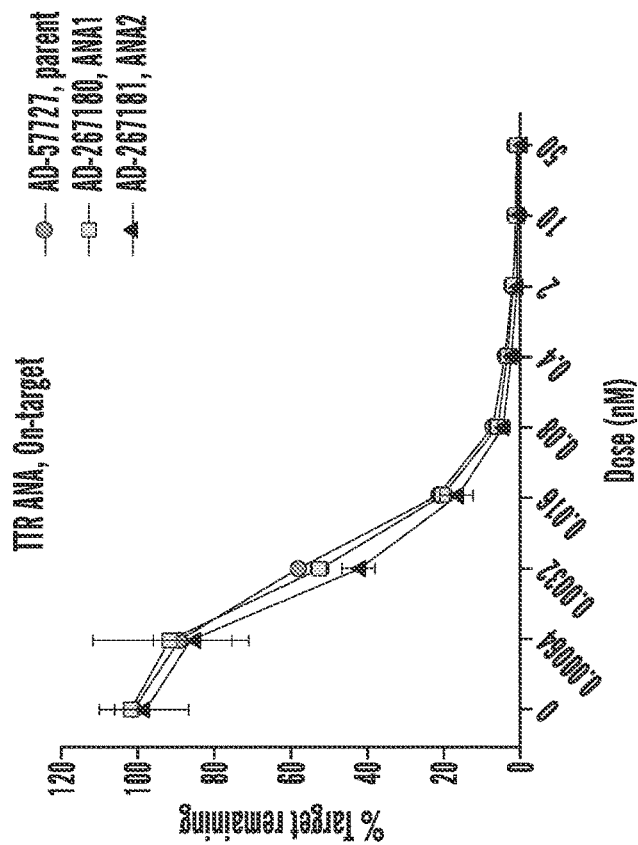

On-target and off-target activity in the luciferase reporter assay: Seed-mediated off-target activity has been reported to contribute to rat hepatoxicity of siRNAs.[10] To reduce such off-target effects, thermally destabilizing modifications such as GNA have been incorporated into the seed region of siRNA duplexes.[10] GNA can efficiently mitigate seed-mediated off-target effects while maintaining on-target potency. ANA is well tolerated in the seed region at positions 6 or 7 in the antisense strand. This prompted the inventors to measure the effect of ANA on off-target activity using the luciferase reporter assay where four tandem seed matches to the siRNA are cloned into the luciferase 3'-UTR region (FIGS. 5A and 5B).[29-31] ANA at AS6 and AS7 maintained on-target activity, an observation consistent with earlier in vitro screening. The off-target activity for the parent duplex and for the modified duplexes (AS6 and AS7) was similar, Thus, ANA does not increase off-target activity.

Figure 6A:
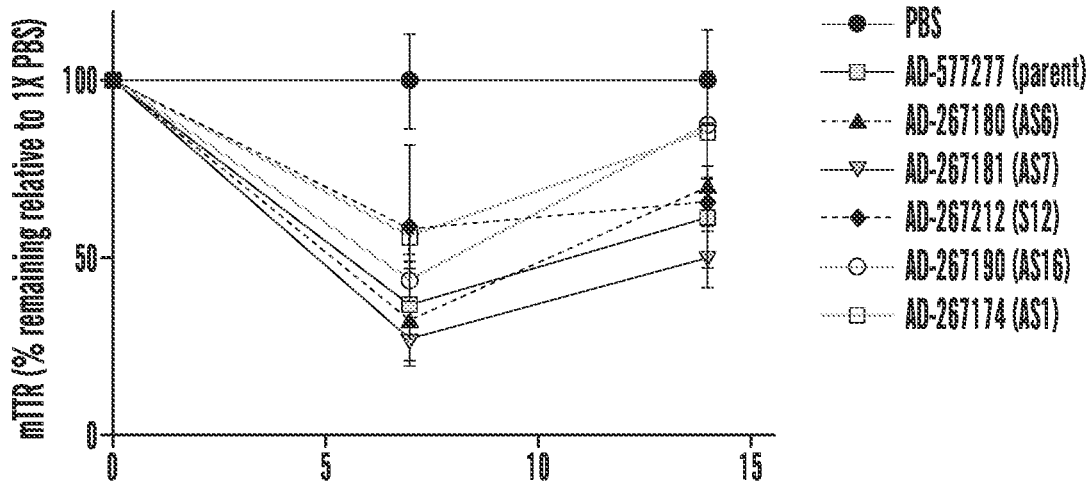
FIGS. 6A and 6B show in vivo activity of subcutaneously dosed ANA-containing siRNAs in C57BL/6 mice.
Figure 6B:
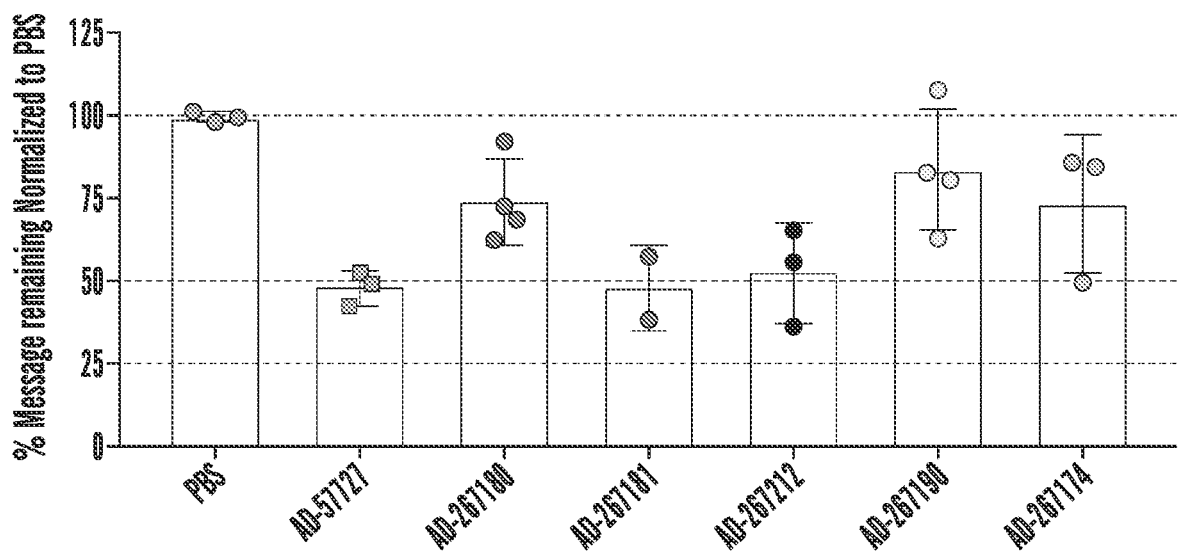

In vivo gene expression silencing: Selected siRNA duplexes were also screened for their ability to silence the expression of the Ttr gene in mice. The animals were dosed at 1 mg/kg subcutaneously, with the control cohort receiving 1xPBS vehicle. Blood samples were collected just prior to the dosing, and 7 and 14 days after dosing. Ttr protein levels in serum were measured using a mouse pre-albumin/Ttr ELISA kit and the results are shown in FIG. 6A. At day 7, duplexes with ANA at position AS6 or AS7 showed potencies comparable to that of the parent duplex. This aligns with the outcomes of in vitro screening experiments with these duplexes. However, at day 14, only AS7 was found to be active, whereas AS6 was less potent than the parent. At this point the reason for this behavior is unclear. Interestingly, the duplex with ANA modification at AS16 was significantly less active than the parent duplex. In contrast, the same duplex showed RNAi activity comparable to the parent duplex during in vitro screening, which may suggest intrinsic intracellular differences between the in vitro and in vivo models. The duplex with ANA modification at S12 was slightly less active than the parent one, but maintained its activity until day 14. In concordance with in vitro data, the duplex modified with ANA at the 5'-end of the antisense stand (AS1) was not effective, most likely because ANA cannot be phosphorylated by endogenous intracellular kinases. The animals were sacrificed at day 14 and RNA from liver was extracted, followed by cDNA preparation and multiplexed RT-qPCR analysis to assess the Ttr transcript levels (FIG. 6B). The results were well aligned with those obtained from scrum samples at day 14.

Figure 7:
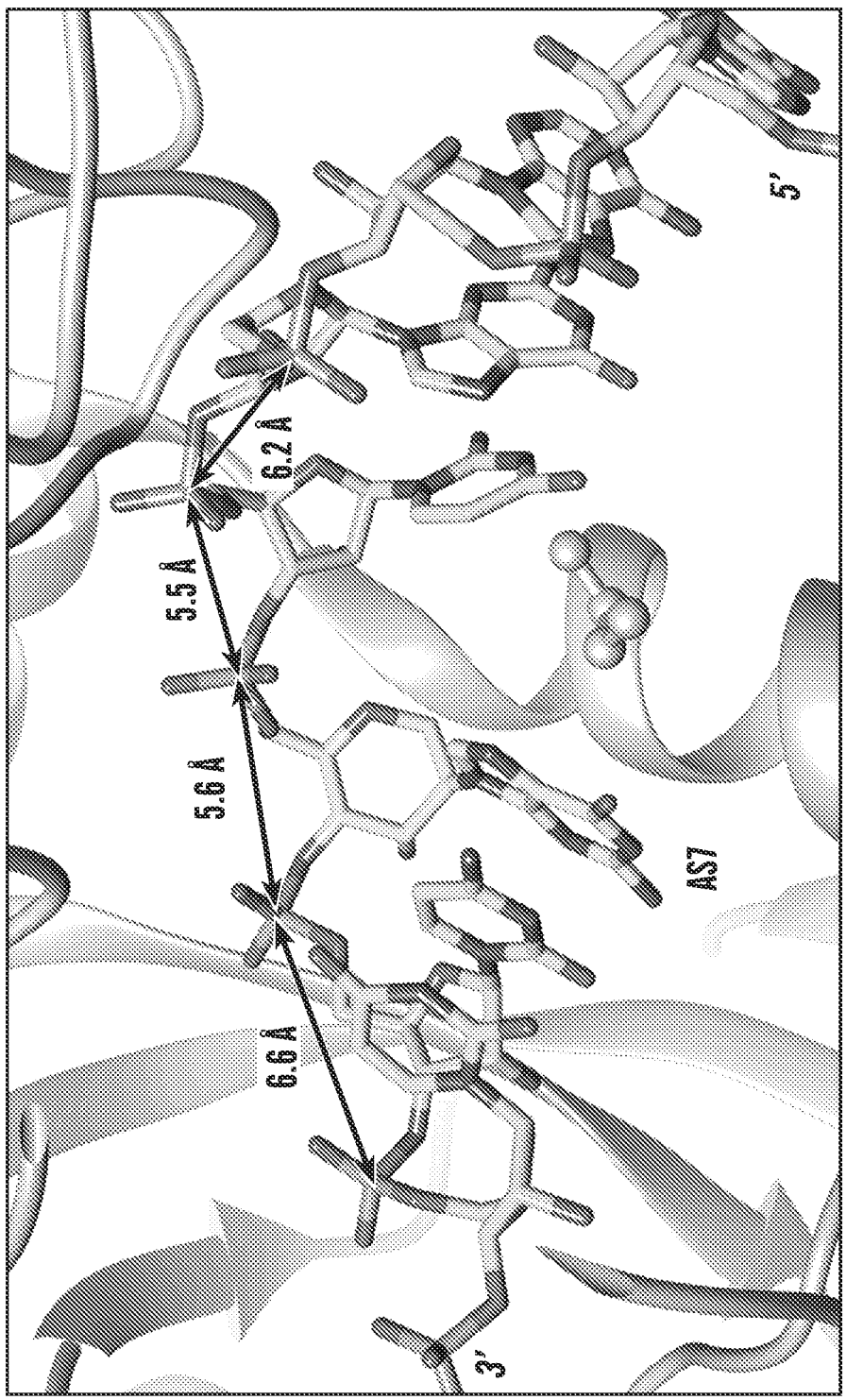
FIG. 7 is a schematic model of the siRNA guide strand with ANA-G at position AS7 bound to Ago2. The ANA residue is highlighted with carbon atoms colored in cyan and selected intra-strand P-P distances are given in Å.

To gain insight into the favorable effects on activity seen for an siRNA with AS7 replaced by an ANA nucleotide, inventors built a model of a modified strand bound to Ago2 based on the crystal structure of the Ago2: miR-20a complex.[20] The ANA-G residue for incorporation into the microRNA strand in place of G7 was taken from the crystal structure of an ANA:RNA decamer duplex.[32] In the hybrid duplex (ANA-strand A paired to RNA-strand E), the intrastrand P-P distance for ANA residues is 5.53 Å on average compared to 5.93 Å for RNA residues. The spacing between phosphates in miR-20a between residues 6, 7 and 8 in the seed region (P6 .... P7 and P7 .... P8) is reduced as a result of a pronounced kink at that site. Thus, an ANA nucleotide with an intrinsically short distance between the 5'- and 3'-phosphate groups fits the kinked backbone conformation very well, as demonstrated by the model of the RNA with G7 replaced by ANA-G7 bound to Ago2 (FIG. 7).

Figure 8A:
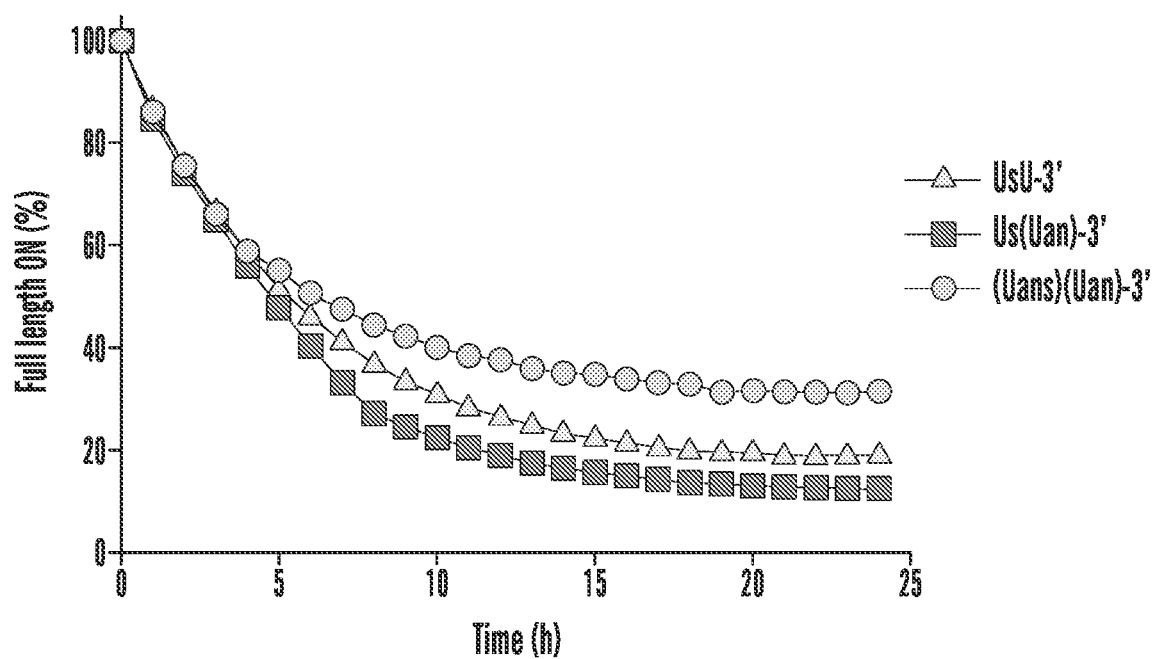
FIGS. 8A and 8B are line graphs showing stability of oligonucleotides carrying ANA modification against degradation.
Figure 8B:
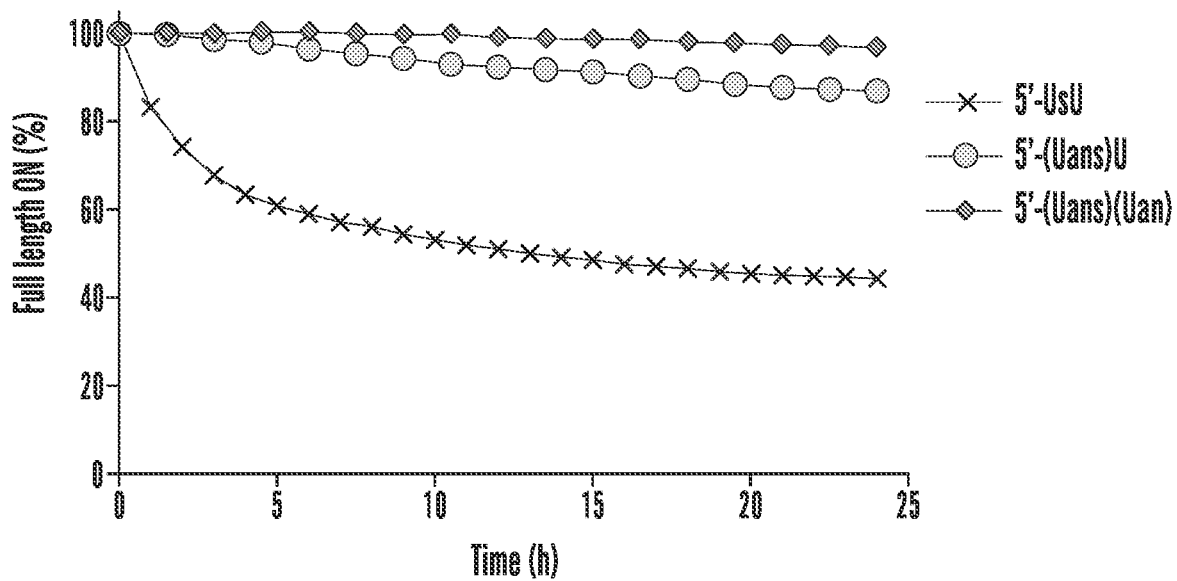

Nuclease stability: Either a single ANA nucleotide or two were incorporated at the 3'- or 5'-end of a poly dT oligonucleotide. For direct comparison identical sequences were prepared with uridine at the ends. ONs carrying modification at the 3'-end were incubated with snake venom phosphodiesterase (SVPD), a 3'-specific exonuclease, and the degradation of full-length oligonucleotide was monitored using ion-exchange HPLC. Interestingly, both ONs containing either uridine or ANA-U exhibited similar stability against SVPD and thus comparable half-lives. Importantly, a second incorporation of ANA resulted in 2-fold improvement of the half-life (FIGS. 8A and 8B).

Figure 9:
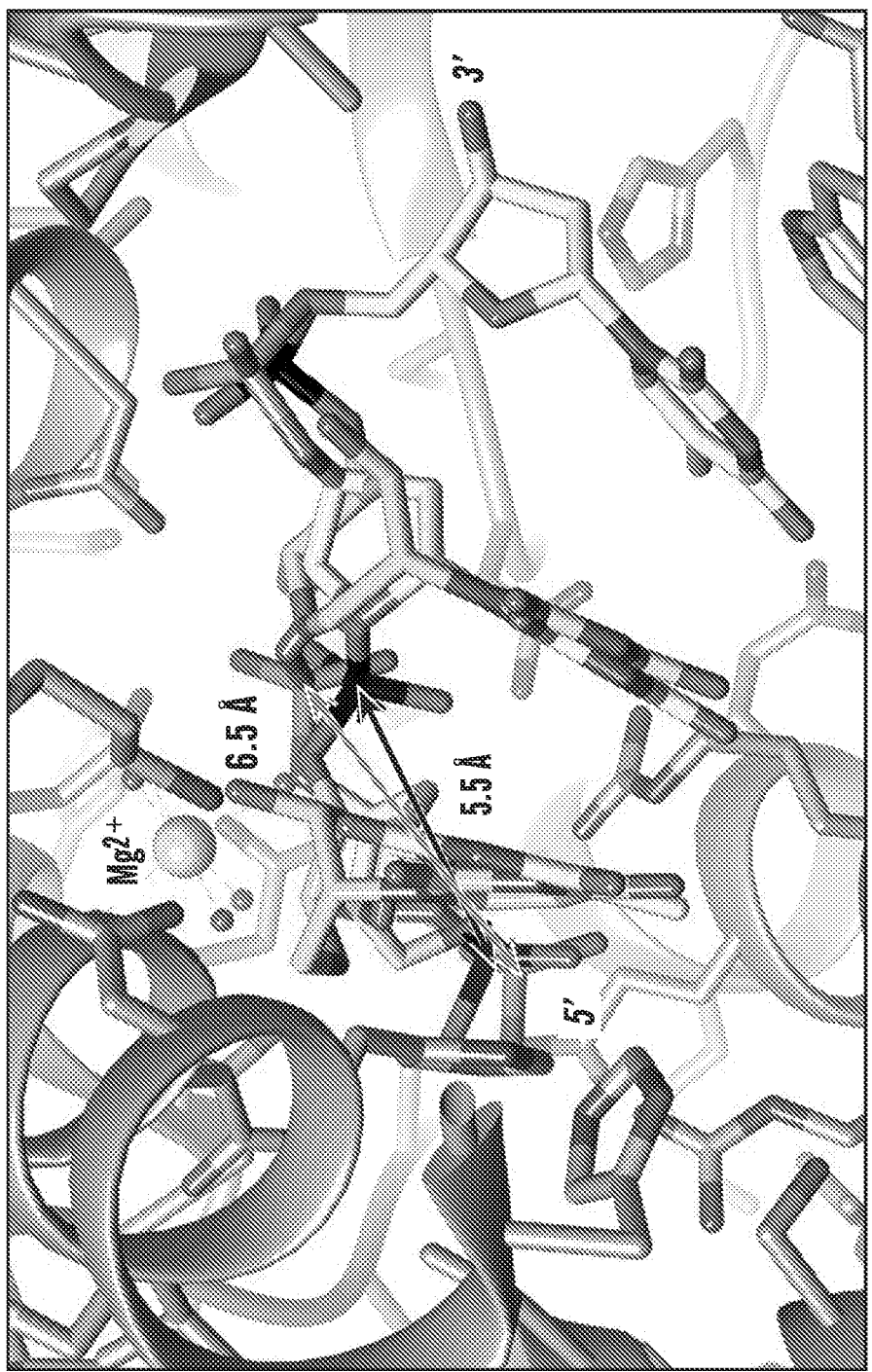
FIG. 9 is an active site view of Xrn1 5'-exoribonuclease with bound 5'P-dTdTdT-3' (phosphorus and carbon atoms colored in orange and yellow, respectively) as observed in the crystal structure of the complex [ref Jinek et al. Mol. Cell 2011]. The superimposed 5'P-aUaU-3'P ANA dimer (phosphorus and carbon atoms colored in black and cyan, respectively) reveals deviating P-P spacings between ANA and DNA (black and orange arrow, respectively) as well as phosphate orientations relative to the $Mg^{2+}$ ion (green sphere)
Figure 10A:
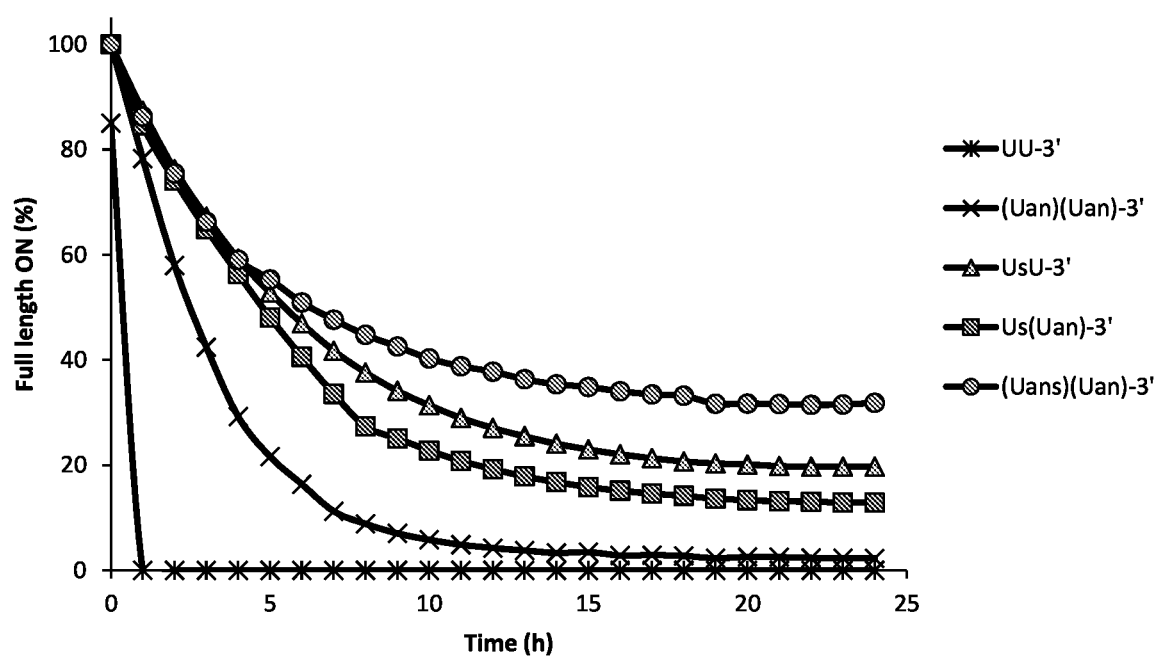
FIG. 10A is a line graph showing the ANA 3'-exonuclease stability.
Figure 10B:
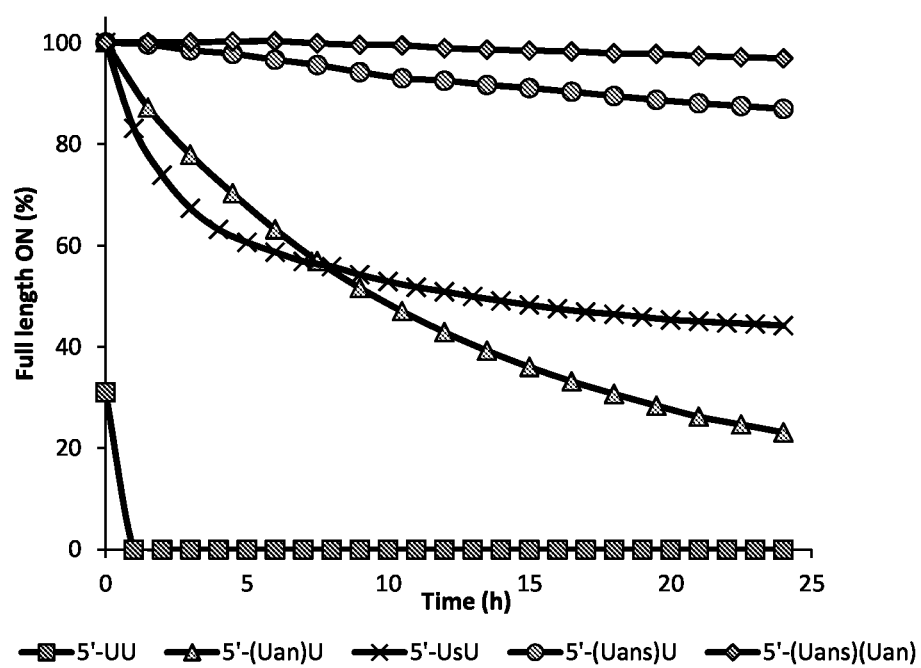
FIG. 10B is a line graph showing the ANA 5'-exonuclease stability. Calculated $t_{1/2}$ are 5'-UU: <<1.5 h, 5'-(Uan)U: 11.5, 5'-UsU: 26.9, 5'-(Uans) U: 113 h and 5'-(Uans(Uan): 458.5. Uan generally increases 5'-exonuclease stability compared to phosphodiester (PO) and phosphorothioate (PS) parent, respectively, and a double incorporation is more stable than a single incorporation.
Figure 11:
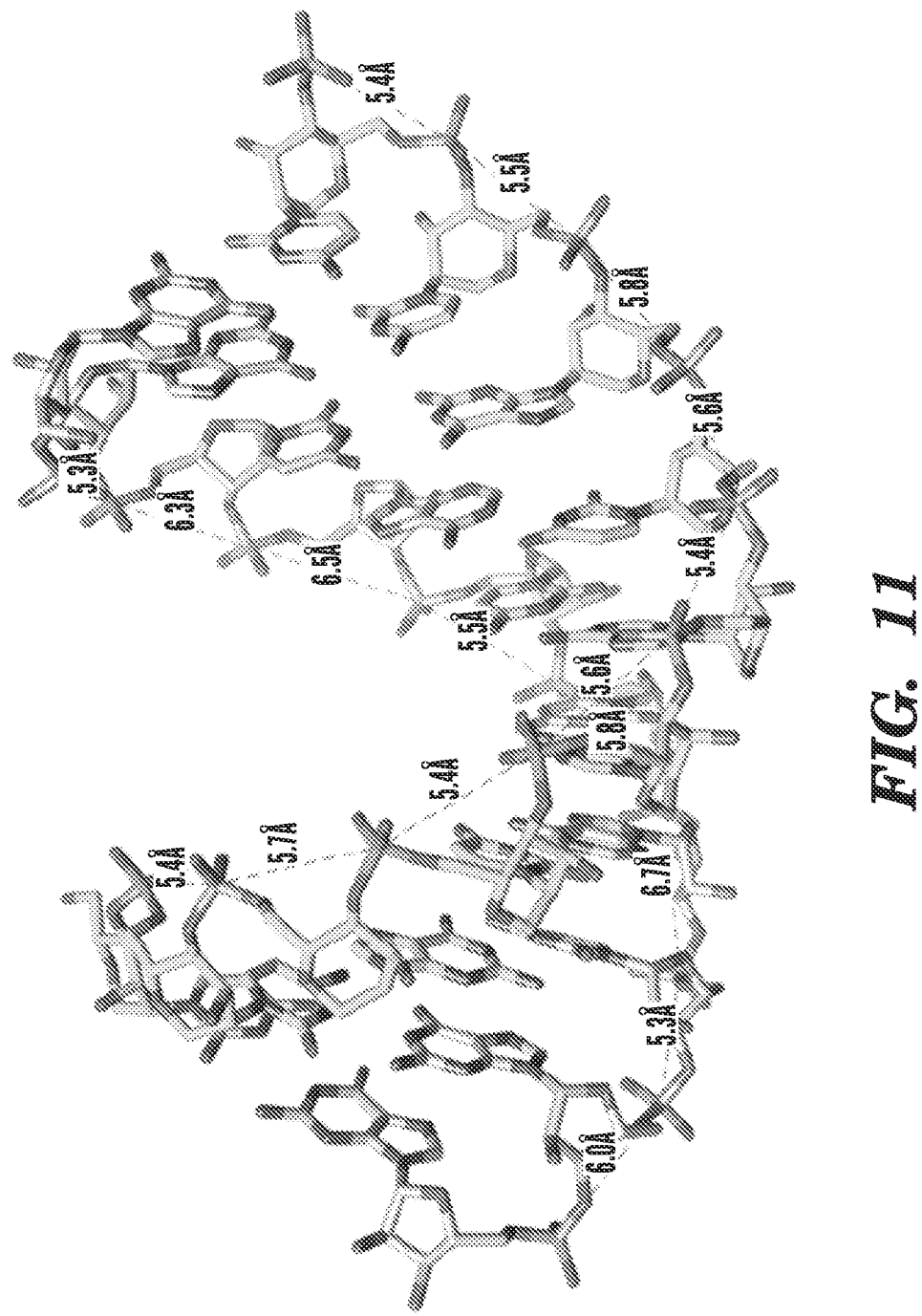
FIG. 11 is a schematic representation showing the crystal structure of an ANA:RNA duplex; PDB 1D 3ok2. Phosphate spacing in ANA (5.5 Å) is smaller than RNA (6 Å). Adapted from Ovaere et al. *Nucleic Acid Res.*, 40:7573-7583 (2012).
Figure 12:
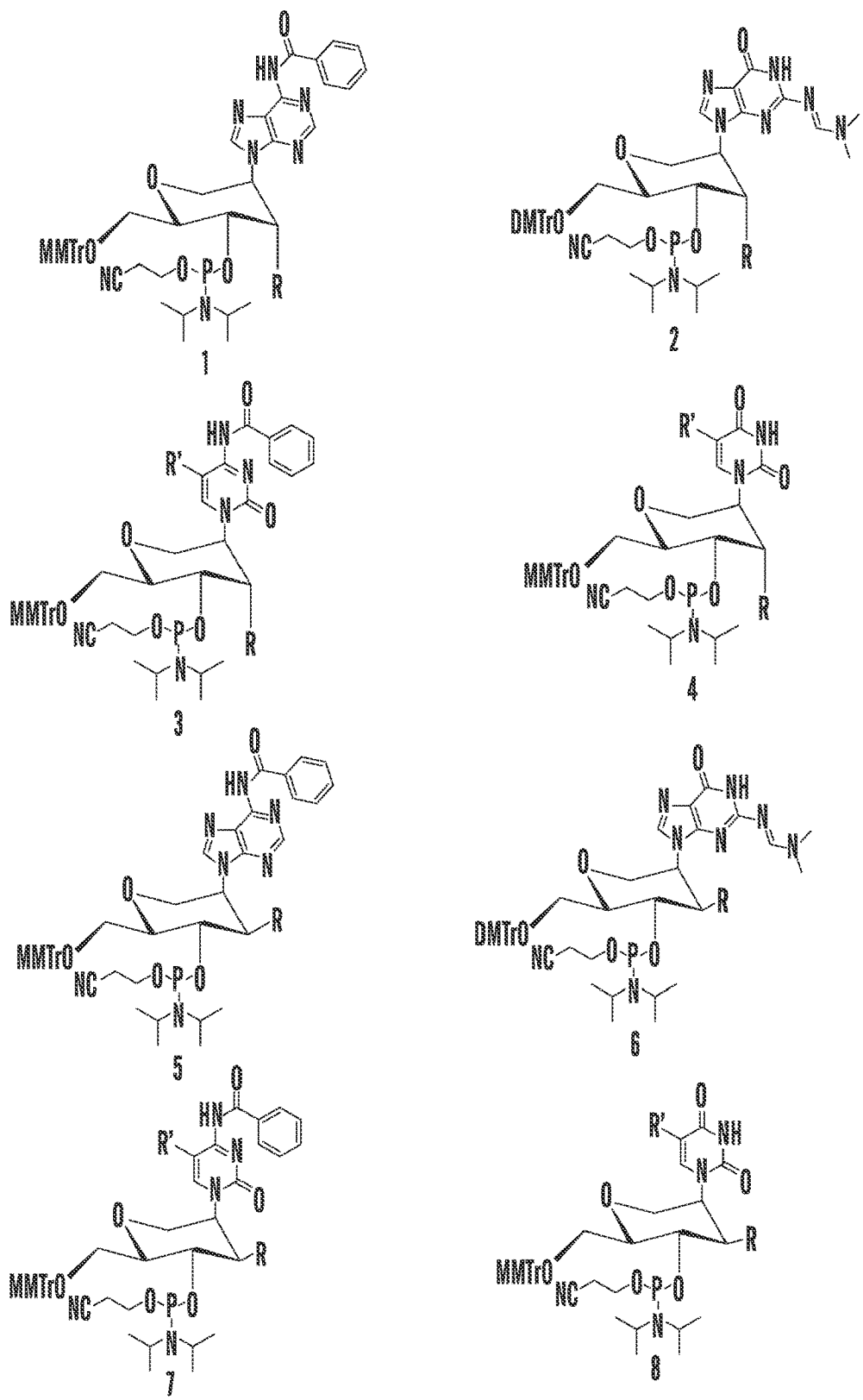
FIG. 12 shows some exemplary hexopyranose nucleoside phosphoramidites.
Figure 13:
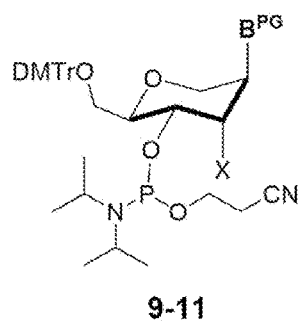
FIGS. 13 and 14 show some exemplary hexopyranose nucleosides and nucleotides.
Figure 13:
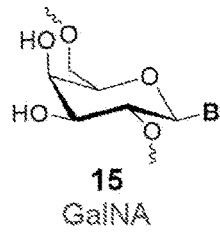
Figure 13:
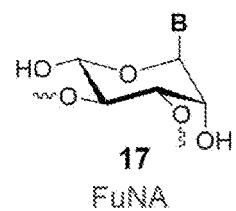
Figure 13:
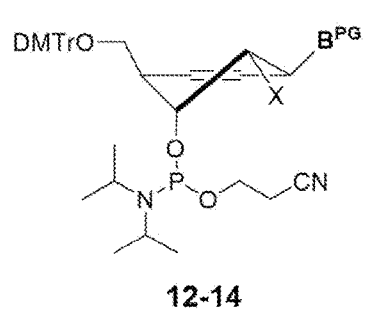
Figure 13:
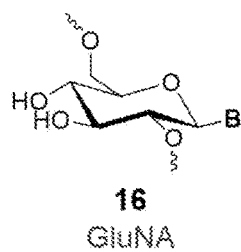
Figure 13:
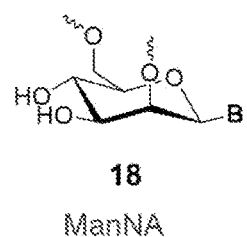
Figure 14:
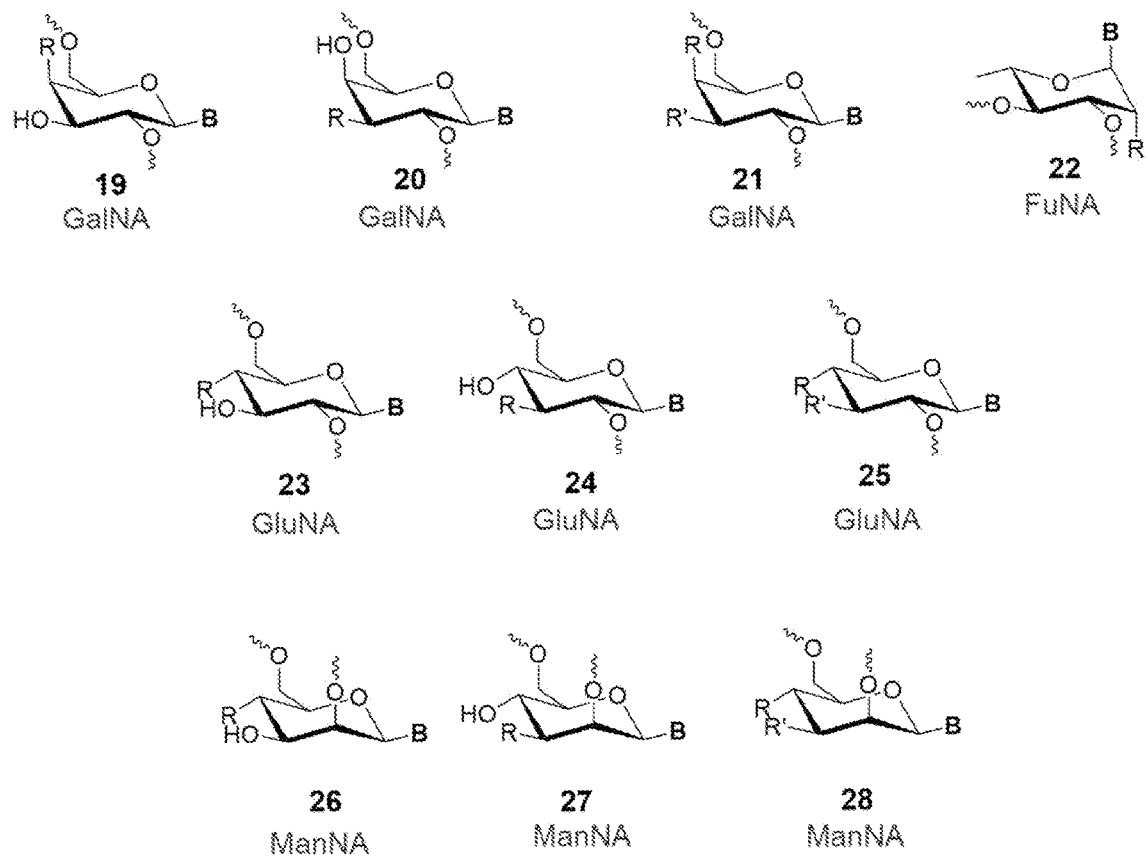

Next, 5'-modified oligonucleotides were incubated with phosphodiesterase II (PDEII), a 5'-specific exonuclease. Importantly, a significant improvement was observed for the oligonucleotide carrying an ANA modification at the 5'-end. Addition of a second modification at the 5'-end rendered the oligonucleotide virtually inert against degradation (FIG. 8). When an ANA 5'P-aUaU-3'P dimer is superimposed on the two 5'-terminal dTs as seen in the crystal structure of oligo-dT bound to the 5'-exoribonuclease Xrna1 [ref Jinek et al. Mol. Cell 2011], 21 differences in P-P spacing (shorter for ANA) and phosphate orientation as well as the increased bulkiness of the hexose sugar compared to (2'-deoxy) ribose become readily apparent (FIG. 9).

CONCLUSIONS

This study shows that nucleotides featuring an altritol six-membered sugar ring unexpectedly and surprisingly induce efficient gene silencing both in vitro and in vivo. Specially, the ANA modification was best accommodated at position AS7. The crystal structure of an ANA-modified RNA octamer demonstrated that the distance between the 5'- and 3'-phosphates of ANA residues is even shorter than the average distance between phosphates of ribonucleotides. An ANA residue can thus perfectly mimic a ribonucleotide at position AS7 where a kink in the siRNA guide strand results in locally contracted phosphate-phosphate distances. ONs with ANA at the 5'-end were more resistant to nuclease degradation than natural RNA counterparts. However, this gain in stability was not found in assays testing resistance against degradation by SVPD, a 3'-exonuclease. A model of an ON with two ANA-uridines at the 5'-end bound to a 5'-exoribonuclease indicates that steric bulk and altered phosphate-phosphate spacing relative to DNA and RNA are the main reasons for the increased protection against nuclease degradation.

REFERENCES

1. Adams, D.; Gonzalez-Duarte, A.; O'Riordan, W. D.; Yang, C.-C.; Ueda, M.; Kristen, A. V.; Tourney, L.; Schmidt, H. H.; Coelho, T.; Berk, J. L.; Lin, K.-P.; Vita, G.; Attarian, S.; Planté-Bordeneuve, V.; Mezei, M. M.; Campistol, J. M.; Buades, J.; Brannagan, T. H.; Kim, B. J.; Oh, J.; Parman, Y.; Sekijima, Y.; Hawkins, P. N.; Solomon, S. D.; Polydefkis, M.; Dyck, P. J.; Gandhi, P. J.; Goyal, S.; Chen, J.; Strahs, A. L.; Nochur, S. V.; Sweetser, M. T.; Garg, P. P.; Vaishnaw, A. K.; Gollob. J. A.; Suhr, O. B., Patisiran, an RNAi Therapeutic, for Hereditary Transthyretin Amyloidosis. *New England Journal of Medicine* 2018, 379 (1), 11-21.
2. Chakraborty, C.; Sharma, A. R.; Sharma, G.; Doss, C. G. P.; Lee, S.-S., Therapeutic miRNA and siRNA: Moving from Bench to Clinic as Next Generation Medicine. *Molecular therapy. Nucleic acids* 2017, 8, 132-143.
3. Elbashir, S. M.; Harborth, J.; Lendeckel, W.; Yalcin, A.; Weber, K.; Tuschl, T., Duplexes of 21-nucleotide RNAs mediate RNA interference in cultured mammalian cells. *Nature* 2001, 411 (6836), 494-498.
4. Caplen, N. J.; Parrish, S.; Imani, F.; Fire, A.; Morgan, R. A., Specific inhibition of gene expression by small double-stranded RNAs in invertebrate and vertebrate systems. *Proceedings of the National Academy of Sciences of the United States of America* 2001, 98 (17), 9742-9747.
5. Manoharan, M., RNA interference and chemically modified small interfering RNAs. *Current Opinion in Chemical Biology* 2004, 8 (6), 570-579.
6. Manoharan, M.; Akinc, A.; Pandey, R. K.; Qin, J.; Hadwiger, P.; John, M.; Mills, K.; Charisse, K.; Maier, M. A.; Nechev, L.; Greene, E. M.; Pallan, P. S.; Rozners, E.; Rajeev, K. G.; Egli, M., Unique gene-silencing and structural properties of 2'-fluoro-modified siRNAs. *Angewandte Chemie (International ed. in English)* 2011, 50 (10), 2284-2288.
7. Janas, M. M.; Zlatev, I.; Liu, J.; Jiang, Y.; Barros, S. A.; Sutherland, J. E.; Davis, W. P.; Liu, J.; Brown, C. R.; Liu, X.; Schlegel, M. K.; Blair, L.; Zhang, X.; Das, B.; Tran, C.; Aluri, K.; Li, J.; Agarwal, S.; Indrakanti, R.; Charisse, K.; Nair, J.; Matsuda, S.; Rajeev, K. G.; Zimmermann, T.; Sepp-Lorenzino, L.; Xu, Y.; Akinc, A.; Fitzgerald, K.; Vaishnaw, A. K.; Smith, P. F.; Manoharan, M.; Jadhav, V.; Wu, J.-T.; Maier, M. A., Safety evaluation of 2'-deoxy-2'-fluoro nucleotides in GalNAc-siRNA conjugates. *Nucleic Acids Research* 2019, 47 (7), 3306-3320.
8. Setten, R. L.; Rossi, J. J.; Han, S.-p., The current state and future directions of RNAi-based therapeutics. *Nature Reviews Drug Discovery* 2019, 18 (6), 421-446.
9. Manoharan, M.; Kumar, P.; Parmar, R. G.; Brown, C. R.; Willoughby, J. L. S.; Foster, D.; Babu, R. L.; Schofield, S.; Jadhav, V.; Charisse, K.; Nair, J. K.; Rajeev, K. G.; Maier, M.; Egli, M., 5'-Morpholino modification of the sense strand of an siRNA makes it a more effective passenger. *Chem. Commun. (Cambridge, U.K.)* 2019, Ahead of Print.
10. Janas, M. M.; Schlegel, M. K.; Harbison, C. E.; Yilmaz, V. O.; Jiang, Y.; Parmar, R.; Zlatev, I.; Castoreno, A.; Xu, H.; Shulga-Morskaya, S.; Rajeev, K. G.; Manoharan, M.; Keirstead, N. D.; Maier, M. A.; Jadhav, V., Selection of GalNAc-conjugated siRNAs with limited off-target-driven rat hepatotoxicity. *Nature Communications* 2018, 9 (1),
11. Malek-Adamian, E.; Guenther, D. C.; Matsuda, S.; Martinez-Montero, S.; Zlatev, I.; Harp, J.; Burai Patrascu, M.; Foster, D. J.; Fakhoury, J.; Perkins, L.; Moitessier, N.; Manoharan, R. M.; Taneja, N.; Bisbe, A.; Charisse, K.; Maier, M.; Rajeev, K. G.; Egli, M.; Manoharan, M.; Damha, M. J., 4'-C-Methoxy-2'-deoxy-2'-fluoro Modified Ribonucleotides Improve Metabolic Stability and Elicit Efficient RNAi-Mediated Gene Silencing. *Journal of the American Chemical Society* 2017, 139 (41), 14542-14555.
12. Schlegel, M. K.; Foster, D. J.; Kel'in, A. V.; Zlatev, I.; Bisbe, A.; Jayaraman, M.; Lackey, J. G.; Rajeev, K. G.; Charisse, K.; Harp, J.; Pallan, P. S.; Maier, M. A.; Egli, M.; Manoharan, M., Chirality Dependent Potency Enhancement and Structural Impact of Glycol Nucleic Acid Modification on siRNA. *Journal of the American Chemical Society* 2017, 139 (25), 8537-8546.
13. Malek-Adamian, E.; Guenther, D. C.; Matsuda, S.; Martinez-Montero, S.; Zlatev, I.; Harp, J.; Burai Patrascu, M.; Foster, D. J.; Fakhoury, J.; Perkins, L.; Moitessier, N.; Manoharan, R. M.; Taneja, N.; Bisbe, A.; Charisse, K.; Maier, M.; Rajeev, K. G.; Egli, M.; Manoharan, M.;

Damha, M. J., 4'-C-Methoxy-2'-deoxy-2'-fluoro Modified Ribonucleotides Improve Metabolic Stability and Elicit Efficient RNAi-Mediated Gene Silencing. *J Am Chem Soc* 2017, 139 (41), 14542-14555.

14. Allart, B.; Khan, K.; Rosemeyer, H.; Schepers, G.; Hendrix, C.; Rothenbacher, K.; Seela, F.; Van Aerschot, A.; Herdewijn, P., D-Altritol Nucleic Acids (ANA): Hybridisation Properties, Stability, and Initial Structural Analysis. 1999, 5 (8), 2424-2431.

15. Allart, B.; Busson, R.; Rozenski, J.; Van Aerschot, A.; Herdewijn, P., Synthesis of protected D-altritol nucleosides as building blocks for oligonucleotide synthesis. *Tetrahedron* 1999, 55 (21), 6527-6546.

16. Fisher. M.; Abramov, M.; Van Aerschot, A.; Xu, D.; Juliano, R. L.; Herdewijn, P., Inhibition of MDRI expression with altritol-modified siRNAs. *Nucleic acids research* 2007, 35 (4), 1064-1074.

17. Fisher, M.; Abramov, M.; Van Aerschot, A.; Rozenski, J.; Dixit, V.; Juliano, R. L.; Herdewijn, P., Biological effects of hexitol and altritol-modified siRNAs targeting B-Raf. *European journal of pharmacology* 2009, 606 (1-3), 38-44.

18. Hean, J.; Crowther, C.; Ely, A.; ul Islam, R.; Barichievy, S.; Bloom, K.; Weinberg, M. S.; van Otterlo, W. A. L.; de Koning, C. B.; Salazar, F.; Marion, P.; Roesch, E. B.; LeMaitre, M.; Herdewijn, P.; Arbuthnot, P., Inhibition of hepatitis B virus replication in vivo using lipoplexes containing altritol-modified antiviral siRNAs. *Artificial DNA: PNA & XNA* 2010, 1 (1), 17-26.

19. Bramsen, J. B.; Laursen, M. B.; Nielsen, A. F.; Hansen, T. B.; Bus, C.; Langkjaer, N.; Babu, B. R.; Højland, T.; Abramov, M.; Van Aerschot, A.; Odadzic, D.; Smicius, R.; Haas, J.; Andree, C.; Barman, J.; Wenska, M.; Srivastava, P.; Zhou, C.; Honcharenko, D.; Hess, S.; Müller, E.; Bobkov, G. V.; Mikhailov, S. N.; Fava, E.; Meyer, T. F.; Chattopadhyaya, J.; Zerial, M.; Engels, J. W.; Herdewijn, P.; Wengel, J.; Kjems, J., A large-scale chemical modification screen identifies design rules to generate siRNAs with high activity, high stability and low toxicity. *Nucleic acids research* 2009, 37 (9), 2867-2881.

20. Elkayam, E.; Kuhn, C.-D.; Tocilj, A.; Haase, A. D.; Greene, E. M.; Hannon, G. J.; Joshua-Tor, L., The structure of human argonaute-2 in complex with miR-20a. *Cell* 2012, 150 (1), 100-110.

21. Jinek, M.; Coyle, S. M.; Doudna, J. A., Coupled 5' nucleotide recognition and processivity in Xml-mediated mRNA decay. *Molecular cell* 2011, 41 (5), 600-608.

22. Matsuda, S.; Keiser, K.; Nair, J. K.; Charisso, K.; Manoharan, R. M.; Kretschmer, P.; Peng, C. G.; V. Kel'in, A.; Kandasamy, P.; Willoughby, J. L. S.; Liebow, A.; Querbes, W.; Yucius, K.; Nguyen, T.; Milstein, S.; Maier, M. A.; Rajeev, K. G.; Manoharan, M., siRNA Conjugates Carrying Sequentially Assembled Trivalent N-Acetylgalactosamine Linked Through Nucleosides Elicit Robust Gene Silencing In Vivo in Hepatocytes. *ACS Chemical Biology* 2015, 10 (5), 1181-1187.

23. Rajeev, K. G.; Nair, J. K.; Jayaraman, M.; Charisse, K.; Taneja, N.; O'Shea, J.; Willoughby, J. L. S.; Yucius, K.; Nguyen, T.; Shulga-Morskaya, S.; Milstein, S.; Liebow, A.; Querbes, W.; Borodovsky, A.; Fitzgerald, K.; Maier, M. A.; Manoharan, M., Hepatocyte-Specific Delivery of siRNAs Conjugated to Novel Non-nucleosidic Trivalent N-Acetylgalactosamine Elicits Robust Gene Silencing in Vivo. *ChemBioChem* 2015, 16 (6), 903-908.

24. Nair, J. K.; Willoughby, J. L. S.; Chan, A.; Charisse, K.; Alam, M. R.; Wang, Q; Hoekstra, M.; Kandasamy, P.; Kel'in, A. V.; Milstein, S.; Taneja, N.; O'Shea, J.; Shaikh, S.; Zhang, L.; van der Sluis, R. J.; Jung, M. E.; Akinc, A.; Hutabarat, R.; Kuchimanchi, S.; Fitzgerald, K.; Zimmermann, T.; van Berkel, T. J. C.; Maier, M. A.; Rajeev, K. G.; Manoharan, M., Multivalent N-Acetylgalactosamine-Conjugated siRNA Localizes in Hepatocytes and Elicits Robust RNAi-Mediated Gene Silencing. *Journal of the American Chemical Society* 2014, 136 (49), 16958-16961.

25. Schirle, N. T.; MacRae, I. J., The Crystal Structure of Human Argonaute2. *Science* 2012, 336 (6084), 1037.

26. Wang, Y.; Juranek S Fau-Li, H.; Li H Fau-Sheng, G.; Sheng G Fau-Wardle, G. S.; Wardle Gs Fau-Tuschl, T.; Tuschl T Fau-Patel, D. J.; Patel, D. J., Nucleation, propagation and cleavage of target RNAs in Ago silencing complexes. (1476-4687 (Electronic)).

27. Wang, Y.; Juranek, S.; Li, H.; Sheng, G.; Wardle, G. S.; Tuschl, T.; Patel, D. J., Nucleation, propagation and cleavage of target RNAs in Ago silencing complexes. *Nature* 2009, 461 (7265), 754-761.

28. Parmar, R. G.; Brown, C. R.; Matsuda, S.; Willoughby, J. L. S.; Theile, C. S.; Charisse, K.; Foster, D. J.; Zlatev, I.; Jadhav, V.; Maier, M. A.; Egli, M.; Manoharan, M.; Rajeev, K. G., Facile Synthesis, Geometry, and 2'-Substituent-Dependent in Vivo Activity of 5'-(E)- and 5'-(Z)-Vinylphosphonate-Modified siRNA Conjugates. *Journal of Medicinal Chemistry* 2018, 61 (3), 734-744.

29. Vaish, N.; Chen F Fau-Seth, S.; Seth S Fau-Fosnaugh, K.; Fosnaugh K Fau-Liu, Y.; Liu Y Fau-Adami, R.; Adami R Fau-Brown, T.; Brown T Fau-Chen, Y.; Chen Y Fau-Harvic, P.; Harvie P Fau-Johns, R.; Johns R Fau-Severson, G.; Severson G Fau-Granger, B.; Granger B Fau-Charmley, P.; Charmley P Fau-Houston, M.; Houston M Fau-Templin, M. V.; Templin Mv Fau-Polisky, B.; Polisky, B., Improved specificity of gene silencing by siRNAs containing unlocked nucleobase analogs. (1362-4962 (Electronic)).

30. Ui-Tei, K.; Naito, Y.; Nishi, K.; Juni, A.; Saigo, K., Thermodynamic stability and Watson-Crick base pairing in the seed duplex are major determinants of the efficiency of the siRNA-based off-target effect. *Nucleic acids research* 2008, 36 (22), 7100-7109.

31. Doench, J. G.; Petersen, C. P.; Sharp, P. A., siRNAs can function as miRNAs. *Genes Dev* 2003, 17 (4), 438-42.

32. Ovaere, M.; Sponer, J.; Sponer, J. E.; Herdewijn, P.; Van Meervelt, L., How does hydroxyl introduction influence the double helical structure: the stabilization of an altritol nucleic acid: ribonucleic acid duplex. *Nucleic acids research* 2012, 40 (15), 7573-7583.

All of the U.S. patents, U.S. patent application publications, foreign patents, foreign patent applications and non-patent publications referred to in this specification are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

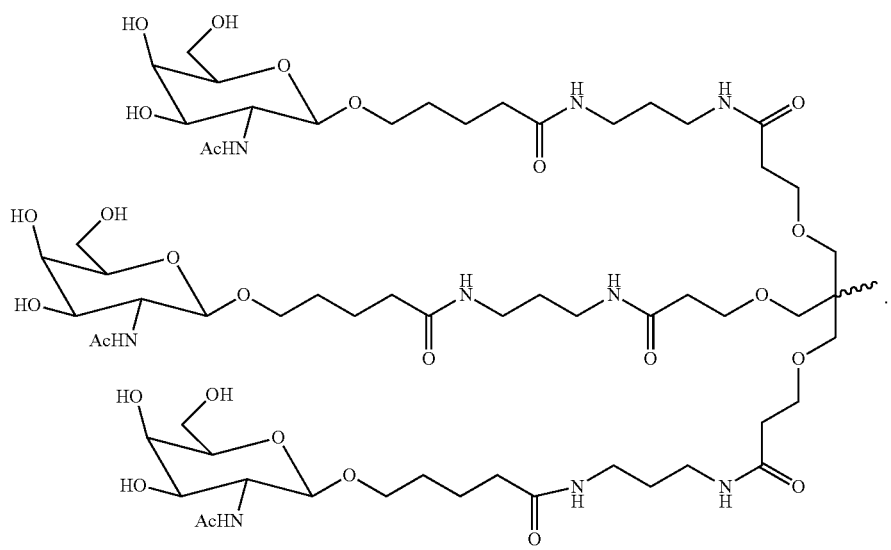 [SMILES: CC(=O)NC1C(OCCCCC(=O)NCCCNC(=O)CCOCC(C)(COCCC(=O)NCCCNC(=O)CCCCOC2OC(CO)C(O)C(O)C2NC(C)=O)COCCC(=O)NCCCNC(=O)CCCCOC2OC(CO)C(O)C(O)C2NC(C)=O)OC(CO)C(O)C1O]

What is claimed is:

1. A double-stranded RNA (dsRNA) molecule capable of inhibiting the expression of a target gene, comprising a sense strand and an antisense strand, each strand having 14 to 40 nucleotides, wherein the antisense strand has sufficient complementarity to the target sequence to mediate RNA interference, wherein the dsRNA molecule comprises only one hexopyranose nucleotide and wherein said hexopyranose nucleotide is in the antisense strand at one of positions 6, 7, 9, 12, 16, 20 and 21, counting from the 5'-end of the antisense strand or said hexopyranose nucleotide is in the sense strand at one of positions 3, 12, and 21, counting from the 5'-end, wherein the dsRNA comprises a 2'-fluoro or 2'-OMe nucleotide in position complimentary to the hexopyranose nucleotide, and wherein the hexopyranose nucleotide is selected from the group consisting of altriol nucleotide, glucopyranose nucleotide, mannopyranose nucleotide, allopyranose nucleotide, and galactopyranose nucleotide.

2. The double-stranded RNA molecule of claim 1, wherein the antisense strand comprises the hexopyranose nucleotide.

3. The double-stranded RNA molecule of claim 1, wherein the antisense strand comprises a hexopyranose nucleotide at one of positions 6, 7 and 16.

4. The double-stranded RNA molecule of claim 3, wherein the antisense strand comprises a hexopyranose nucleotide at one of positions 6 and 7.

5. The double-stranded RNA molecule of claim 4, wherein the antisense strand comprises a hexopyranose nucleoside at position 7.

6. The double-stranded RNA molecule of claim 1, wherein the sense strand comprises the hexopyranose nucleotide.

7. The double-stranded RNA molecule of claim 1, wherein the sense strand comprises the hexopyranose nucleotide at one of positions 3 and 12.

8. The double-stranded RNA molecule of claim 1, wherein the sense strand comprises the hexopyranose nucleotide at position 3.

9. The double-stranded RNA molecule of claim 1, wherein sense strand comprises a 5'-vinylphosphonate (VP) group.

10. The double-stranded RNA molecule of claim 1, wherein the hexopyranose nucleotide is selected from the group consisting of altriol nucleotide, glucopyranose nucleotide, and mannopyranose nucleotide.

11. The double-stranded RNA molecule of claim 10, wherein the hexopyranose nucleotide is selected an altriol nucleotide.

12. A pharmaceutical composition comprising the dsRNA agent according to claim 1 alone or in combination with a pharmaceutically acceptable carrier or excipient.

13. A gene silencing kit containing the dsRNA molecule of claim 1.

14. A method for silencing a target gene in a cell, the method comprising a step of introducing the dsRNA molecule of claim 1 into the cell.

15. The dsRNA molecule of claim 1, wherein the dsRNA comprises a ligand.

16. The dsRNA molecule of claim 1, wherein the dsRNA molecule does not comprise nucleotides other than hexopyranose, 2'-fluoro and 2-OMe nucleotides.

17. The dsRNA molecule of claim 1, wherein the sense and antisense strands are independently 19-25 nucleotides in length.

18. The double-stranded RNA molecule of claim 15, wherein the ligand is an ASGPR ligand.

19. The double-stranded RNA molecule of claim 18, wherein the ASGPR ligand is:

SEQUENCE LISTING

```
<160> NUMBER OF SEQ ID NOS: 11

<210> SEQ ID NO 1
<211> LENGTH: 16
<212> TYPE: PRT
<213> ORGANISM: Unknown
<220> FEATURE:
<223> OTHER INFORMATION: Description of Unknown:
      RFGF sequence

<400> SEQUENCE: 1

Ala Ala Val Ala Leu Leu Pro Ala Val Leu Leu Ala Leu Leu Ala Pro
1               5                   10                  15

<210> SEQ ID NO 2
<211> LENGTH: 11
<212> TYPE: PRT
<213> ORGANISM: Unknown
<220> FEATURE:
<223> OTHER INFORMATION: Description of Unknown:
      RFGF analogue sequence

<400> SEQUENCE: 2

Ala Ala Leu Leu Pro Val Leu Leu Ala Ala Pro
1               5                   10

<210> SEQ ID NO 3
<211> LENGTH: 13
<212> TYPE: PRT
<213> ORGANISM: Human immunodeficiency virus

<400> SEQUENCE: 3

Gly Arg Lys Lys Arg Arg Gln Arg Arg Arg Pro Pro Gln
1               5                   10

<210> SEQ ID NO 4
<211> LENGTH: 16
<212> TYPE: PRT
<213> ORGANISM: Drosophila sp.

<400> SEQUENCE: 4

Arg Gln Ile Lys Ile Trp Phe Gln Asn Arg Arg Met Lys Trp Lys Lys
1               5                   10                  15

<210> SEQ ID NO 5
<211> LENGTH: 19
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
taatattaca taaataaaa                                              19

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
tttttttttt tttttttttt                                             20
```

```
<210> SEQ ID NO 7
<211> LENGTH: 12
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 7
cgcgaauuag cg                                                          12

<210> SEQ ID NO 8
<211> LENGTH: 10
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 8
ccguaaugcc                                                             10

<210> SEQ ID NO 9
<211> LENGTH: 10
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 9
ggcauuacgg                                                             10

<210> SEQ ID NO 10
<211> LENGTH: 21
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 10
aacaguguuc uugcucuaua a                                                21

<210> SEQ ID NO 11
<211> LENGTH: 23
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 11
uuauagagca agaacacugu uuu                                              23
```